United States Patent
Altman et al.

(10) Patent No.: US 6,535,897 B1
(45) Date of Patent: Mar. 18, 2003

(54) SYSTEM AND METHODS FOR SPACING, STORING AND RECOGNIZING ELECTRONIC REPRESENTATIONS OF HANDWRITING PRINTING AND DRAWINGS

(75) Inventors: Dan Altman, Kula, HI (US); Michael W. Rouiller, San Jose, CA (US); Gregory Stikeleather, Palo Alto, CA (US); Michele M. Evans, Palm Coast, FL (US); Steven R. Kusmer, San Francisco, CA (US); Michael P. Thompson, San Carlos, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/543,384

(22) Filed: Apr. 5, 2000

Related U.S. Application Data

(60) Division of application No. 08/744,517, filed on Nov. 6, 1996, now abandoned, which is a division of application No. 08/253,546, filed on Jun. 3, 1994, now Pat. No. 5,613,019, and a continuation-in-part of application No. 08/064,954, filed on May 20, 1993, now Pat. No. 5,517,578.

(51) Int. Cl.$^7$ ............................................. G06F 17/21
(52) U.S. Cl. ...................................... 707/541; 707/531
(58) Field of Search ............................. 707/531, 541; 382/177, 314, 187

(56) References Cited

U.S. PATENT DOCUMENTS

| | | | | |
|---|---|---|---|---|
| 4,024,500 A | | 5/1977 | Herbst et al. | 340/146.3 SG |
| 4,048,615 A | * | 9/1977 | Chuang et al. | 382/196 |
| 4,087,790 A | * | 5/1978 | Neff | 382/177 |
| 4,475,239 A | | 10/1984 | van Raamsdonk | 382/57 |
| 4,553,261 A | | 11/1985 | Froessl | 382/57 |
| 4,680,804 A | | 7/1987 | Kuzunuki et al. | 382/13 |

(List continued on next page.)

OTHER PUBLICATIONS

"Online Form–Free Japanese Character Segmentation" *IBM Technical Disclosure Bulletin*, 1991, 34(4B), 365–367.

Seni G. et al., "Segmenting Handwritten Text Lines into Words using Distance Algorithms" *Machine Vision, Applications in Character Recognition and Industrial Inspection*-San Jose, Feb. 10–12, 1992, 1661, D'Amato D.P. et al. (eds.), 61–72.

Goldberg D. et al., "Stylus User Interfaces for Manipulating Text" Proceedings of the *Symposium on User Interface Software and Technology (UIST)*, Hilton Head, S. Carolina, Nov. 11–13, 1991, No. Symp. 4, Association for Computing Machinery, pp. 127–135.

(List continued on next page.)

*Primary Examiner*—Stephen S. Hong
(74) *Attorney, Agent, or Firm*—Woodcock Washburn LLP

(57) ABSTRACT

A system for spacing, storing and recognizing electronic representations of handwriting and printing comprises a central processing unit that couples with a display device, an input device, and a memory. The memory includes means for spacing ink stroke representations, means for recognizing outline elements, means for performing deferred recognition, means for highlighting drawing areas and means for storing and displaying ink stroke representations. These means operate together to provide a pen-based or graphics oriented computer system with improved performance and added functionality for manipulating the space between ink stroke representations. The preferred embodiment of the present invention comprises several novel methods that provide this functionality including: a method for managing space between ink stroke representations, a method for displaying drawing elements in a visually distinct manner, a method for recognizing bullets and dashes, a method for storing ink stroke representations, a method for displaying and printing ink stroke representations, and a method for performing deferred character or word recognition.

5 Claims, 43 Drawing Sheets

U.S. PATENT DOCUMENTS

| | | | |
|---|---|---|---|
| 4,718,103 A | | 1/1988 | Shojima et al. .............. 382/13 |
| 4,727,588 A | | 2/1988 | Fox et al. .................... 382/13 |
| 4,755,955 A | | 7/1988 | Kimura et al. ............. 364/518 |
| 4,763,356 A | | 8/1988 | Day, Jr. et al. ............. 379/368 |
| 4,850,025 A | * | 7/1989 | Abe ........................... 382/220 |
| 4,860,372 A | | 8/1989 | Kuzunuki et al. ............ 382/13 |
| 4,910,785 A | | 3/1990 | Nakatsuma ..................... 382/9 |
| 4,972,496 A | | 11/1990 | Sklarew ........................ 382/13 |
| 5,012,521 A | | 4/1991 | Endo et al. ..................... 382/1 |
| 5,208,906 A | | 5/1993 | Morgan ...................... 395/148 |
| 5,220,649 A | | 6/1993 | Forcier ....................... 395/148 |
| 5,231,579 A | | 7/1993 | Tsuchiya et al. ............ 364/419 |
| 5,245,445 A | | 9/1993 | Fujisawa .................... 358/458 |
| 5,252,951 A | | 10/1993 | Tannenbaum et al. ...... 345/156 |
| 5,260,697 A | | 11/1993 | Barrett et al. ............... 345/173 |
| 5,272,764 A | | 12/1993 | Bloomberg et al. ............ 382/9 |
| 5,276,794 A | | 1/1994 | Lamb, Jr. ................... 395/149 |
| 5,321,768 A | | 6/1994 | Fenrich et al. ................. 382/9 |
| 5,321,770 A | | 6/1994 | Huttenlocher et al. ........ 382/22 |
| 5,347,295 A | | 9/1994 | Agulnick et al. ........... 345/156 |
| 5,384,864 A | | 1/1995 | Spitz ............................. 382/9 |
| 5,396,566 A | | 3/1995 | Bruce et al. .................. 382/46 |
| 5,418,864 A | * | 5/1995 | Murdock et al. ........... 382/309 |
| 5,448,475 A | | 9/1995 | Senoo et al. ................ 364/419 |
| 5,502,803 A | | 3/1996 | Yashida et al. ............. 395/146 |
| 5,517,578 A | | 5/1996 | Altman et al. .............. 382/181 |
| 5,613,019 A | | 3/1997 | Altman et al. .............. 382/311 |

OTHER PUBLICATIONS

Lipscomb J. S., "A Trainable Gesture Recognizer" *Pattern Recognition*, 1991, 24(9), 895–907.

Brochure by Concept Technologies, Inc. for "Stroke of the Hand," 1992.

Kopec, G.E., et al., "Editing Images of Text," *Proceedings of the International Conference on Electronic Publishing, Document Manipulation & Typography*, Gaithersburg, Maryland, Sep. 1990, 207–220.

* cited by examiner

*Left list item 1*
*Left list item 2*
*Left list item 3*
*Right list item 1*
*Right list item 2*
*Right list item 3*

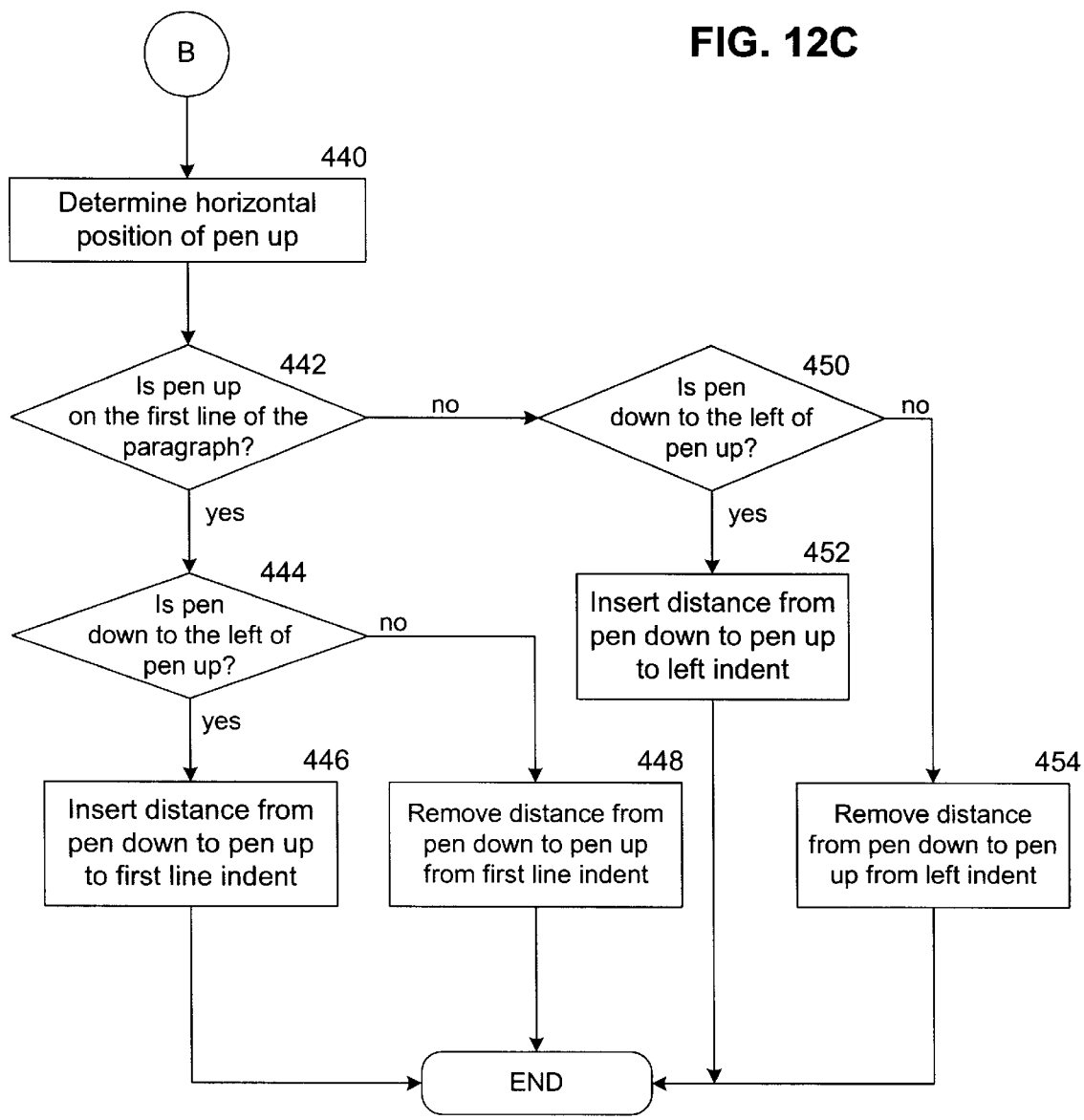

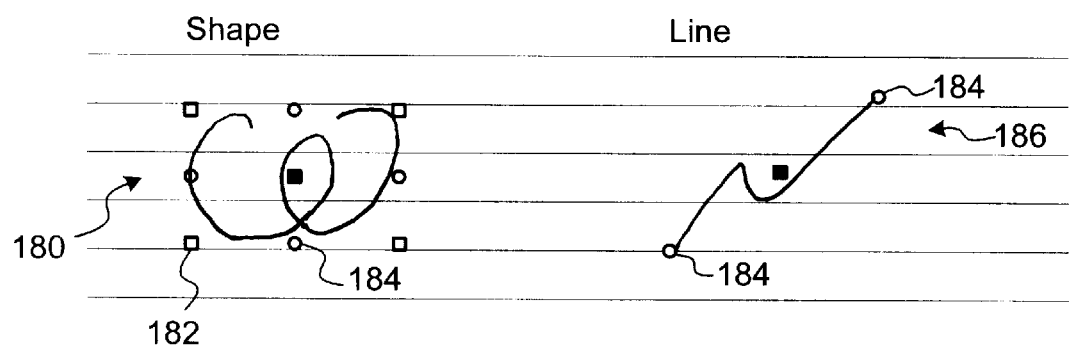
FIG. 16A  FIG. 16B

SYSTEM AND METHODS FOR SPACING, STORING AND RECOGNIZING ELECTRONIC REPRESENTATIONS OF HANDWRITING PRINTING AND DRAWINGS

CROSS-REFERENCE TO RELATED APPLICATIONS

This application is a division of application Ser. No. 08/744,517, filed Nov. 6, 1996, abandoned, which is a division of Ser. No. 08/253,546, filed Jun. 3, 1994, now U.S. Pat. No. 5,613,019 and is a continuation-in-part of pending U.S. patent application Ser. No. 08/064,954, filed May 20, 1993, invented by D. Altman, S. Kusmer, G. Stikeleather and M. Thompson, and entitled "Method And Apparatus For Grouping And Manipulating Electronic Representations Of Handwriting, Printing And Drawings."

BACKGROUND OF THE INVENTION

1. Field of the Invention

The present invention relates generally to methods for performing pen-based computing, and in particular, to a method and apparatus for storing and manipulating ink stroke representations. Still more particularly, the present invention relates to a note taking system that provides simplified user manipulation of handwritten ink strokes to manage space, improved paragraph parsing with specialized character recognition and new methods for storing and displaying ink stroke representations.

2. Description of Related Art

Pen-based computers in which the pen replaces the keyboard and/or mouse as the primary input device have become well known. Such systems provide a digitizing pad and pen for the user to input information. The information is input in the form of strokes or graphic representations of strokes. The computer monitors the movement of the pen and creates a stroke when the pen comes within a predefined proximity of or in contact with the digitizing pad. The computer follows the movement of the pen across the digitizing pad while simultaneously extending the stroke, and ends the stroke when the pen is removed or moved out of proximity from the digitizing pad.

While programs have been created for converting pen-based input into characters, they are limited because they have problems dividing the input where the user enters several strokes just as if he/she were writing upon a blank sheet of paper. One particular problem is the recognition of dashes and bullets commonly used in lists and outlines. Particularly, bullet characters filled in with multiple strokes are rarely recognized correctly. These characters are not only difficult to recognize, but existing recognition systems require an inordinate amount of time to perform such recognition. For example, there are currently no character recognition systems that can recognize characters "on the fly" as the user is inputting the ink strokes into the system. Thus, the user is forced to wait while the system processes a stroke input, before additional strokes can be input. Therefore, there is need for a system and methods for quickly and easily recognizing ink strokes such as bullets and dashes, or performing recognition in the background and managing the processing resources.

One of the major problems for users of pen-based systems is managing space. In most pen-based computers, there is no grouping of the ink strokes by paragraph, line or word to allow the user to perform standard word-processing functions. Most computers do not separate ink strokes into words because the spacing between characters can vary greatly depending on the writing style of the person inputting the data. Moreover, the pen is typically the only input device in pen-based systems, and space cannot be input by selecting a space or return key. Thus, it is difficult to manage the space between words on the same line or the number of lines between words on different lines. Therefore, there is a need for a means that allows the user to insert and remove space in a pen-based computing system.

Most prior art systems have attempted to resolve this problem by providing dedicated gestures, or two step gesture methods that add space or remove space from between electronic representations of strokes. However, such prior art approaches have not been successful at resolving the space problem for a variety of reasons. One reason is that the gestures are not easily discoverable. In other words, the user must memorize gestures or specific manipulations of the pen or input device that are not well known and not intuitive as to the function that will be performed. Another reason is that gestures are difficult for the user to input; they are complex gestures that require a very specific manipulation of the input device. The input device must often be manipulated several times before the gesture is correctly input. Yet another problem with existing space gestures is that the inputs are not always correctly recognized as space management gestures. When the gestures are not correctly recognized, they are interpreted as ink strokes which forces the user to perform even more steps to remove the ink strokes. Moreover, it is particularly difficult with gestures to determine the point between which ink strokes where space will be added or removed. Thus, there in a need for a system and method for adding and removing space in pen-based computer system that is easy to use.

Another problem with existing computing systems is the ability to interchangeably use different types or modes of operation such as word-processing functionality and drawing/graphic functionality. Particularly in programs that provide a seamless transition between application programs or modes of operation in a single application program, it is difficult for the user to identify the mode in which he or she is operating. This is problematic because each mode of operation provides commands and may respond differently to the same inputs. For example, a particular command or gesture may perform a first action if the user is operating on a drawing element or item and perform a second, completely unrelated and different action if the user is operating on a word processing element or item. Notifying the user of the commands available to manipulate a stroke is particularly problematic because it is often very difficult for the user to determine whether a stroke is associated with word-processing functionality or drawing/graphic functionality. Therefore, there is need for a system that provides the user with feedback as to the current mode of operation.

Yet another shortcoming of existing pen-based computer systems, is that they suffer from major performance problems for storage, display and printing of ink stroke representations. As the user manipulates the input device over the digitizing pad, a great number of points are generated as the input data forming a single stroke. The amount of memory required to store the data forming several strokes is very large, therefore, pen-based systems require significant amounts of random access memory (RAM) and disk space. The processing of the input data is also very computationally intensive because of the large number of points forming each stroke. Thus, the processing of the ink stroke representations to perform character recognition, to display the strokes on the display device, or even to print the strokes on a hard copy device requires significant amounts of time. Therefore, there is a need for a system and method that can reduce the amount of time required to display, print or perform character recognition on ink stroke representations, as well as reduce the storage requirements for the user.

SUMMARY OF THE INVENTION

The present invention overcomes the limitations and shortcomings of the prior art with an improved system and method for spacing, storing and recognizing electronic representations of handwriting, printing, computer text, bit maps, and drawings. The system of the present invention comprises a central processing unit that couples with a display device, an input device, and a memory. The memory includes means for spacing ink stroke representations, means for recognizing outline elements, means for performing deferred recognition, means for highlighting drawing areas and means for storing and displaying ink stroke representations. These means operate together to provide a pen-based computer system with improved performance and added functionality for manipulating the space between ink stroke representations. The present invention is particularly advantageous because the means for spacing ink stroke representations provides the user with a tool that can be easily manipulated and that notifies the user as to the amount of space that will be added or removed.

The preferred embodiment of the present invention comprises a plurality of novel methods that provide this functionality such as: a method for managing space between ink stroke representations, a method for displaying drawing elements in a visually distinct manner, a method for recognizing bullets and dashes, a method for storing ink stroke representations, a method for displaying and printing ink stroke representations, and a method for performing deferred character or word recognition. The methods of the present invention are particularly advantageous because the methods for storing, printing and displaying ink stroke representations greatly improves overall system performance by reducing the amount of memory required to store ink stroke representations, and by reducing the amount of time required to render ink stroke representations on a display device or on a printer.

BRIEF DESCRIPTION OF THE DRAWINGS

FIGS. 10A, 10B, and 10C are graphical representations of a screen display illustrating standard paragraph parsing, bullet paragraph parsing, and list paragraph parsing, respectively.

FIGS. 12A, 12B and 12C are a flowchart of a preferred method for performing a space action given a pen up and pen down event;

FIGS. 16A and 16B are graphical representations of a screen display showing a selected shape type figure and a selected line type figure, respectively;

DETAILED DESCRIPTION OF THE PREFERRED EMBODIMENTS

Figure 1:
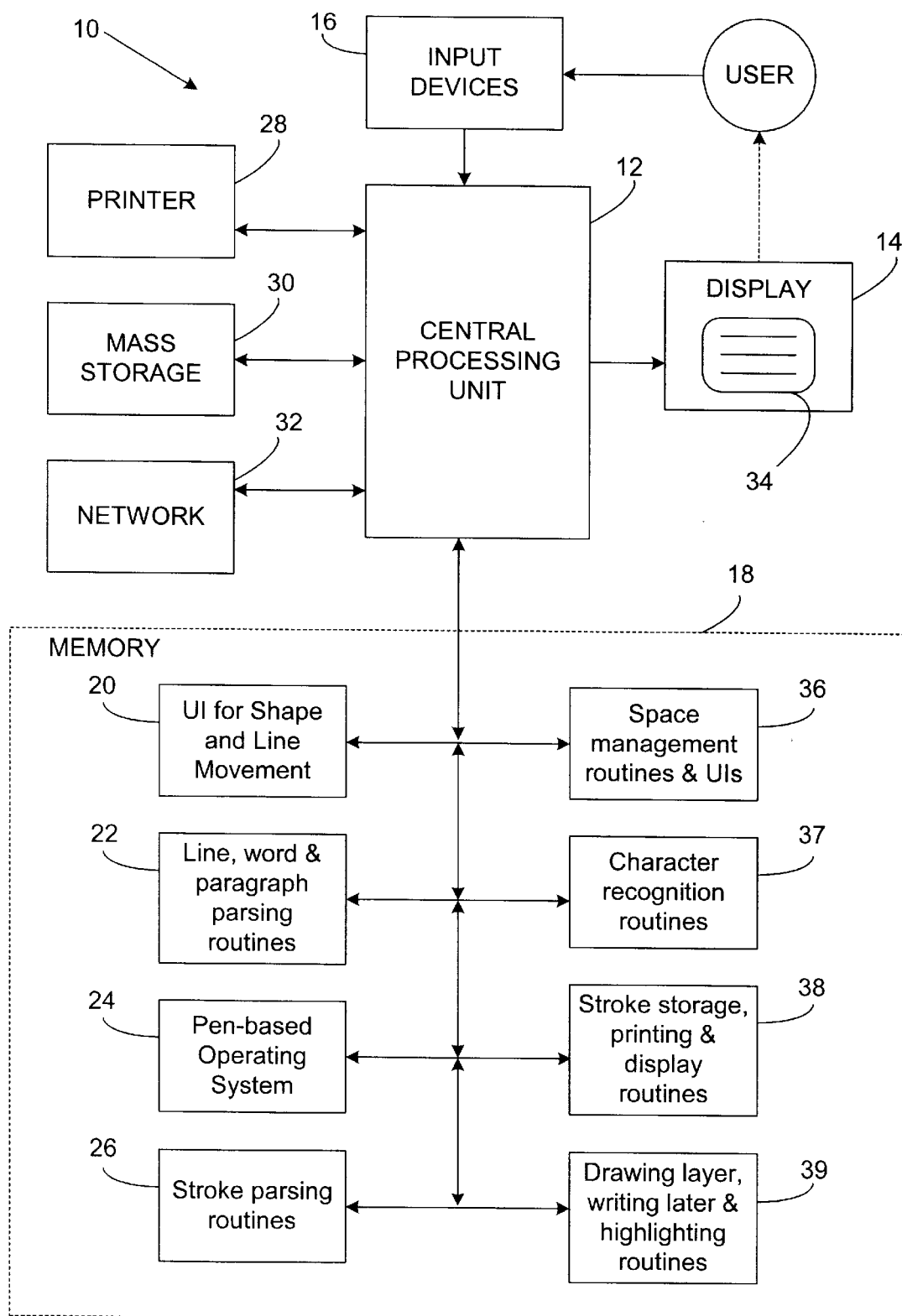
FIG. 1 is a block diagram of a preferred embodiment for the pen-based computing system of the present invention.

In accordance with the present invention, an apparatus 10 for storing, manipulating and recognizing electronic representations of handwriting, printing, and drawings in accordance with the present invention is shown in FIG. 1. The apparatus 10 of the present invention comprises a central processing unit 12 (CPU) that couples with a display device 14, an input device 16, and a memory 18. The memory 18 preferably includes random access memory (RAM) and read-only memory (ROM). The CPU 12 is also coupled to a printer 28, mass storage 30, and a network 32 in a conventional manner. In an exemplary embodiment, the system 10 is an NCR 3125 pen-based computer. Those skilled in the art will realize the system 10 may also be any one of a variety of computers such as those manufactured and sold by IBM and Apple Computer.

Electronic ink stroke data is stored in the memory 18 along with program routines 20, 22, 26, 36, 37, 38, 39 and a pen-based operating system 24. The CPU 12, under the guidance of instructions received from the memory 18 and from the user through the input device 16, creates and displays representations of drawing figures, handwritten text, printed text, and formatted characters produced from codes. The user preferably creates ink strokes by manipulating a pen-type input device 16 or stylus over the screen 34 of the display device 14. The display device 14 further comprises a digitizer or equivalent device for sensing the movement and proximity (or a time out condition after a period of no movement) of the pen-type input device 16. Movement of the input device 16 over the display device 14 as well as in and out of proximity from the display device 14 produces a series of points or data forming an ink stroke representation (ink stroke). The input device 16 can also include a conventional keyboard and mouse type controller, a pressure sensitive device, or a digitizing pad that is not integrated as part of the display device 16. While the operation of the present invention is described below primarily with reference to pen events, pen up events, pen down events, and pen position because the preferred embodiment of the system is a pen-based computer, the present invention can also be used in systems that rely on cursor events, depression of the mouse button events, release of the mouse button events, and cursor position, or various combinations of such input data or events received from various types of input devices.

The CPU 12 uses the stroke parsing routines 26 and writing parsing routines 22 to translate the ink strokes input by the user. The present invention preferably provides for the use of ink capture mechanisms and pen gestures for the manipulation of ink strokes and character codes by including the pen-based operating system 24. In an exemplary embodiment, the pen-based operating system 24 is Windows for Pen Computing made by Microsoft Corporation of Redmond, Wash. In an alternate embodiment, the pen-based operating system 24 may be the PenPoint Operating System sold by EO Corporation of Santa Clara, Calif. The user interface routines 20 and CPU 12 are also used to create a user interface for displaying information on the display 14. Those skilled in the art will be aware that various equivalent combinations of devices can achieve the same results when used in accordance with the present invention. For example, while the memory blocks are shown as separate, they can easily comprise different regions of a contiguous space in memory. Also, the present invention may also be used with traditional desktop computers and a mouse or track ball being used as the input device 16.

The memory 18 further comprises space management routines and user interfaces 36, character recognition routines 37, stroke storage, printing and display routines 38, and the writing layer, the drawing layer and routines 39 for highlighting strokes associated with a drawing layer.

The space management routines and user interfaces 36 provide a means for adding or removing space between ink stroke representations. The space management routines control the CPU 12 to display an easy to use and unique interface that provides the user with a visual indication as to the amount of space that will be added or removed. The character recognition routines 37 are provided to improve performance of the pen-based system 10 in converting strokes to conventional computer representations such as ASCII codes. The character recognition routines 37 are dedicated routines for particular characters that are difficult to recognize or for which character recognition requires significant time. The character recognition routines 37 also include conventional character recognition routines for processing ink stroke representations to identify possible ASCII equivalents, other than the characters with dedicated routines. The character recognition routines 37 also include a means for performing the character recognition some time after the ink stroke representation are input. The stroke storage, printing and display routines 38 are also provided to further enhance system performance with methods for the CPU 12 to efficiently and quickly store the data for an ink stroke representation, as well as modify the stored data for printing or displaying the strokes in less time without any noticeable degrading in display or print quality. Routines 39 for highlighting strokes associated with a drawing layer are also provided by the system 10 to notify to user as to which ink stroke representations have been associated with a drawing layer and are thus manipulatable as drawing elements, and which ink stroke representations have been associated with a writing layer and are thus manipulatable as printing or text. Each of these routines is discussed in more detail below with reference to a particular flowchart.

The system 10 and methods of the present invention are particularly advantageous because they provide an environment with the full functionality of a word-processing program and a drawing program. For example, the user can enter either drawing strokes or writing strokes, and the system 10 will process the strokes automatically. Moreover, the present invention provides a consistent user interface for both the word-processing functionality and the drawing functionality. The present invention advantageously presents a series of parallel horizontal lines on the display device 14 to represent lines similar to those on a sheet of paper. While the lines are preferably horizontal, those skilled in the art will recognize that the lines may also be vertical for languages such as Japanese, or may even be eliminated by using a blank screen representing a blank sheet of paper. These lines are used in determining the nature (drawing or writing) of an ink stroke, as well as for aligning the display of words. The present invention preferably has an architecture that provides two layers to process and store ink strokes apart from the display of strokes on the screen 34. Each of these layers provides a virtual space/layer for each page displayed on the display device 14. First, the present invention provides a drawing layer 39 for processing and storing ink strokes that are found to be more similar to drawing gestures and figures. This layer 39 provides functionality similar to a conventional computer drawing program. Drawing strokes are treated separate from writing strokes to allow manipulations based on the context of drawing. Second, the present invention provides a writing layer 39 for processing and storing ink strokes that are found to be more similar to cursive handwriting or printed text. The writing layer 39 provides the functionality of a word-processing program, however, it operates on ink strokes as well as more traditional computer codes representing characters such as ASCII. In the writing layer, strokes are grouped as words for wrapping, deleting, moving, copying and translating.

Figure 2A:
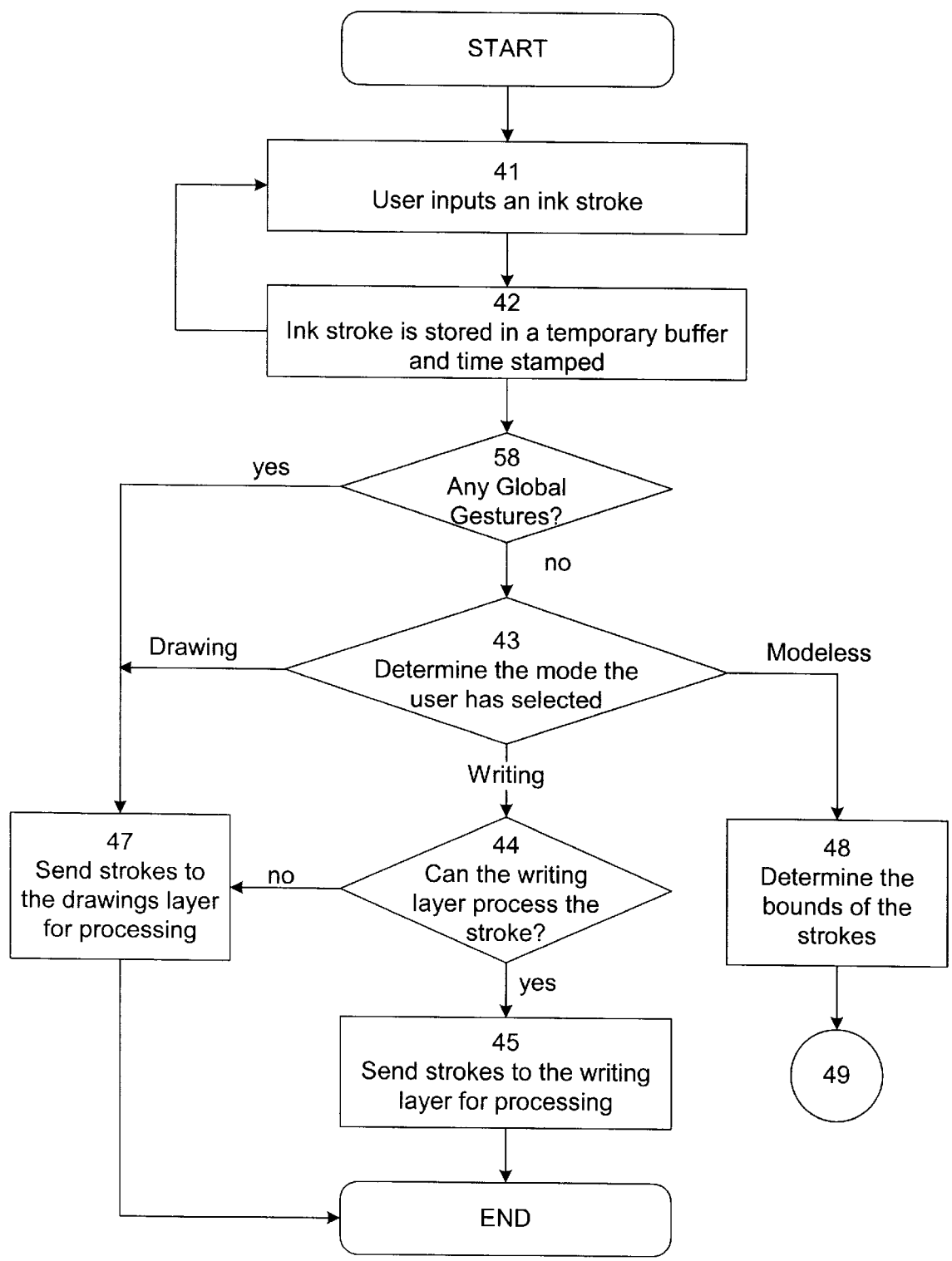
FIGS. 2A and 2B are a flowchart of the preferred method for processing ink strokes input to the pen-based computing system of the present invention.
Figure 2B:
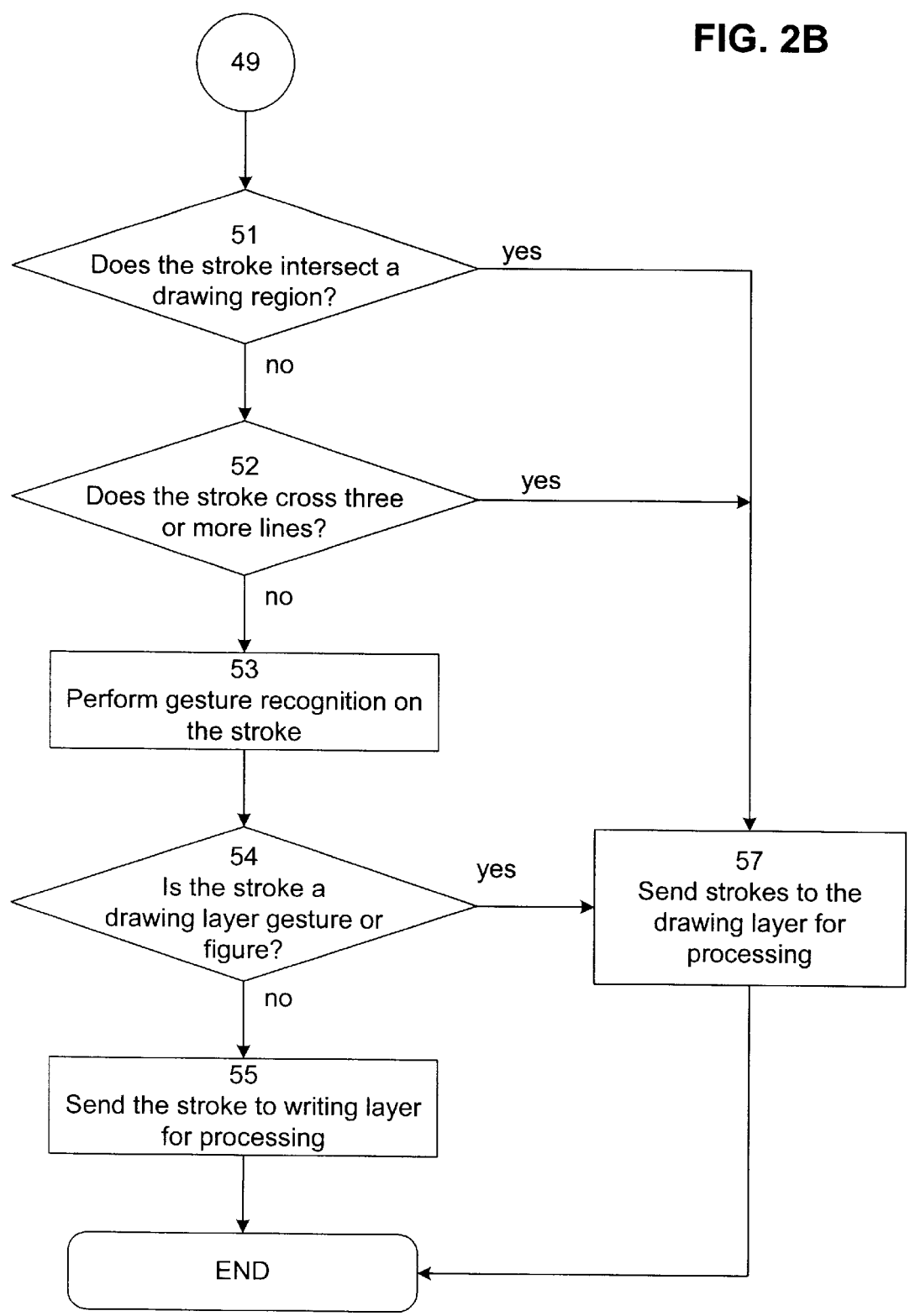

Referring now to FIGS. 2A and 2B, a preferred method for the operation of the system 10 of the present invention will be described. The note taking system advantageously provides three modes of operation: the writing mode, the drawing mode, and the smart ink mode. The mode may be selected by user manipulation of the input device 16 to select one of the three operational modes from buttons on a menu bar. In the writing mode, all the strokes are passed to the writing layer 39 for further processing. Similarly, in the drawing mode, all the strokes are passed to the drawing layer 39 for further processing. In the smart ink mode, the note taking system 10 automatically determines whether the writing layer 39 or the drawing layer 39 should process the ink stroke depending on the type of information being input. Under any of the modes, the system 10 allows the user to process and manipulate some ink strokes with the drawing layer 39 while processing other strokes with the writing layer 39. However, for each definable area or region of the display, it is designated either a drawing region, a writing region, an undeclared region, or an overlapping writing and drawing region.

The operation of the note taking system can be understood with reference to FIGS. 2A and 2B. The process begins in step 41 with the user entering an ink stroke with the input device 16. In step 42, the ink stroke is preferably time stamped to identify the order in which strokes are input into the system, and then stored in a temporary buffer. For example, the ink strokes may be stored in the buffer in the order received. Additional strokes can be input and stored as the system 10 loops through steps 41 and 42. After a predetermined amount of time with no input, once the buffer is full, or once the pen 16 goes out of proximity, the system 10 proceeds to step 58 to determine whether any of the strokes entered are global gestures, such as a gesture for undo. These global gestures are targeted to the operating system layer as a default for handling. Thus, as a global gesture is entered the method jumps to step 47 for processing by the drawing layer, otherwise the method continues in step 43. Next in step 43, the method determines the mode of operation that the user has selected. If the writing mode is selected, then the process continues in step 44 where the system 10 tests whether the strokes can be processed by the writing layer. Certain strokes and gestures can only be processed by the drawing layer. Therefore, the present invention first tests whether the writing layer can process the stroke. All strokes that can be processed by the writing layer are sent to the writing layer in step 45, and the process ends in step 46. Any other strokes that the writing layer cannot process are sent to the drawing layer, and the process ends. If the drawing mode is selected, then the process moves from step 43 to step 47 where the strokes stored in the temporary buffer are sent to the drawing layer for further processing as described below, and the process ends.

The present invention advantageously provides the third mode of operation, the smart ink mode, that automatically determines whether to treat the incoming strokes as drawing or writing strokes. If the smart ink mode is selected, then the present invention determines the bounds of the stroke in step 48. Next in step 51, the system 10 tests whether the stroke is being made over a region of the display already designated as a drawing region. The method could also operate if any stroke was near an already designated area. For example, near may be defined to be within 1 line height. The present invention advantageously assumes that if a stroke of a particular type has already been drawn in the region, then the user is probably inputting strokes of the same type. Thus, if the stroke is found to be over or intersecting a drawing region in step 51, all the strokes are passed to the drawing layer in step 57 and the process ends. However, if the stroke input is not found to be over or intersecting a drawing region (e.g., in a text region or in an undeclared region) in step 51, then additional features of the stroke are considered in step 52. In step 52, the system 10 tests whether the stroke extends across three lines vertically. A line height is determined to be the vertical distance between displayed lines present on the screen 34 by the preferred system as a guideline for a line of hand writing. In the preferred system, the user may adjust the spacing between the display lines drawn by the system 10 on the screen 34 using the input device 16 and menu or buttons. For example, the line height may be defined in a variety of types of units such as inches, centimeters or points of a printing type. The present invention advantageously assumes that strokes that cross three or more lines are most likely drawing strokes and not writing strokes. Those skilled in the art will realize that the present invention may be modified to test for other vertical dimensions such as 1.5 line heights or 2.5 line heights. Thus, if the stroke is longer than two line heights, the stroke is processed by the drawing layer in step 57. However, if the stroke is not taller than two line heights, gesture recognition is performed on the stroke in step 53. Conventional character recognition techniques may be used to identify the drawing layer gestures in step 53 or any global gestures as determined in step 58. Then in step 54, the system tests whether the stroke is a drawing layer gesture or a figure. The present invention advantageously identifies the gestures and other strokes that are most likely to be drawings with a horizontal line being an example. Another example of a gesture processed by the drawing layer includes the use of "plus." Those skilled in the art will realize that a variety of other gestures could be added to the list of gestures processed by the drawing layer. If the stroke input matches any of these gestures, the stroke is sent to the drawing layer for further processing in step 57. Otherwise, the stroke or gesture is assumed to be printing or cursive writing, and is sent to the writing layer in step 55 for further processing.

Figure 3:
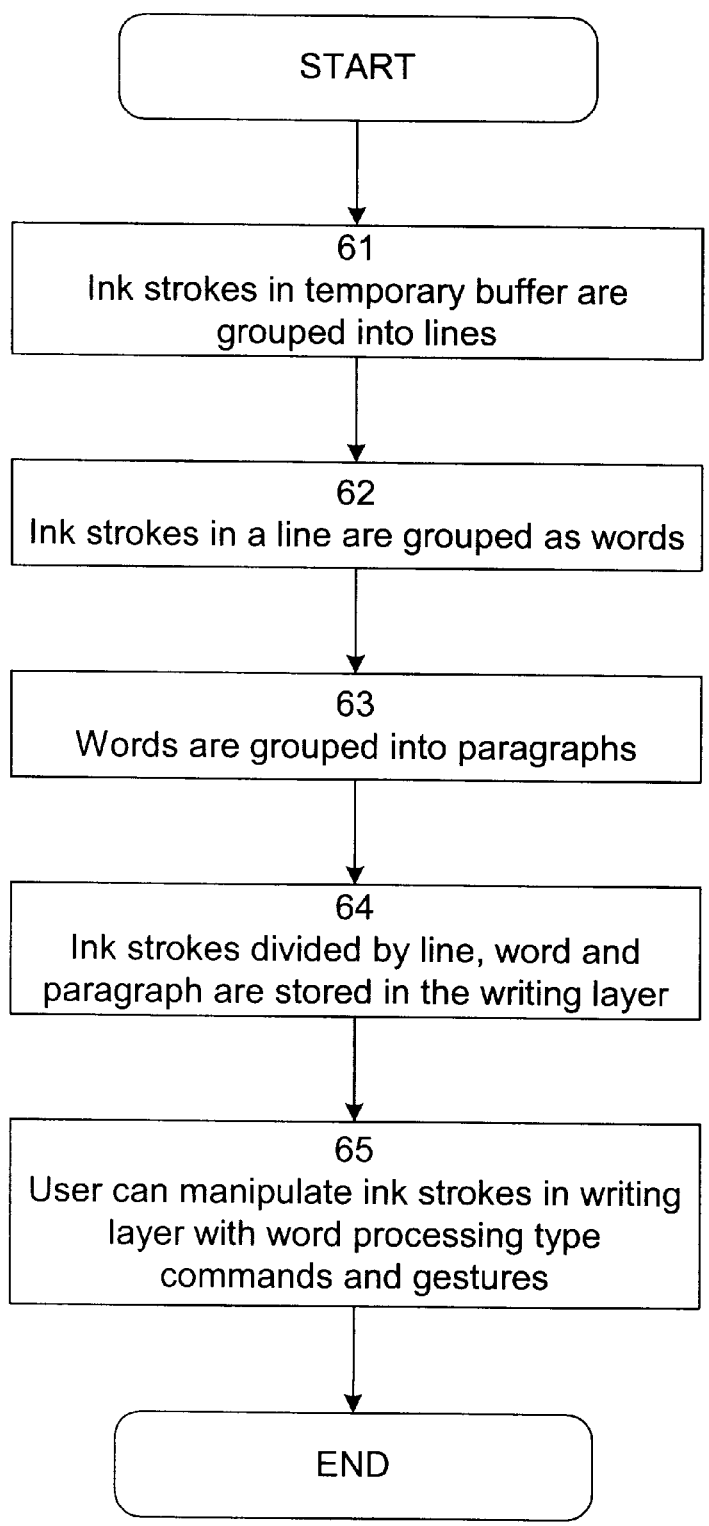
FIG. 3 is a simplified flowchart of the preferred method for processing ink strokes in the writing layer of the present invention.

Once the stroke has been sent to the proper layer, it undergoes additional processing. Referring now to FIG. 3, an overview of the processing performed in the writing layer is shown. First, the ink strokes are grouped into or associated with lines in step 61. A line operates just as a normal writing line on a ruled sheet or paper, and is defined to be the area between two displayed lines drawn by the system 10 on the screen 34. Then, the ink strokes associated with each line are grouped into words in step 62. Next in step 63, the words are grouped into paragraphs. Once the ink strokes have been properly grouped, they are stored in the writing layer in step 64. Finally in step 65, the ink strokes can be manipulated with word-processing type commands to provide word wrapping, or deletion, movement, or translation by line, word or paragraph. The user might also adjust the paper size, the window size, paragraph indents, or the margins causing the writing to be wrapped to fit to space provided.

Figure 4A:
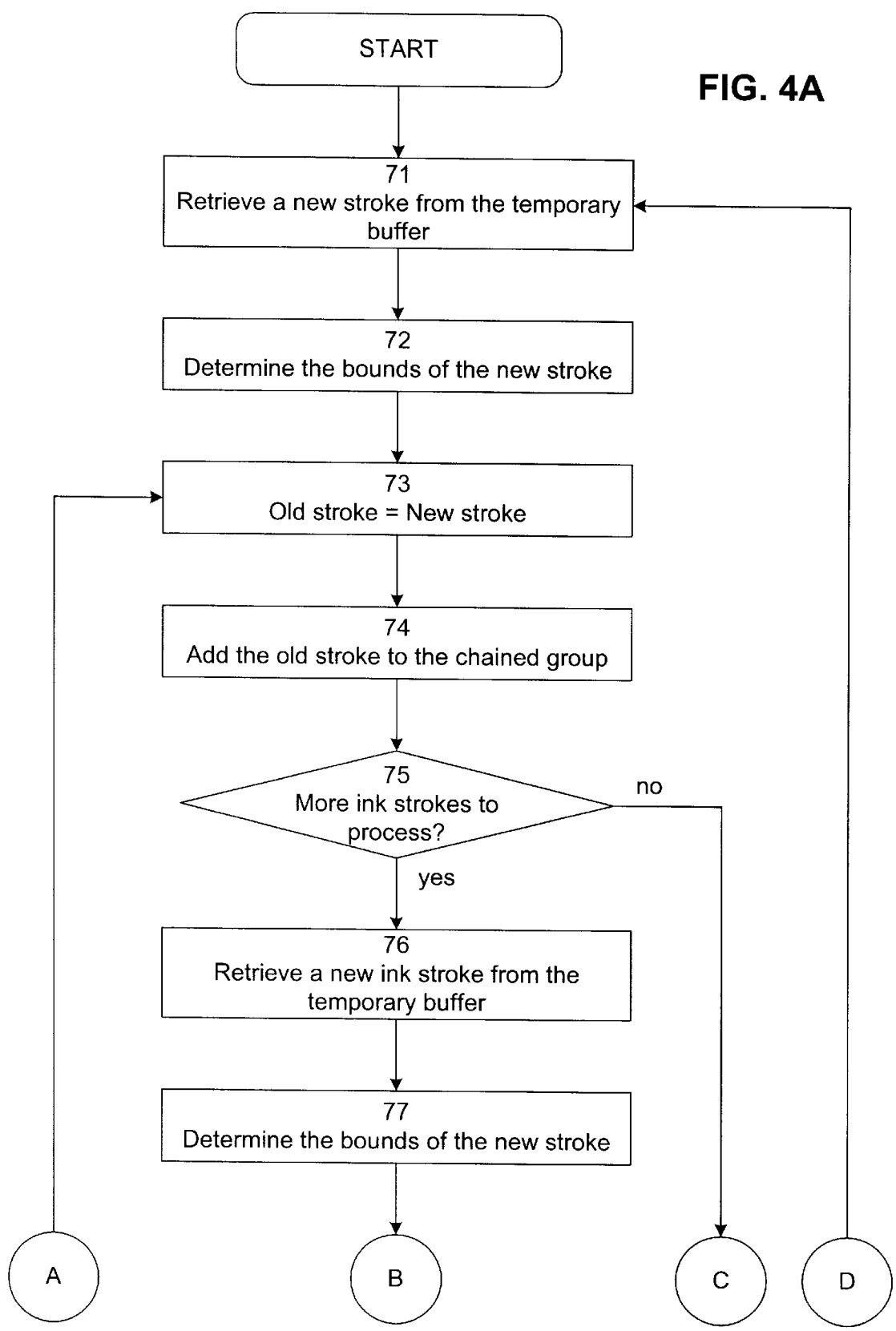
FIGS. 4A and 4B are a flowchart of the preferred method for processing ink stroke inputs into lines according to the present invention.
Figure 4B:
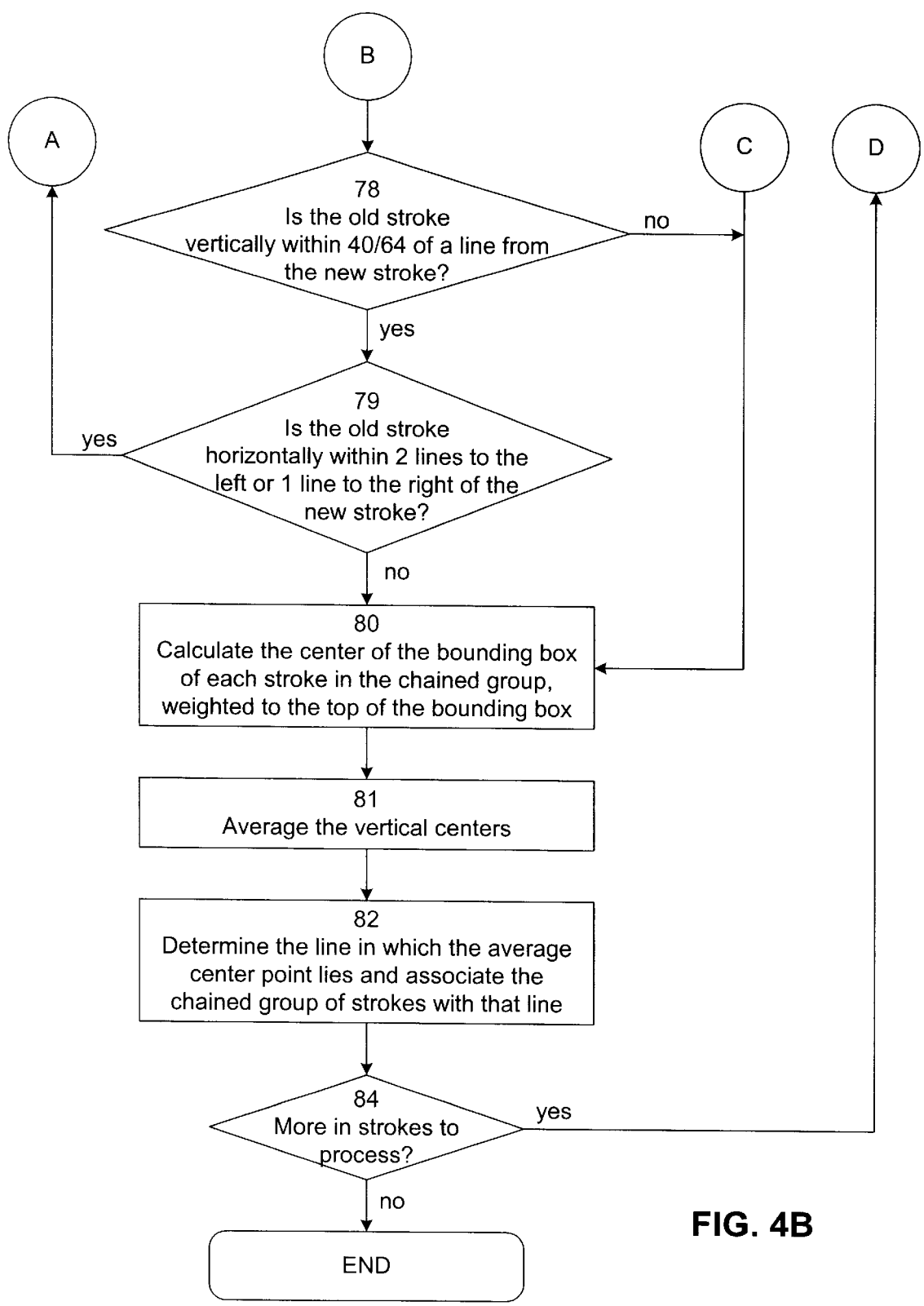

Referring now to FIGS. 4A and 4B, the preferred method for parsing the ink strokes in the writing layer to determine which line the strokes should be associated with (step 61 of FIG. 3) will be described. The present invention advantageously determines one by one whether the strokes should be grouped together. Under the present invention, strokes are gathered from the instant when the pen 16 is in proximity with the display 14 until the instant when the pen 16 leaves proximity with the display 14, or from the time the first stroke is out condition expires with no strokes being input for a predetermined amount of time. The individual strokes are gathered when the pen 16 is in contact with the display. The gathered strokes are then stored in the temporary buffer and subject to the process outline in FIGS. 4A and 4B.

Figure 5A:
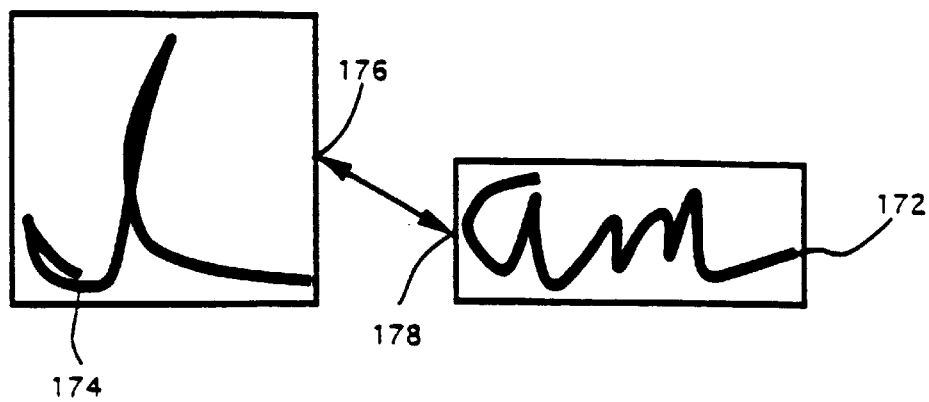
FIGS. 5A and 5B are graphical representations of a screen display showing strokes with bounding boxes and the distance used for calculating a chain link.
Figure 5B:
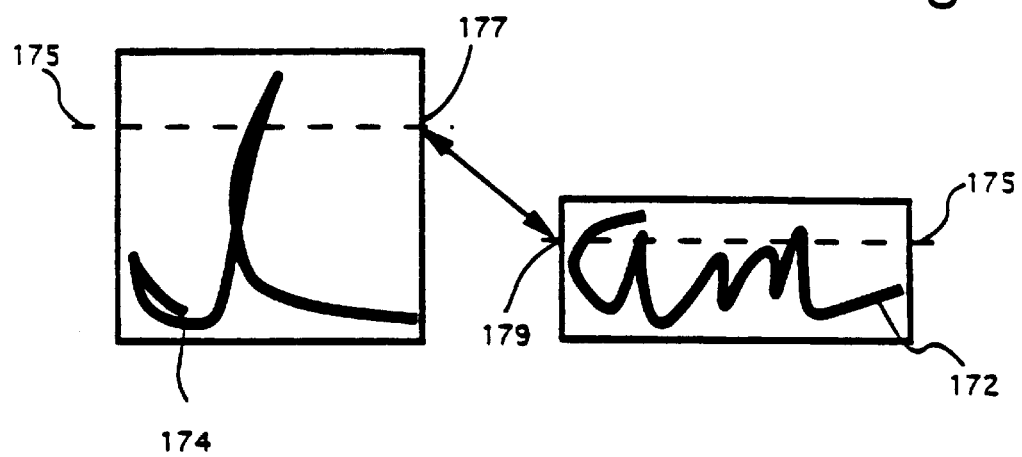

The preferred process begins in step 71 by retrieving a new stroke from the temporary buffer. The strokes are retrieved in chronological order beginning with the first stroke that was first stored in the temporary buffer and ending with the stroke that was the last to be stored in the temporary buffer. Next, the bounds of the new stroke are determined in step 72. In step 73, the old stroke is defined to be the new stroke just retrieved, and the old stroke is added to the chained group in step 74. The present invention first divides the strokes into chained groups, and then associates all the strokes in a chained group with a line. Next, in step 75, the system tests whether there are any more strokes to process. If not the chained group is complete, the strokes form a chained group, and the process jumps to step 80. However, if there are additional strokes, the process continues in step 76. In step 76, the next stroke is retrieved from the temporary buffer, and its bounds are determined in step 77. Next, the method proceeds to test whether the chain between the new stroke and the old stroke is broken. In one embodiment, a link of the chain between strokes 172, 174 starts half-way up the right side of the bounding box 176 for the left stroke 174 and extends to half-way up the left side of the bounding box 178 for the right stroke 172 as shown in FIG. 5A. In a second embodiment, a link of the chain between strokes 172, 174 starts at the waterline 175 of the right side of the bounding box 176 for the left stroke 174 and extends to the waterline 175 of the left side of the bounding box 178 for the right stroke 172 as shown in FIG. 5B. The determination of the waterline 175 for a stroke will be discussed in more detail below with reference to FIG. 6. The chain is deemed to be broken if it the chain extends too far above, below, to the left or to the right. In an exemplary embodiment, the chain between strokes is broken if the chain extends up about more than ¾ of a line height, down more than about ¾ of a line height, to left more than two line heights, or to the right more than one line height. Those skilled in the art will recognize that other values may be used in each direction. For example, the values may be varied depending on the size of the writing or whether the strokes are in cursive or print.

Referring back to FIG. 4B, steps 78 and 79 test whether the new stroke and the old stroke are chained together. In step 78, the method first tests whether the centers of adjacent sides of the bounding boxes for the old stroke and new stroke are vertically within ¾ of each other. If they are, the method continues with step 79, otherwise the method continues with step 80. In step 79, the method tests whether the right side of the bounding box for the old stroke is horizontally within 2 line heights to the left or within 1 line height to the right of the right side of the bounding box for the new stroke. If either condition is true, the new stroke and the old stroke are chained together, then the process returns to step 73 to add the new stroke to the group of chained strokes and retrieve the next new stroke for processing. However, if the chain is broken, the process continues in step 80.

In step 80, the vertical center for each stroke in the chained group is determined. These vertical centers are then used in step 81 to determine an average vertical center for the chained group. In one embodiment, the strokes are weighted towards the top of the stroke to ensure that words such as "pig" or "pray" are associated with the correct line. For example, the strokes can be weighted by multiplying the top coordinate of each stroke by 2, adding the bottom coordinate and then dividing the total by three [(2*top+ bottom)/3] to determine the weighted vertical center. All the strokes in the chained group are then associated with the line in which their average weighted vertical center lies in step 82. Finally, the method tests whether there are more strokes to process in step 84. If there are, the process returns to step 71 and begins forming a new chain group. Otherwise, the line parsing process is complete and ends.

Figure 6:
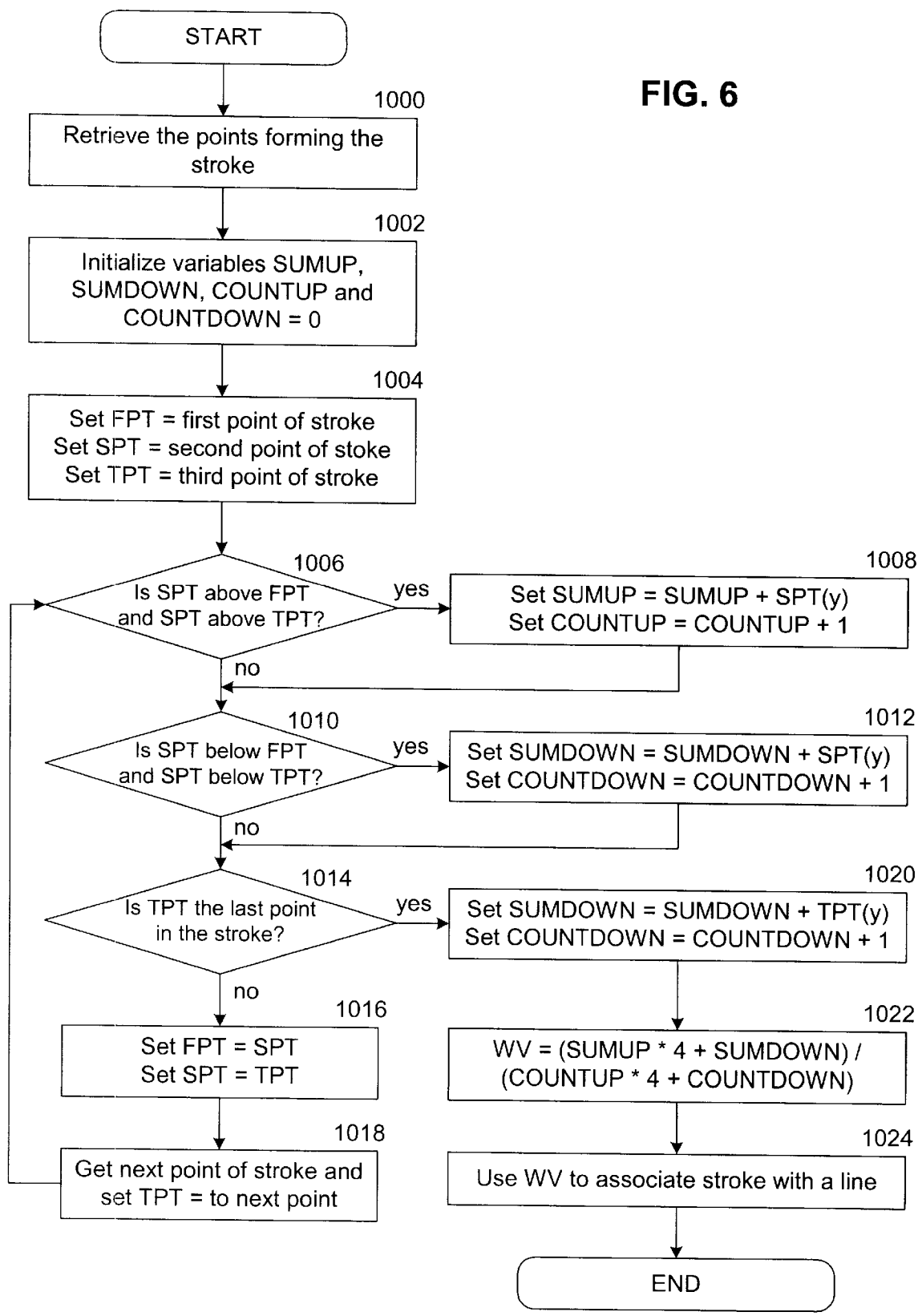
FIG. 6 is a flowchart of an alternate method for associating an ink stroke with a line in accordance with the present invention.

In a second embodiment, the association of strokes to lines may also be performed using the points defining the strokes. In particular, steps 80 and 81 may be replaced with the steps of determining a waterline for a stroke and associating the stroke with the line in which the waterline of the stroke lies, respectively. Referring now to FIG. 6, a method for determining a waterline for a stroke is shown. The method determines the inflection points (peaks and valleys) in the stroke, and then produces a waterline value (WV) or weighted vertical center that weights the vertical center upward or downward according to the number and amplitude of the inflection points. The alternate method begins by retrieving the points forming a stroke in step 1000. Then in step 1002, the alternate method initializes to zero the variables SUMUP, SUMDOWN, COUNTUP, COUNTDOWN used in the weighting process. The SUMUP variable is used to store a total of the amplitude of the peak inflection points, the SUMDOWN variable is used to store a total of the amplitude of the valley inflection points, the COUNTUP variable is used to store a total of the number of peak inflection points, and the COUNTDOWN variable is used to store a total of the number of valley inflection points. Next in step 1004, the method sets a variable FPT to be the first point of the stroke, a variable SPT to be the second point of the stroke, and a variable TPT to be the third point of the stroke. In step 1006, the method tests whether the y-coordinate of the SPT is above or greater than the y-coordinate of the FPT, and whether the y-coordinate of the SPT is above or greater than the y-coordinate of the TPT. If both conditions are true, then the SPT represents a peak inflection point, and the method performs step 1008. In step 1008, the y-coordinate of the SPT is added to the current value of SUMUP and the COUNTUP is incremented by one. After either step 1006 or 1008, the alternate method tests in step 1010 whether the y-coordinate of the SPT is below or less than the y-coordinate of the FPT, and whether the y-coordinate of the SPT is below or less than the y-coordinate of the TPT. If both conditions are true, then the SPT represents a valley inflection point, and the y-coordinate of the SPT is added to the current value of SUMDOWN and the COUNTDOWN value is incremented by one in step 1012. After either step 1010 or 1012, the method determines whether the TPT is the last point defining the stroke. If the TPT is not the last point, the process moves to step 1016 where the FPT is set to be the SPT, and the SPT is set to be the TPT. Then in step 1018, the next point forming the stroke is retrieved and the TPT is set to be the retrieved point. The method then returns to step 1006 to test whether the current SPT is a peak or valley. Thus, the process loops through the points forming the stroke to determine the peak and valley points and determine their number and amplitude. If the method determined in step 1012 that the TPT was the last point in the stroke, then the method adds the last point in the stroke to SUMDOWN total and the COUNTDOWN is incremented by one in step 1020. This is particularly advantageous because the last point is always counted as a valley. This provides a more accurate line targeting for natural language writing because it suppresses the endpoint's influence on the weighting value. Next, the method continues in step 1022. In step 1022, the method calculates the waterline value, WV. which is a vertical coordinate as:

$$WV = \frac{SUMUP*4 + SUMDOWN}{COUNTUP*4 + COUNTDOWN}$$

In this exemplary embodiment, the weighting value will shift the vertical centers of the strokes upwards since the SUMUP value has been weighted four fold in comparison to the SUMDOWN value. After the weighting value has been determined in step 1022, the method proceeds to step 1024 where the waterline value is used to associate the stroke with a line, similar to the methodology described above with respect to steps 81 and 82. While an upward weighting has been used in step 1022, those skilled in the art will realize that the values stored in the variables SUMUP, SUMDOWN, COUNTUP, and COUNTDOWN may be used in a variety of other equations to provide weighting as desired. Moreover, those skilled in the art will realize that noise avoidance schemes may be used in conjunction with this alternate method to remove noise produced by the input device 16 and the display device 14 that introduces additional inflection points. For example, additional tests could be added to steps 1006 and 1010 to ensure that the peak or valley has at least a predetermined amplitude, such as ⅒th of line height, before it is added to the SUMUP or SUNDOWN.

The present invention also includes several special case methods for ensuring that strokes are associated with the correct line. For example, the tap can be used to select a drawing element/stroke or set an insertion caret, which is desirable because it is a quick gesture and is similar to the click of a mouse. However, the same input stroke, a tap, is used to dot an "i" or add a period. Fuzzy logic is used to interpret the inputs including the time duration of the tap (Short for a tap, long for a stroke); the number of points gathered (Few for a tap, many for a stroke); and the maximum of the height and width of the bounding box of the tap (Short for a tap, long for a stroke). The fuzzy rules determine whether to call the motion a tap gesture or ink stroke. The method also considers if the tap type stroke is made above any ink on the line; if so, then it is biased to be ink rather than a tap. If the tap type stroke has ink stroke(s) above and below it, or does not have ink stroke(s) either above or below it, then the tap is biased toward being a gesture rather than a stroke. Another special method is used to associate line(s) with comma(s) or period(s). In particular, the single strokes of commas and periods are often made below the line intended. If the punctuation is made within a fixed tolerance of the bottom right corner of a word, the method lifts the punctuation up into the correct line. Such strokes are also biased toward being ink rather than a tap gesture. Yet another special case method is used to ensure that punctuation is associated with the correct line. In a preferred embodiment, this special case method has priority over any waterline level or determination that may be made for a stroke. First, this special case method tests if the stroke is less than half a line height both vertically and horizontally. If so, the top of the stroke plus ¹⁄₂₄ of a line height is used as the coordinate to target the stroke to a particular line.

Once the strokes have been associated with a line, they are passed to the word parsing method (step 62 of FIG. 3). A preferred method of the present invention defines stacked horizontal bands for each stroke or group of strokes for use in this band bumping method. The bands indicate the leftmost and the rightmost extent of a stroke at the vertical position of the band. The bands are preferably stacked vertically with eight bands per line. The present invention advantageously calculates bands for the current line and also the preceding line and the following line. These bands allow the present method to identify words, despite the slanting of line strokes common in many writing styles. In an exemplary embodiment, eight bands are calculated per line for three lines for a total of 24 bands. Furthermore, as strokes are grouped into characters and words, bands for the union of the strokes, characters or words are calculated. This banding information is used to calculate "delta" and "overlap." Delta is preferably the distance between the bounding boxes of the previous word and the bounding boxes of the current word. Overlap is the average distance between the three bands of the previous word and the three bands of the current word that are closest together. If less than three bands have strokes entering them, then for each strokeless band, a default distance of half a line height is used in the calculation of the overlap.

Figure 7A:
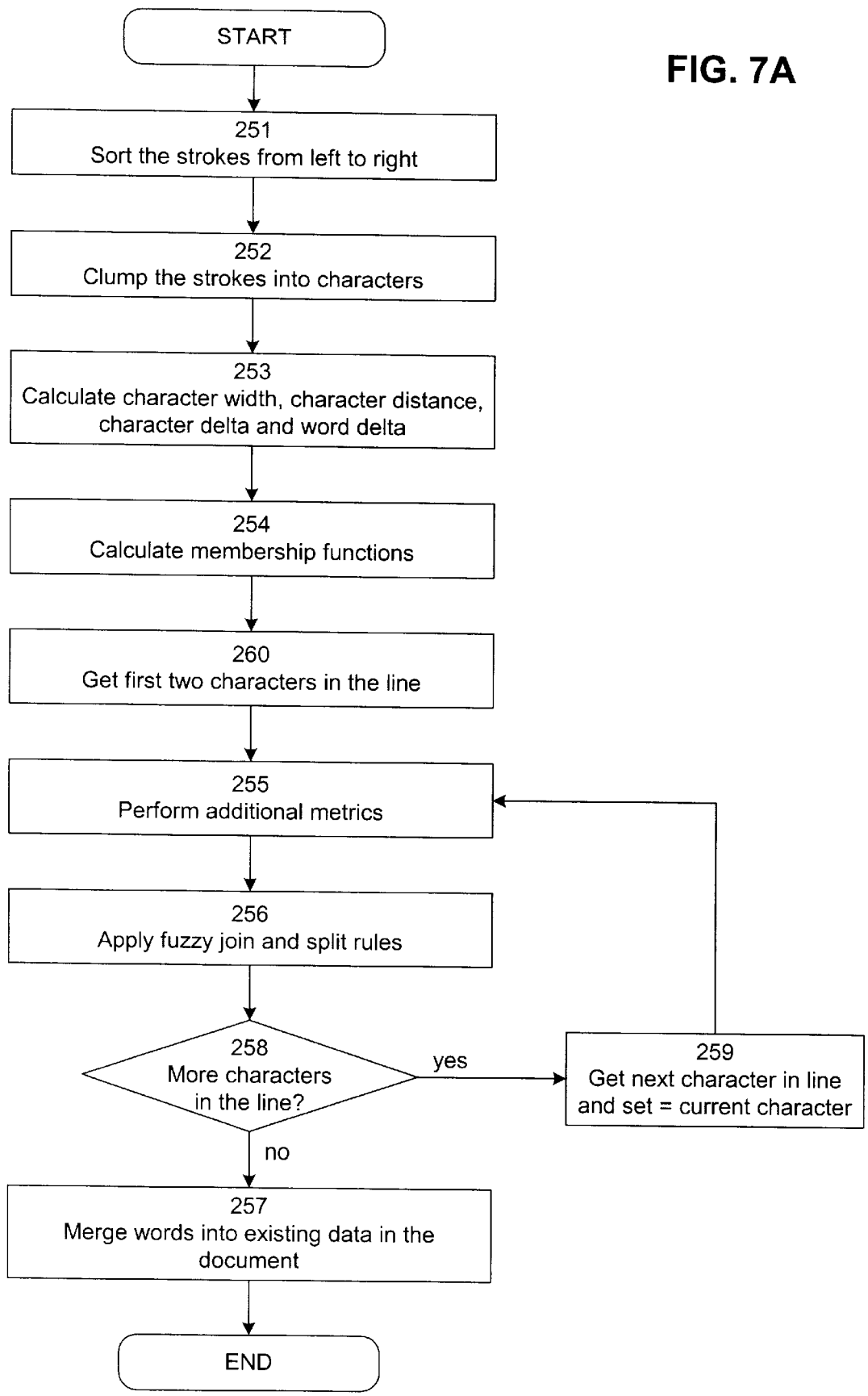
FIG. 7A is a flowchart of the preferred method for processing lines of stroke inputs into words according to the present invention.

As illustrated in FIG. 7A, the preferred embodiment of the word parsing method (step 62 of FIG. 3) begins in step 251 by sorting the strokes associated with a line in left-to-right order based on the left most point in the stroke. This helps ensure that the strokes are properly clumped in the subsequent processing. Next in step 252, the strokes are clumped into characters. A center point overlap method is preferably used to group strokes together that are likely to form characters. The center point overlap method groups two strokes together based on whether the strokes or their center points overlap each other. For every stroke in a character, the system 10 calculates the leftmost and rightmost coordinates of the stroke and averages them to get a center point for the stroke. Then if the center point of a first stroke is within the leftmost or rightmost coordinates of a second stroke or second group of strokes, the first and second strokes are grouped together. The preferred method also tests whether the center point of the second stroke is within the leftmost or rightmost coordinates of the first stroke, and if so groups the strokes. This is particularly advantageous for ensuring that the dot for the character "i" or the crossing of the character "t" or "F" are properly grouped with the remaining strokes that make up the character. For example, a current stroke is dumped (grouped) with a prior stroke when the current stroke's center point is within the width of a prior stroke (plus ³⁄₆₄ths of a line height added as a tolerance), or when the prior stroke's center point overlaps the width of the current stroke (plus the ³⁄₆₄ths of a line height tolerance).

Once the strokes have been divided into characters, the preferred method calculates several global parameters about the characters in step 253. The preferred method processes each of the characters to determine the following: CharWidth, CharDist, CharDelta and WordDelta. The CharWidth is the average calculated width of a character; the CharDist is the average calculated distance between adjacent character center points; the CharDelta is the average calculated space between characters; and the WordDelta is the average calculated space between words.

These calculations are preferably computed using fuzzy logic. Fuzzy membership functions are practically expressed using a trapezoidal function of four points. The first point (point 1) indicates where the membership is false, the second point (point 2) indicates where it transitions to completely true, the third point (point 3) indicates where it ends being completely true, and the fourth point (point 4) indicates where it transitions to false. A trapezoid can describe typical situations given the placement of the points. If the first and second points are effectively negative infinity, then a value below the third point is always true. If the third and fourth points are effectively positive infinity, then any value above the second point is always true. If all of the points are all the same, then there is a single value which is true. And lastly, if the second and third point are the same, then the membership function has the shape of a triangle. For example, CharWidth is intended to indicate the width of the printed characters. The calculation of CharWidth is influenced by a fuzzy membership function that limits the influence of cursive writing and punctuation because cursive writing or short punctuation strokes should not skew the data. An exemplary membership function used for CharWidth is:

| CharWidth Membership | |
|---|---|
| Point 1 | 5 |
| Point 2 | 10 |
| Point 3 | 30 |
| Point 4 | 60 |

Figure 7B:
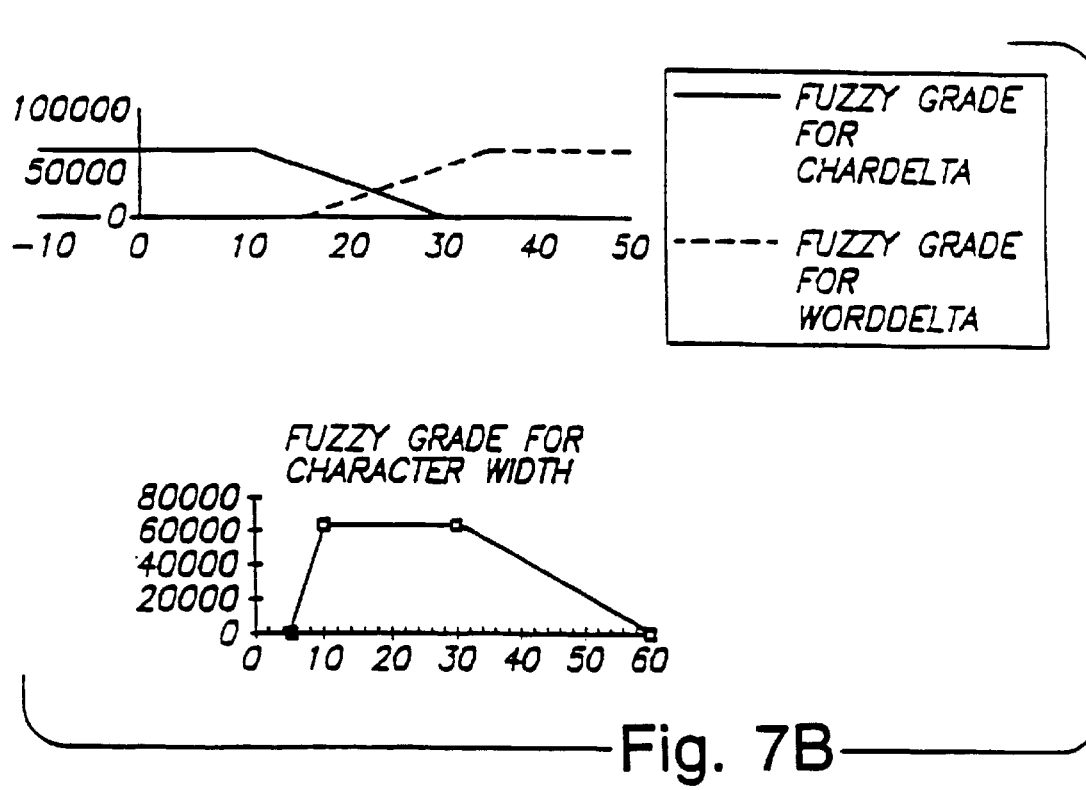
FIG. 7B illustrates graphs of an exemplary membership function grade for character width, chardelta and worddelta.

In fuzzy logic, the "grade" represents the degree to which a value is a member of a set. In the preferred embodiment, the grade of TRUE is represented as 65536, FALSE as 0, and any value in between is interpolated. This is represented by the graphs shown in FIG. 7B for the grades of character width, Chardelta and worddelta. The CharWidth is preferably calculated as an average of all of the character widths weighted by their grade in what is called a center of gravity calculation. For example, the center of gravity calculation for the four character widths of 10, 30, 45, and 60 would be:

$$\frac{10*(65535) + 30*(65535) + 45*(32767) + 60*(0)}{65535 + 65535 + 32767 + 0} = 25$$

Thus, wide cursive words and narrow punctuation do not influence the character width calculation. Any cursive word with a width greater than 60 has no influence on the character width calculation. Similarly, a comma or any other punctuation mark with a width of less than 5 has no influence on character width calculation.

Similarly, CharDelta and WordDelta are calculated using center of gravity averages and fuzzy logic membership functions. The resulting values provide a good estimate of the typical character and word distances for the user's handwriting and printing, and this influences the word parsing passes and the points at which word are separated and joined. Exemplary membership functions used for CharDelta, WordDelta and CharDist are:

| CharWidth Membership | |
|---|---|
| Point 1 | −32767 |
| Point 2 | −32767 |
| Point 3 | 10 |
| Point 4 | 30 |

-continued

| Word Delta Membership | |
|---|---|
| Point 1 | 15 |
| Point 2 | 35 |
| Point 3 | 32767 |
| Point 4 | 32767 |
| CharDist Membership | |
| Point 1 | −32767 |
| Point 2 | −32767 |
| Point 3 | 40 |
| Point 4 | 110 |

Another parameter that can be collected in this step is the waviness of the stroke. During the banding calculation, the system could also record how many times the angle of the stroke polyline changed from heading up to heading down, or vice-versa. High waviness would be an indication of cursive writing, and this would be an additional input into the fuzzy rules.

Once the values for CharWidth, CharDist, CharDelta and WordDelta have been calculated, a preferred method proceeds to step 254. In step 254, additional membership functions are calculated using the values resulting from step 253. The Narrow Width, Character Width, and Not Character Width membership functions associated with character width are calculated. The Narrow Width membership function is important for discriminating very narrow characters such as "1" or "1". The Character Width and Not Character Width membership functions are for determining when a character is a typical character or something that is too wide to be a character (probably cursive), respectively. Character Distance and Not Character Width are membership functions associated with character distance, and are next calculated. The next two membership functions, Character Delta and Word Delta, indicate whether characters form a word, and are calculated. Next, two membership functions, Overlapping and Not Overlapping, are calculated for determining whether the characters are overlapping. Finally, an output membership table, Entry Merge, describes whether a current entry should be clumped with the previous entries in the list of clumped characters. Exemplary values for each of these membership functions are provided in Appendix A.

Once all the membership functions have been established for this line of characters, the method retrieves the first two characters in the line in step 260. Beginning with the two leftmost characters and proceeding to the right, the method determines whether the characters should be grouped together. In step 255, four values are first calculated: an ENTRY_DELTA, an ENTRY_OVERLAP, an ENTRY_WIDTH and a PREV ENTRY_WIDTH. The ENTRY_DELTA is the delta or distance between this clump and the previous clump. The ENTRY_OVERLAP is the overlap between this clump and the previous clump. The ENTRY_WIDTH is the character width of the clump. The PREV_ENTRY_WIDTH is the character width of the previous clump. Once these values are known, they are used in step 256 by a plurality of rules to determine if the characters/clumps should be combined. Each rule provides a contribution to a value X that will ultimately determine if the characters should be joined. For example, one rule provides that if the ENTRY_DELTA is true in the WORD_DELTA membership function, then the DEFINITELY_SPLIT value of the ENTRY_MERGE table should be added to X. A second rule provides that if the ENTRY_OVERLAP is true in the OVERLAPPING membership function then the DEFINITELY_JOIN value of the ENTRY_MERGE table should be added to X. Examples of a plurality of these rules is provided in Appendix B. Once all the rules have been evaluated, the current and previous characters will be joined if X is zero or greater, otherwise the characters will be split. The process of calculating the four values and evaluating the rules is then repeated using the current character as the previous character and retrieving the next character in the line as the current character in step 259.

Finally in step 257, the words defined from the above steps are merged with the existing data in the document. The center point algorithm and band bumping are preferably used in this step to determine whether the words should be joined with existing words. For every word that is output by the above steps, if any of the word's bands come within a tolerance of the corresponding bands of any of the words on the line, then the words are joined. If words are not joined by this band bumping, then if center points overlap then words are joined. Otherwise the word is placed into the existing data as is.

Figure 8A:
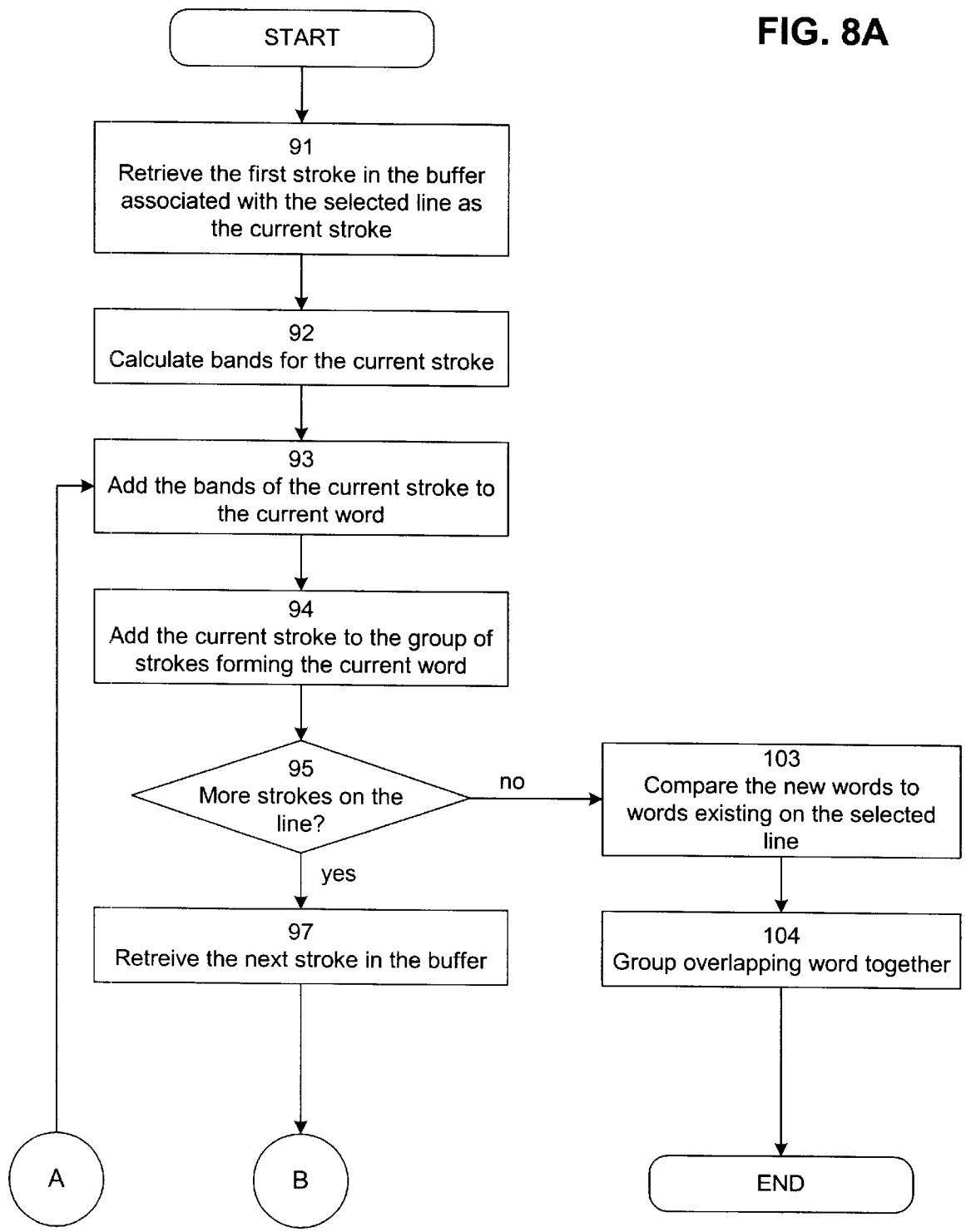
FIGS. 8A, 8B, and 8C are flowcharts of an alternate method for processing lines of stroke inputs into words according to the present invention.
Figure 8B:
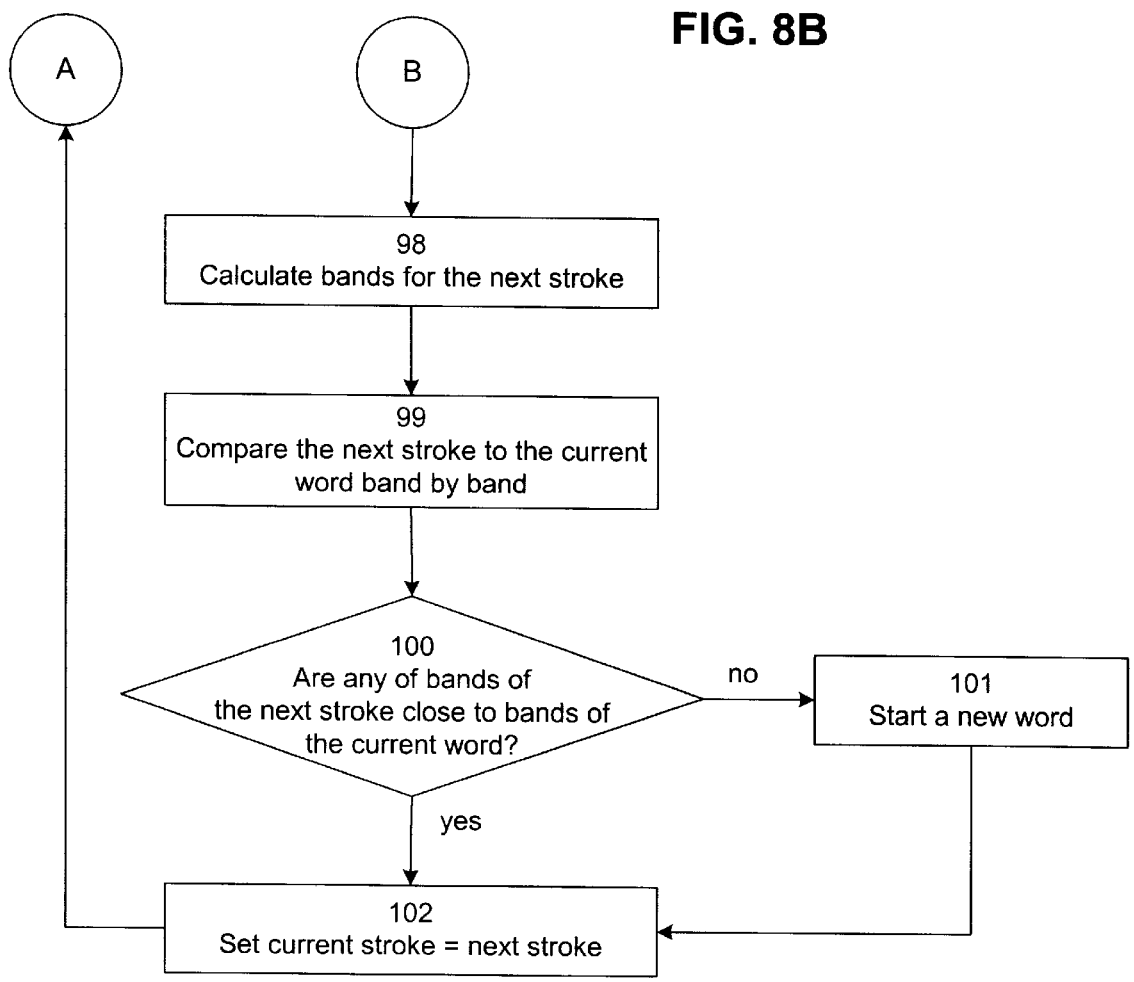

An alternate method for word parsing (step 62 of FIG. 3) is detailed with reference to FIGS. 8A, 8B and 8C. The process begins with a fresh line or fresh page. First, an initial stroke on the selected line is chosen as the current stroke in step 91. In step 92, the bands in the preceding, current and following lines (i.e., a 24 maximum) are calculated for the stroke. Then in step 93, the bands for the current stroke are added to the bands for the current word. In step 94, the system adds the current stroke to the group of strokes forming the current word. Since this is the first stroke, it is the only stroke comprising the current word. In step 95, the method determines whether there are additional strokes associated with or in the selected lute to process. If there are none, the process continues in step 103 as will be discussed below with the single stroke forming the only word on the line. The system 10 is able to process strokes later input by adding the strokes to a word or new strokes may be added to form new words on the line. The system 10 will utilize the current information about the strokes, and use the information about existing strokes on the line. However, if there are additional strokes on the line the process continues in step 97 where the next stroke to the right of the current word is retrieved. Then in step 98, the bands for the next stroke are calculated. Next, in step 99, the bands of the next stroke are compared with corresponding bands of the same vertical height for the current word. In step 100, the alternate method determines whether any of the bands of the current word are "close" to bands in the next stroke. Bands are "close" if the left edge of any of the bands for the next stroke come within a tolerance distance of the night edge of any of the bands in the current word. In an exemplary embodiment, the tolerance distance is variable with the default set to be ⅕ of a line height. If the current word and the next stroke are close, then the next stroke is clumped with the other strokes in the current word. The current stroke is set equal to the next stroke in step 102, and the process returns to step 93 to add the current stroke (formerly the next stroke) to the current word. Additional strokes in the line are then processed until there are no more strokes to process. However, if the current word and the next stroke are not close, then the method proceeds to step 101 and a new word is started, the process continues through steps 102 and 93 to add the current stroke (formerly the next stroke) to the current word. Additional strokes can then be processed until all the strokes in the line have been parsed.

Once the process of grouping the newly entered strokes into new words is complete, the process will exit the first parsing level and proceed from step 95 to step 103, as briefly noted above, to a second level of word parsing. In the second word parsing level, the new formed words are compared to the existing words, if any, that are already present on the selected line in step 103. The bands of the new words are compared to the bands of the existing words in the same manner as has been described above. If any of the new words overlap or come within a predetermined tolerance of the bounds of existing words, the new word and existing word are combined in step 104. This comparison is preferably done by comparing each of the new words to each of the existing words and combining them as necessary. The word parsing process then ends in step 96.

Figure 8C:
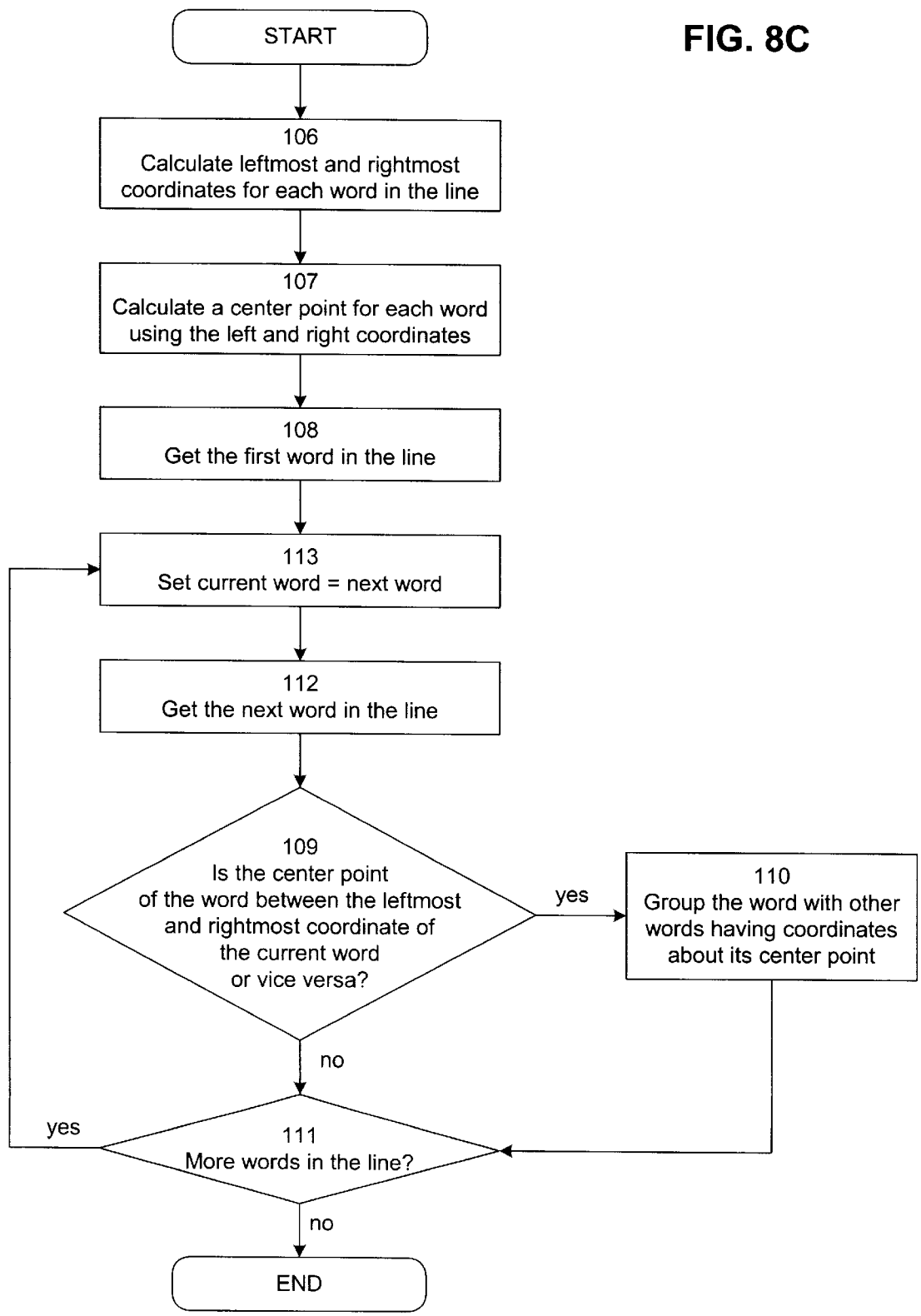

As illustrated in FIG. 8C, the word parsing method of the present invention also includes additional clumping of words, on both parsing levels, for properly grouping special cases such as the dot over the "i" and "j", or the stroke across the "T", "F" or "E" whose bands may not overlap. The additional dumping method begins in step 106 by calculating the leftmost and rightmost coordinates for each word in the line. The center point for each word is then calculated in step 107. The center point is determined by calculating the leftmost and rightmost coordinates for each stroke in the word, and then averaging the coordinates to get a center point for the word. In step 108, the first word in the line is retrieved. Next, in step 113, the current word is set to be the next word or the word most recently retrieved. Then in step 112, the next word in the line is retrieved and set as the next word. In step 109, the center point of the next word is compared to the leftmost and rightmost coordinates for the current word, and the center point of the current word is compared to the leftmost and rightmost coordinates for the next word. If either the center point of the current or next word is between the coordinates of the other word, then the words are grouped with that word in step 110 before proceeding to step 111. If both center points are not between the coordinates of the other word (plus a tolerance), then the process proceeds directly to step 111. The process then determines if there are more words to be tested in step 111. If there are not the process is complete. Otherwise, each word is successively retrieved and has its center point compared to the leftmost and rightmost coordinates for the other words in the line. This is accomplished by returning the method to step 113.

Figure 9A:
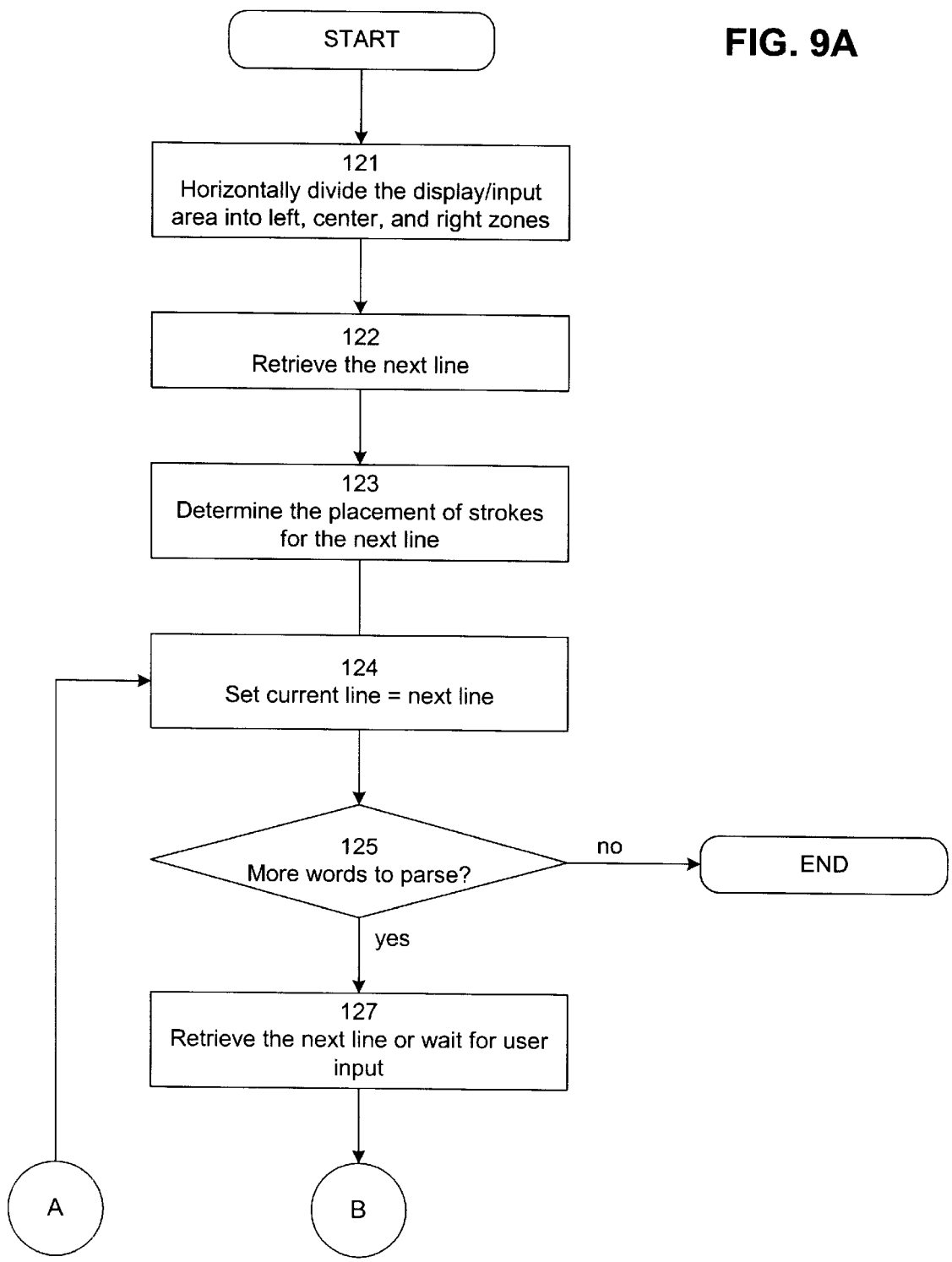
FIGS. 9A and 9B are a flowchart of a preferred method for dividing words into paragraphs according to the present invention.
Figure 9B:
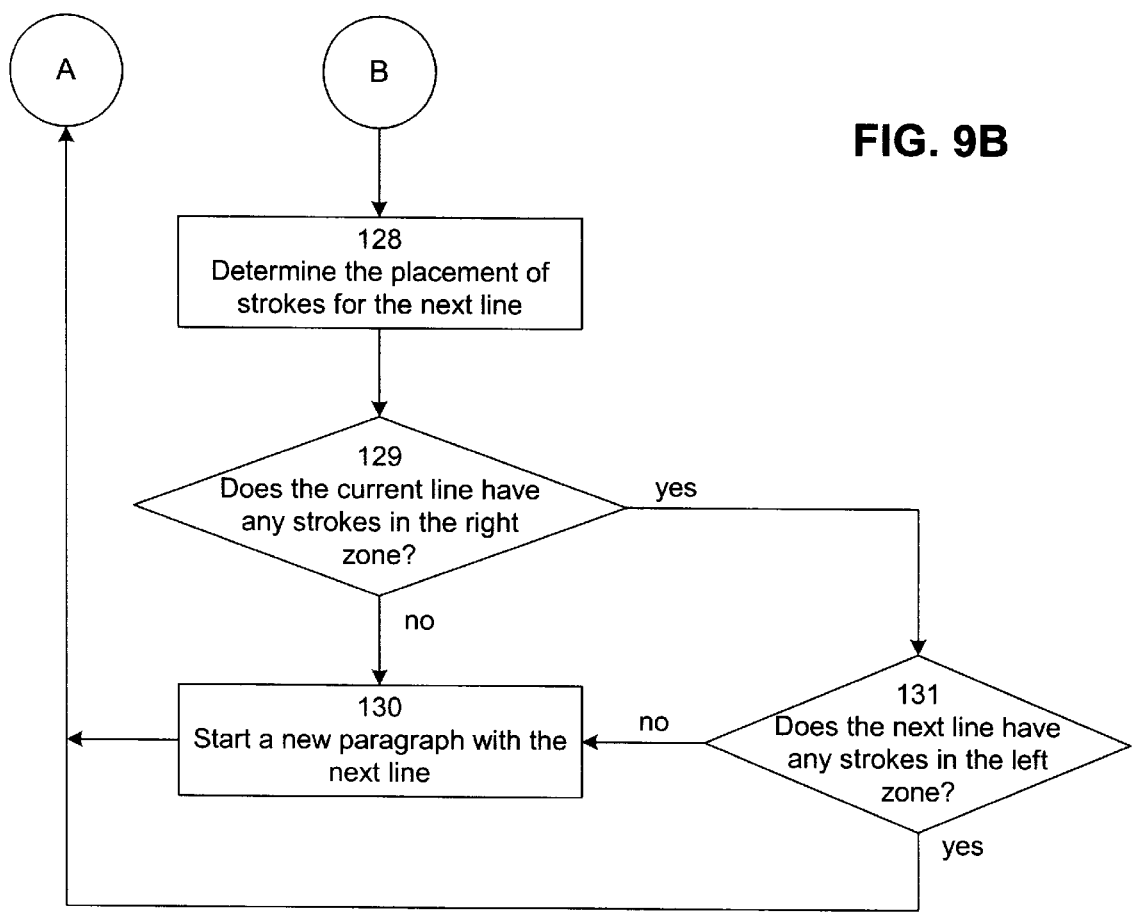

One embodiment for the final level of processing in the writing layer, paragraph parsing (step 63 of FIG. 3), is illustrated in FIGS. 9A and 9B. Once the strokes have been parsed into lines and words, they are divided into paragraphs. The division into paragraphs in pen-based computing is very different from keyboard-based systems where the paragraphs are specifically noted by carriage returns. The division of words into paragraphs also allows for a word wrapping feature common in most keyboard-based systems. The process for paragraph parsing begins in step 121 where the display is divided into three vertical zones. In this embodiment of the present invention, the boundaries for the left, center, and right zones are made adjustable. The user interface may provide symbols, such as triangles, proximate the top of the page to indicate the bounds of each zone. It may also include an option sheet where the dimensions of each zone can be numerically set. The symbols represent two imaginary lines that divide the screen 34 of the display device 14 into the three regions. The dimensions of the zones can be adjusted by tapping on the symbols and dragging them to the desired position. The zones include a left zone, a center zone, and a right zone. The present invention advantageously groups lines of words together as a paragraph when the current line has strokes in the right zone and the next line has strokes in the left zone. The method parses the lines by retrieving the strokes/words for the next line in step 122. In step 123, the placement of the strokes for the next line is determined and the current line is set equal the next line in step 124. Then in step 125, the system tests if there are more lines on the page to parse. If not the process in complete. If there are more lines to parse, the system retrieves the next line in step 127, or waits for further input from the user if strokes are being entered. The placement of strokes for the next line (the new line just retrieved) is determined in step 128. In step 129, the method tests whether the previous line has any strokes in the right zone. If not, the current line is the last line in a paragraph, and a new paragraph is started with the next line in step 130. This is preferably done by inserting an end of paragraph marker on the end of the current line. If the previous line has strokes in the right zone, then it may not be the end of the paragraph, and the method proceeds to step 131. Step 131 tests whether the next line has strokes in the left zone. If there are strokes in the left zone, the previous line and next line are in the same paragraph, and the method returns to step 124 to process any additional lines. If there are no strokes in the left zone, a paragraph is inserted after the previous line in step 130. Then the method returns to step 124 to process any additional lines.

Figure 10A:
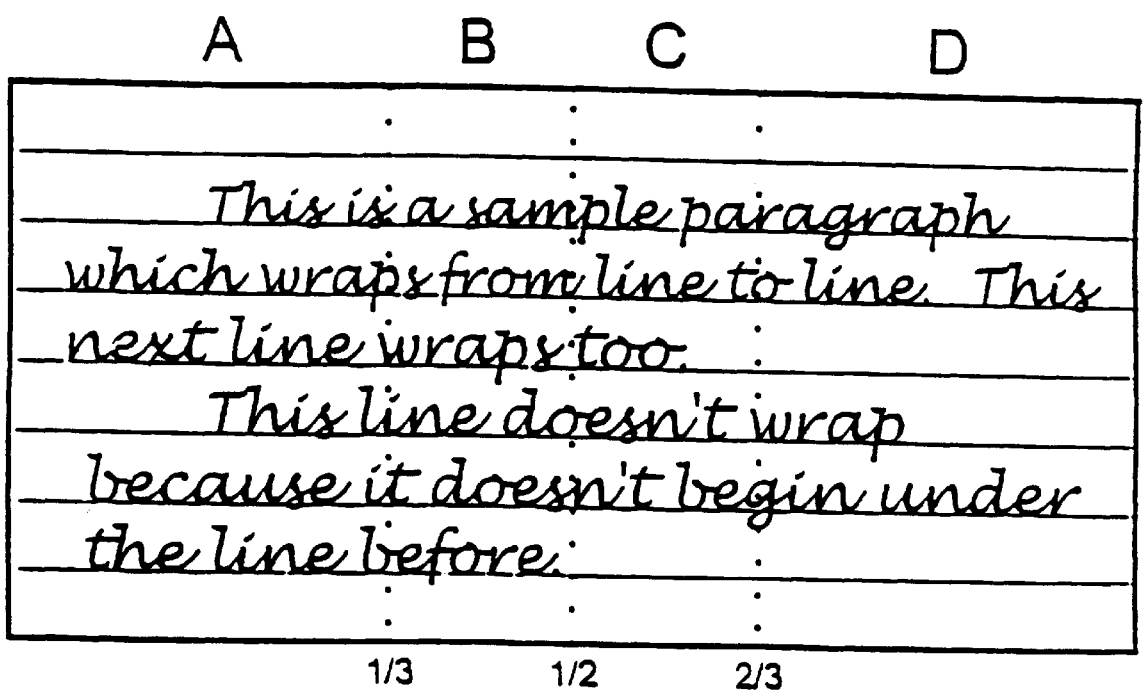
Figure 10B:
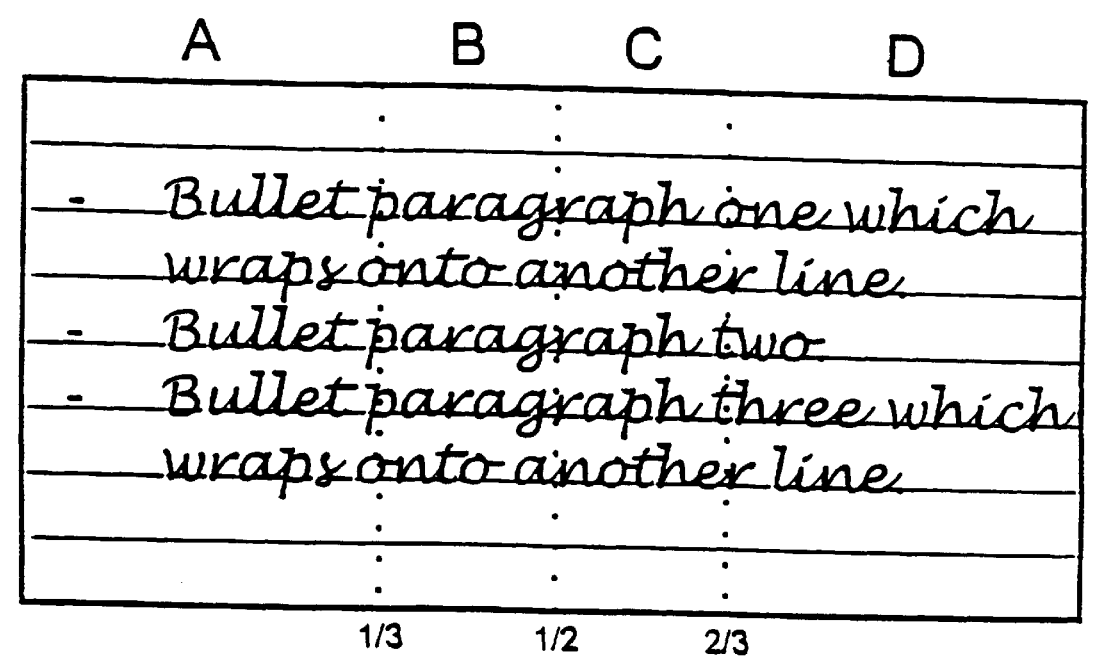

A preferred embodiment for paragraph parsing methods (step 63 of FIG. 3) of the present invention can best be understood with reference to the description below and FIGS. 10A, 10B and 10C. The methods of the present invention are distinct from existing paragraph parsing methods because the existing methods rely exclusively on the positioning of the text line (strokes, text, or words) within the view. The methods of the present invention not only involve the position of the text line, but also the context of the text line in relationship to other text lines. Therefore, more sophisticated styles of paragraphs and lists are accommodated. FIGS. 10A, 10B and 10C are graphical representations of a display area for viewing text that is a portion of the screen 34 of the display device 14.

As shown in FIGS. 10A, 10B and 10C, the present invention preferably divides the display area into four vertical zones or columns. The paragraph parsing rules described below for the preferred method use four invisible columns within the text view to define the left and right edges of a text line. The columns are named left to right with the letters A, B, C and D. The labeling of the columns, the denoting of the distances and the dotted lines defining the columns in FIGS. 10A, 10B and 10C are provided in these figures for illustration purposes only and are not visible to the user during operation of the pen-based system 10 and the paragraph parsing processes. An exemplary embodiment for the positions of the columns are:

| Column | Position |
|--------|----------|
| A | left edge of view to ⅓ view width; |
| B | ⅓ view width to ½ view width; |
| C | ½ view width to ⅔ view width; and |
| D | ⅔ view width to right edge of view. |

Those skilled in the art will realize that the boundaries of the columns can be modified to the particular writing style of the user and these dimensions are provided only by way of example.

When the position of the left and right edges of the text line are calculated in the preferred embodiment, the coordinate values that describe the position are preferably rounded to values that have a higher granularity than raw horizontal coordinate values. For example, horizontal coordinate values are represented with respect to the height of a line with each coordinate being ¹⁄₆₄th of the height of a line. The edge positions of text lines may be rounded to 1.5 line heights or to values which are multiples of 96 horizontal coordinates. The present invention provides such rounding of edge positions of text lines to make it easier to align the left edge of text lines using gestures which have very coarse resolution compared to horizontal coordinate values. The rounding also hides the drifting of lines of text in the horizontal direction as the lines of text are being written by hand.

The preferred embodiment provides three methods that are successively applied when parsing words into paragraphs. The first method provides for standard paragraph parsing, the second method provides for paragraphs preceded by bullet characters, and the third method provides for list paragraph parsing. The second method is applied if a predetermined bullet character begins the line. Then, the first method is applied for standard paragraph parsing. If neither of the two previous method are effective in dividing the lines into paragraphs, they are considered a list and processed according to the third method.

Referring now to FIG. 10A, the method for standard paragraph parsing is described. The method parses standard paragraphs using the following rules. These rules are used to determine if text lines should be grouped together to form standard paragraphs written in block form or with the first line indented or out-dented.

1. For a text line to qualify as the first line of a paragraph it must start in column A of the view.
2. For the next line following an identified first line to continue the paragraph, (1) the left edge of the next line must be in column A of the view, and (2) the right edge of the identified first line must be in column D of the view.
3. For the third and succeeding lines to continue the paragraph, (1) the right edge of the previous text line must be column D and (2) the left edge of the current text line must be within one line height to the left or right of the left edge of the previous line.
4. The left edge position of the first line (rounded to the nearest snap position) specifies the left indent of the first line only.
5. The left edge position of the second line (rounded to the nearest snap position) specifies the left indent for all lines other than the first line.

The method of the present invention applies the above rules as appropriate, and parses each line of text in a document from beginning to end to identify the locations where the paragraph breaks should be. For example, the present invention would parse through blank lines until a line with text is encountered. The above rules would then be used to determine if the line begins a paragraph. If it does, the lines of text, if any, following the first line would be either associated with the first line as a paragraph or the process would look for a new first line in the remaining lines of text. The above rules are reapplied to the lines shown on the display in cases were the paragraphs are modified, or in cases where the pen moves in and out of proximity.

Figure 24A:
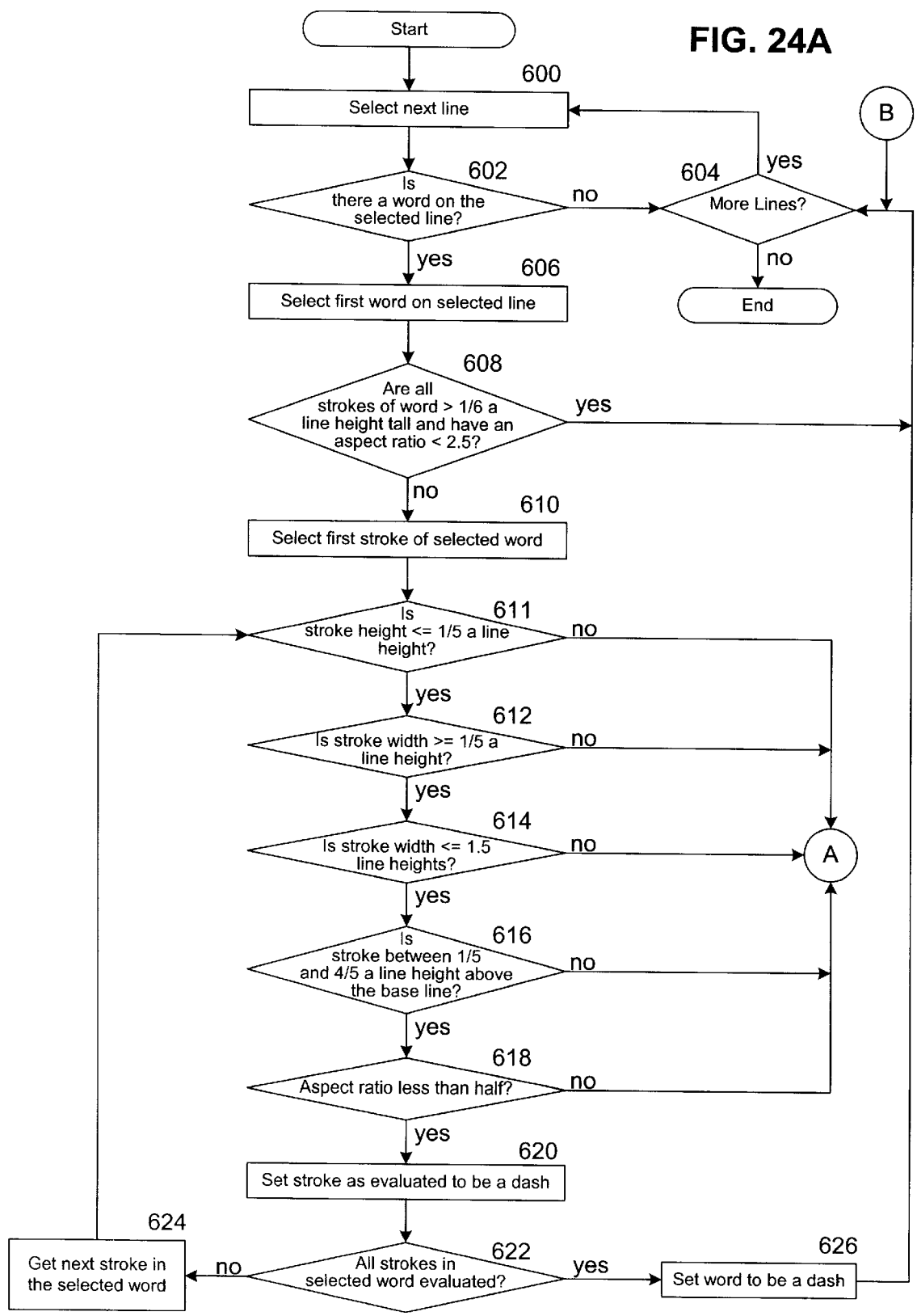
FIGS. 24A and 24B are a flowchart of a preferred method for performing character recognition of bullets and dashes according to the present invention.

Referring now to FIG. 10B, the second method for parsing paragraphs to identify bullet paragraphs will be described. The present invention advantageously recognizes as separate paragraphs those that begin with predetermined bullet characters. A bullet paragraph is similar to a regular paragraph, except that the first text element within the paragraph is a valid bullet character. Valid bullet characters are hyphens in the example, but a variety of other characters could be used. A preferred method for determining whether the first word in a line is a bullet character is discussed below with reference to FIGS. 24A and 24B. The method is advantageous because it provides a faster and more tolerant bullet and dash recognizer. The following rules are used to determine if text lines should form bullet paragraphs.

1. For a text line to qualify as the first line of a bullet paragraph it must (1) begin with a valid bullet character in column A or B of the view The method for testing for a valid bullet character is described in more detail below with reference to FIGS. 24A and 24B.
2. For a second text line to continue the bullet paragraph from the first line it must (1) start within column A or B of the view, and (2) the right edge of the first line must be in column D of the view.
3. For third and successive lines to continue the bullet paragraph each line must have (1) the right edge of the previous text line in column D of the view and (2) the left edge of the text line must be within one line height to the left or right of the left edge of the previous text line.
4. The left edge position of the bullet character (rounded to the nearest snap position) specifies the left indent of the first line only.
5. The left edge position of the second line (rounded to the nearest snap position) specifies the left indent for all lines other than the first line.
6. The word after the bullet character in the first line is preferably forced to the left edge position of the second line.

Referring now to FIG. 10C, the list paragraph parsing can be seen. These rules can be used to determine if text lines should form list paragraphs. The paragraph parsing method of the present invention does not check to determine if text should form a list, but rather all lines which are determined not to form standard paragraphs or bullet paragraphs are treated as list items. Therefore, the following rules describe the characteristics of text lines in a list.

1. A list line which begins in column A of the view must not end in column B or C of the view. If it does, it may be mistaken for the first line of a paragraph.
2. All text lines which begin in column B, C or D are considered to be list lines.
3. The left edge position of the first text line (rounded to the nearest snap position) of the list element specifies the first line indent and the left indent for all subsequent lines if the list line must be wrapped.

Those skilled in the art can use the rules provided above to generate the three methods for paragraph parsing in a manner similar to that described with reference to FIGS. 9A and 9B.

In yet another embodiment of the paragraph parsing routines, the input of ink strokes could also be used to set the right margin for the paragraph to which the ink strokes are being added. For example, if additional strokes were added on a line of an existing paragraph, and some of the strokes extend beyond the value currently set as the right margin, the paragraph parsing routines could reset the value of the right margin to be the same as the right bound of the right most stroke of the additional strokes input. This effectively sets the right margin to be automatically increased to match the bound of a right most word in a paragraph. With such routines in operation, the input of additional strokes to an existing paragraph would leave the right margin of existing paragraphs unaffected if additional strokes were positioned to the left of the existing right margin. Such paragraph parsing routines could also be applied when no existing paragraph has been formed and input strokes are the first to be input for a line. In this case, the right margin would be automatically increased to match the right bound of a right most stroke of the input strokes input for the line.

Once the strokes have been grouped into words and paragraphs, the present invention provides new gestures for joining words that should have been grouped and were not, or for splitting strokes that form a single word and should have been two words (Step 65 of FIG. 3). The present invention provides a down-right gesture for splitting a single word into two words. The point at which the word is divided and the strokes associated with the left and right word portions is determined by the hot point of the gesture. The hot point of the gesture is the starting point from which the stroke forming the gesture begins. The present invention preferably divides the strokes such that any stroke with a center point to the left of the hot point forms part of the left word portion, and any stroke with a center point to the right of the hot point forms part of the right word portion. The down-right gesture of the present invention can be used to specify the amount of white space to insert between split word. The first down-right gesture will split the strokes forming a single word, and insert a predetermined amount of white space, for example, ⅓ of a line height. A subsequent down-right gesture opens up a white space with a width about equal to ½ of the width of the down-right gesture. Similarly for joining words, when a space is selected and deleted, it is first deleted to a nominal predetermined space such as ⅓ a line height. Then if the nominal space is selected and deleted, the words about the space are joined into a single word.

In the preferred embodiment, the present invention advantageously provides an easy-to-use spacing tool for managing the amount of space between words, splitting word and joining words. The spacing tool includes a unique user interface shown in FIG. 13A that comprises a two-part insertion caret 350 formed from a vertical line 354 and a pair of triangles 352, 354. The vertical line 354 indicates the hot point or the position from which space will be removed or added and about which words will be split or joined. The insertion caret 350 may be positioned by the user between or over text, strokes and words. The user may manipulate a triangle 352, 354 independent from the vertical line 354 using the input device 16 to perform the desired space management action. As a triangle 352, 354 is manipulated, the system 10 advantageously displays the triangles 352, 354 in new positions to notify the user of the spacing action that will be performed and amount of space that will be affected. While the invention will now be described with reference to the insertion caret 350 shown in FIG. 13A and the pair of triangles 352, 354 are shown moving horizontally together, those skilled in the art will realize that the insertion caret 350 may take a variety of other visually distinct two-part formats. For example, a second embodiment for the insertion caret could be a vertical line and a diamond, the vertical line designating the hot point, and the diamond moving in position corresponding to the manipulation of the input device 16 to indicate how much space will be added or removed. A third embodiment for the insertion caret could include a first portion formed of a vertical line and lower triangle and a second portion formed of a vertical line and a upper triangle. The first portion is used to reference the hot point and the second portion identifies the position of the cursor/input device 16 (or vice versa), and thus, the amount of space to be removed or deleted. Yet another embodiment for the display of the insertion caret displays the area between the first portion and the second portion of the insertion caret in a visually distinct manner from the other text, ink strokes or data, such as in reverse video or with distinctive shading.

Figure 11:
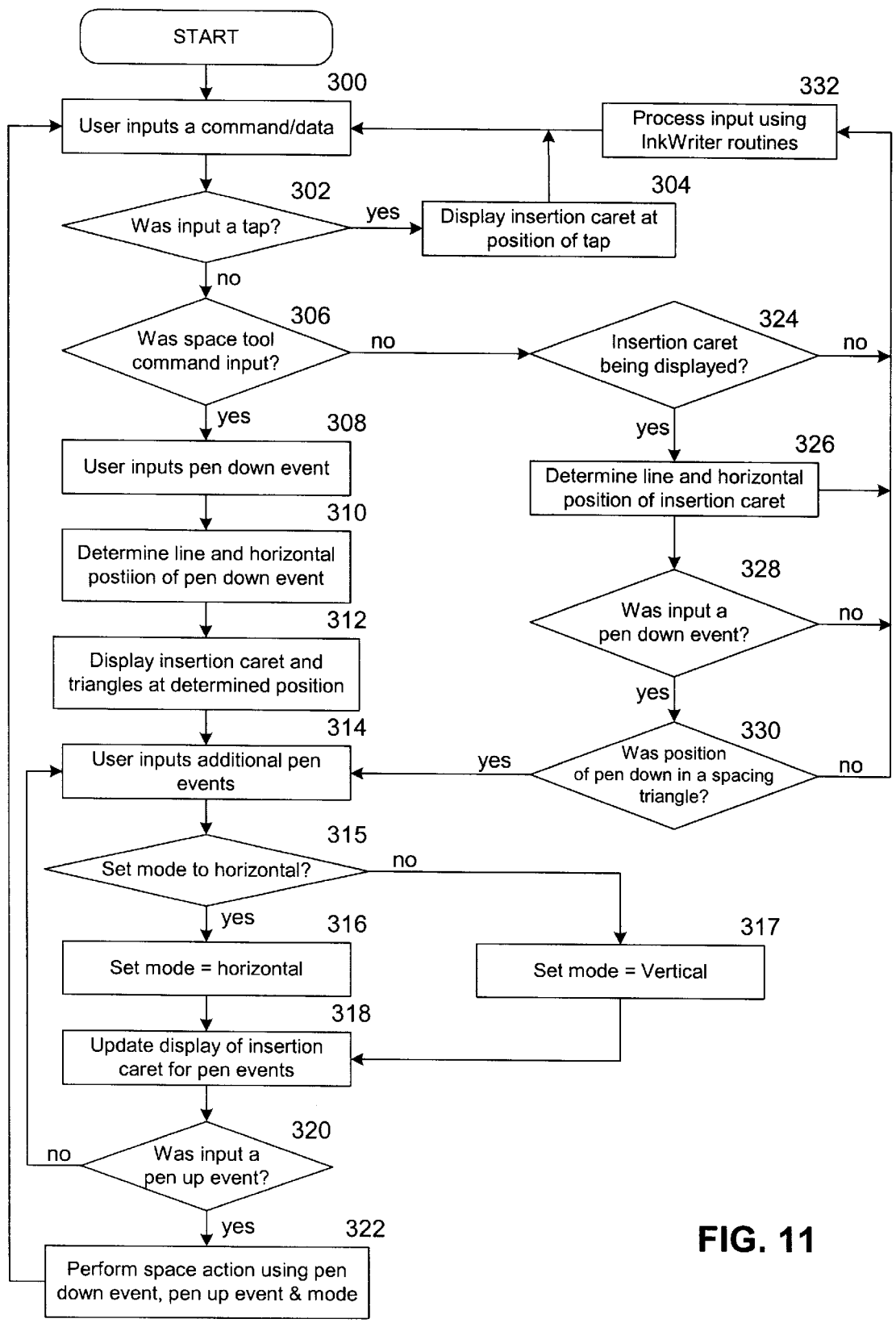
FIG. 11 is a flowchart of a preferred method for manipulating space according to the present invention.

Referring now to FIG. 11, a preferred method for managing space according to the present invention is shown. The method begins in the normal mode of operation for the system 10 where the user has various options such as inputting strokes, converting strokes, editing drawings, or using any of the other drawing or word-processing functionality provided by the system 10. In step 300, the user inputs a command or data. Then in step 302, the method tests whether the input was a tap (e.g., the pen is in contact with the display device). If the input was a tap, the method displays the insertion caret 350 at the position of the tap in step 304 and the method returns to step 300 to receive additional commands. If the input was not a tap, then the method proceeds to step 306 where the system 10 tests whether the input was a space tool command. The system preferably displays a space tool button on the display device and/or provides a pull down menu for inputting the space tool command. This is particularly advantageous because it provides for gesture-less manipulation of text and ink strokes to manage space.

If the input was a space tool command, the method proceeds to step 308. In step 308, the user inputs a pen down event (i.e., touches the stylus/input device 16 to a position on the display device 14). This pen down event indicates the position where the desired spacing action is to occur. Then in step 310, the preferred method determines the line and horizontal position of the pen down event input in step 308. Next, in step 312, the method displays on the screen 34 the insertion caret 350 at the position determined in step 310. Then in step 314, the user inputs additional pen events. For example, the pen events that can be input are movements of the pen/input device 16 in any direction horizontally or vertically while remaining in contact with the display device 14.

Next in step 315, the method tests whether the mode should be set to be horizontal. The present invention uses a mode setting along with the position of the pen up event and the pen down event to determine what type of spacing action should be performed. The two modes are vertical and horizontal. A vertical spacing action removes or adds more lines. A horizontal spacing action removes or adds more space on a given line. Whether the mode should be set to horizontal is preferably determined by the current setting of the mode and current position of the pen (e.g., cursor) after the additional pen events input in step 314 are performed. If the mode has not been set, then the mode will be horizontal if the current position of the pen after the additional pen events input are performed is within half a line height of the line upon which the cursor is positioned. Alternatively, the mode could be set horizontal if the current position of the pen after the additional pen events input are performed is above the upper triangle 352 plus a tolerance or below the lower triangle 356 plus a tolerance. If mode has not been set and the current position of the pen after the additional pen events are performed is equal to or more than half a line height above or below the line upon which the cursor is positioned, the mode will be vertical. Similarly, if the mode is already set as either vertical or horizontal and the current position of the pen after the additional pen events input in step 314 are performed is above or below the line upon which the cursor is positioned, the mode will be vertical. Otherwise, the mode will be horizontal. If it is determined in step 315 that the mode should be set to horizontal, then the method continues in step 316 to set the mode to horizontal. If it is determined in step 315 that the mode should not be set to horizontal, the method continues in step 317 to set the mode to vertical.

After either step 316 or 317, the method continues in step 318. In step 318, the display of the insertion caret 350 is updated for the additional pen events input. Exemplary updates to the display are shown in FIGS. 13A–13M. In response to movement in the horizontal direction and proximate to the line in which the vertical line 354 is positioned, the triangles 352, 354 are preferably moved to the right or left of the vertical line 350 to provide the user with visual feedback as to how much space will be added or deleted, respectively, and as shown in FIGS. 13B and 13D. For pen movements in the vertical direction, the triangles 352, 354 are spaced further apart and the vertical line 354 is extended to connect them to provide the user with visual feedback as to how many lines of white space will be added or removed as shown in 13F and 13H, respectively. Depending on the cursor position which indicates the current position of the pen after the additional pen events have been performed, the positions of the spacing triangles 352, 354 will be adjusted. For example, once the cursor has crossed into a line above the current line where the vertical line 350 is positioned, the display is updated to show the upper spacing triangle 352 proximate the upper boundary of the line in which the cursor is positioned. The display similarly updates the position of the lower triangle 354 to place it proximate the lower boundary of the line in which the cursor is positioned as the cursor enters a successively lower lines below the current line where the vertical line 350 is positioned. Next, in step 320, the method tests whether the user has input a pen up event ( i.e., the user has removed the pen 16 from contact with the screen 34). If the user has not input a pen up event, then the method returns to step 314 to accept additional inputs and again modify the display of the insertion caret 350 accordingly. However, if the user has input a pen up event, then the mode and the position of the pen up event and the pen down event are used to perform the desire space action in step 322. This process is detailed below with reference to FIGS. 12A to 12C. Once the desire space action has been performed the method returns to step 300 to accept additional inputs. Those skilled in the art will realize that for step 308 and 314 where only specific inputs are acceptable, the system may automatically return to step 300 in the event appropriate types of input are not received or after a predetermined time if a time out condition has been satisfied.

If the space tool command was not input, then the method proceeds from step 306 to step 324. In step 324, the method determines whether the insertion caret 350 is already being displayed by the system 10. The user may have previously performed the tap or activated the space tool which has caused the insertion caret 350 to be presented and to remain on the display. If the insertion caret 350 is not already displayed, the method moves to step 332, where the input is processed with other drawing or word-processing routines provided by the system 10. Such routines could be those such as provided by aha! InkWriter Software made by aha! software corporation of Mountain View, Calif. If the insertion caret 350 is already displayed, the method continues in step 326 where the method determines the line and horizontal position of the insertion caret 350 being displayed. Then in step 328, the method tests whether the input was a pen down event. If the input was not a pen down event, the method moves to step 332 and passes the input to other routines for processing as has been described above. If the input was a pen down event, the method moves to step 330. In step 330, the method determines the position of the pen down event. The method also determines if the pen down event was within a target area of the either of the triangles 352, 356 in step 330. Proximate each of the triangles 352, 356, the system 10 defines a target area for performing a pen down event. For example, the target area is a square having a side of ⅕ of a line height. The triangle is preferably displayed over the square area such that the pen down event can be outside the triangle, yet within the target area. Depending on the triangle 352, 356 over which the pen down event occurs and the subsequent position of the pen event, different space management actions will be performed by the system. If the pen down event was not within the target area of either triangle 352, 356, the method proceeds in step 332 as has been described above since the insertion caret 350 is not being manipulated. Otherwise the method continues in step 314 and its following step as has also been described above.

Figure 12A:
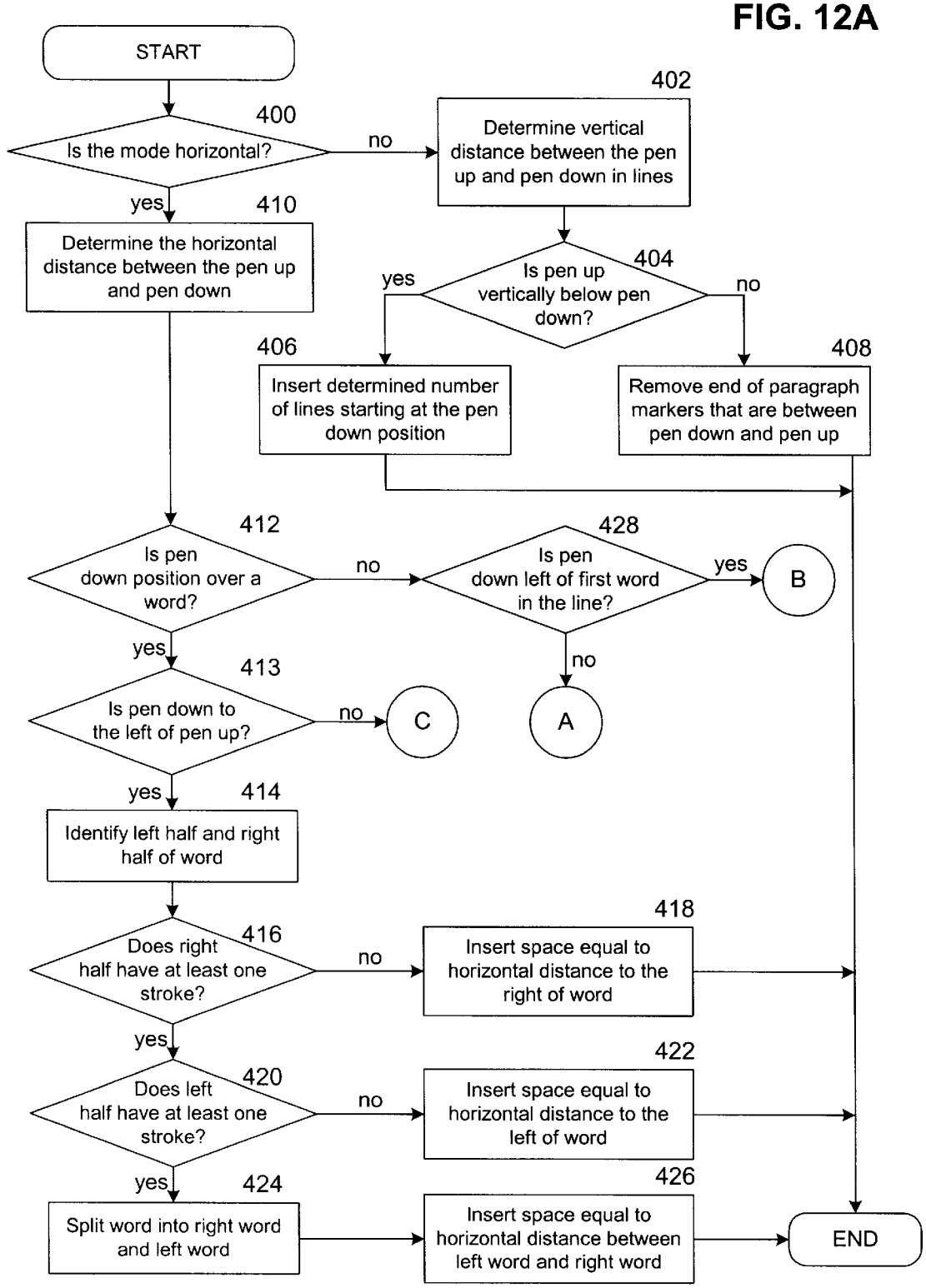
Figure 12B:
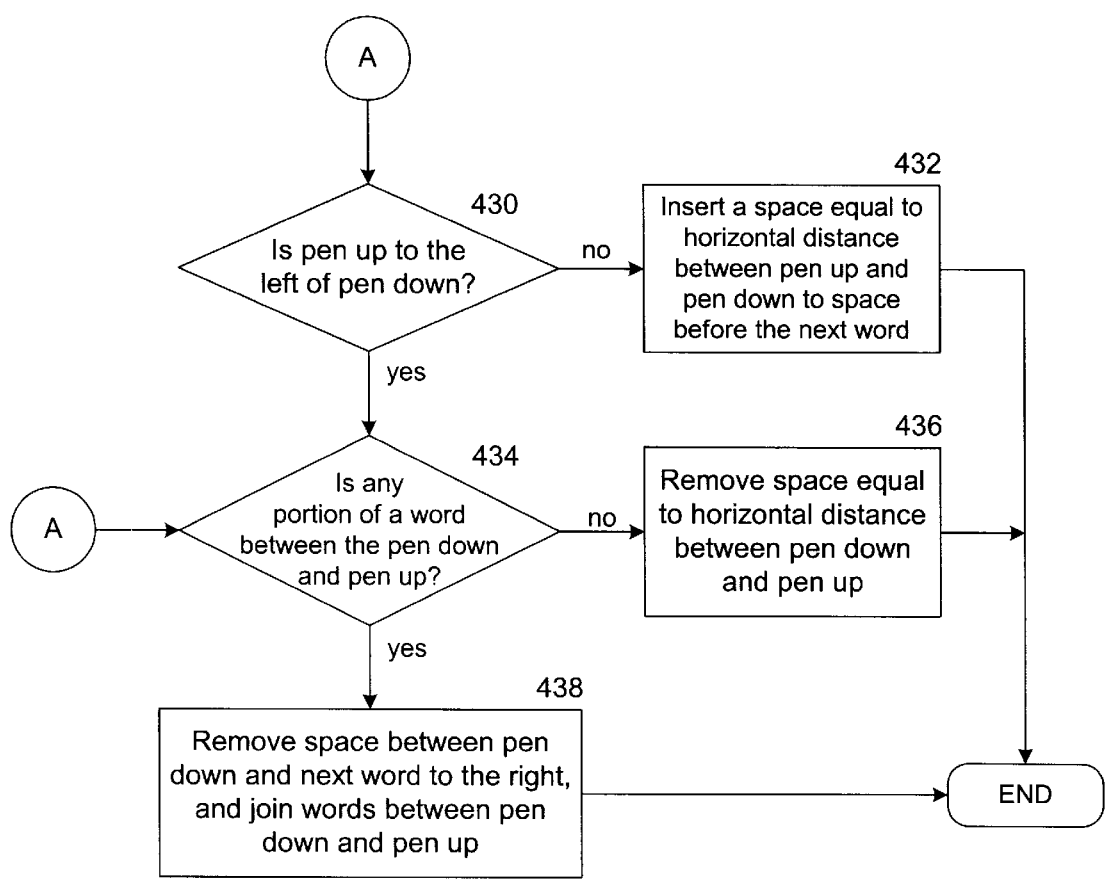

Referring now to FIGS. 12A–12C, a preferred method for performing the appropriate space action according to the present invention given a pen down event and a pen up event is shown. The method begins in step 400 by testing whether the mode when the pen up event occurred was set to horizontal. If so a horizontal space action is performed, otherwise a vertical space action is performed. If the mode is not set to horizontal, the system 10 will vertically remove or add space. In step 402, the method determines the vertical distance between the position of the pen up event and the pen down event. This distance is preferably rounded to the number of lines. Then in step 404, the method tests whether the position of the pen up event is below the position of the pen down event. If the pen up event is below the pen down event, then space will be inserted at the point where the insertion caret is positioned in step 406. The amount of space added is equal to the number of lines determined in step 402. This is preferably done by inserting end of paragraph markers at the position of the pen down event where the number of end of paragraph markers is equal to number of lines determined in step 402. After step 406, the spacing action is complete and the method ends. However, if the pen up event is not below the pen down event, vertical space will be removed, and the process moves to step 408. In step 408, the method removes any end of paragraph markers that are between the pen up event and the pen down event. This reduces the amount of vertical white space between the pen up event and the pen down even. For example, if empty lines are present, they are completely removed. However, if several paragraphs with strokes and text are between the pen up event and the pen down event, the white space between paragraphs is eliminated, and the existing strokes and text form a single paragraph to which word wrapping can be applied. After step 408, the spacing action is complete and the method ends.

If in step 400 the mode was found to be horizontal, then a horizontal a spacing action will be performed. The method proceeds to step 410, where the horizontal distance between the pen up event and the pen down event is determined. Then in step 412, the method determines if the pen down position is over an existing word. If so the method will either split or join the word. If the pen down position is over an existing word, the method next tests in step 413 if the pen down event is to the left of the pen up event. If the pen down event is not to the left of the pen up event, then the method continues in step 434 as will be described in more detail below because space will be removed and/or words will be joined. If the pen down event is to the left of the pen up event, then the method identifies the left half and the right half of word over which the pen down event is positioned. The characters and strokes to the left of the pen down event are used to form the left half, and the characters and strokes to the right of the pen down event or with the same horizontal position as the pen down event are used to form the right half. Determining whether characters and strokes are to the left or right of the pen down event can be done by comparing the center points of the strokes or characters to the pen down position. After step 414, the method determines whether the right half of the word has at least one stroke in step 416. If the right half does not have at least one stroke, then the method inserts space equal to the horizontal distance to the right of word in step 418 and the method ends. However, if the right half has at least one stroke, the method tests whether the left half has at least one stroke in step 420. If the left half of the word does not have at least one stroke, then the method inserts space equal to the horizontal distance to the left of word in step 422 and the method ends. If the left half of the word also has at least one stroke, then the word is split. The method continues in step 424, where the word is split into a right word formed from strokes identified as being the right half and a left word formed from strokes identified as being the left half. Then in step 426, the method inserts space equal to the horizontal distance between the left word and the right word in step 426 and the method ends.

If the pen down position is not over an existing word as determined in step 412, the method continues in step 428, where the method tests if the pen down is left of the first word in the line. If not, the method continues with step 430 of FIG. 12B to perform the addition or removal of space from between words. In step 430, the method tests whether the pen up event is to the left of the pen down event. If the pen up event is not to the left of the pen down event, the method proceeds to step 432, where space equal to the horizontal distance between the pen up event and pen down event as determined in step 410 is inserted after the pen down event or the insertion caret 350 and before the next word to the right on the line. Then the method ends. If the pen up event is found to be to the left of the pen down event, the method determines whether there are any existing strokes, text or portions of words between the pen down event and the pen up event. If there are not any other strokes or words present, the method moves to step 436 where space equal to the horizontal distance between the pen up event and pen down events is removed from the position of the insertion caret 350 to the determined distance to the left. After step 436, the method is complete and ends. If in step 434 the method found other strokes or words to be present, the method joins the words in step 438. In step 438, any space between the pen down and the pen up event is removed. The area between the pen down and the pen up events may include one or more words; all the space between these words is removed, and the words are joined to form a single word. After step 436, the method is complete and ends.

If the method found the pen down to be left of the first word in the line in step 428, the method continues in step 440 of FIG. 12C. In addition to the removal and addition of white space, the present invention advantageously permits the use of the insertion caret and the space management tool to reset the first line indent or the left indent for a paragraph. This process is shown in FIG. 12C. In step 440, the method determines the horizontal position of the pen up event. Then in step 442, the method tests whether the pen up event is on the first line of the paragraph. If the pen up event is on the first line of the paragraph, the method continues to test whether the pen down event is to the left of the pen up event. If the pen down event is to the left of the pen up event, the method performs step 446 to insert an amount of space equal to the distance between the pen down event and the pen up event to the first line indent. However, if the pen down event is not to the left of pen up event, the method performs step 448 to delete an amount of space equal to the distance between the pen down event and the pen up event from the first line indent. If the pen up event is not on the first line of the paragraph, the method continues in step 450 to test whether the pen down event is to the left of pen up event. The method performs similar steps as just described, but to adjust the left indent rather than the first line indent. If the pen down event is to the left of the pen up event, the method performs step 452 to insert an amount of space equal to the distance between the pen down event and the pen up event to the left indent. However, if the pen down event is not to the left of the pen up event, the method performs step 454 to delete an amount of space equal to the distance between the pen down event and the pen up event from the left indent. After either step 446, 448, 452 or 454, the method is complete. In an alternate embodiment, the spacing tool can be simplified and does not provide for the setting of the left indent. In such an alternate embodiment of the spacing tool, the method proceeds from step 442 to step 430 instead of from step 442 to step 450.

Figure 13A:
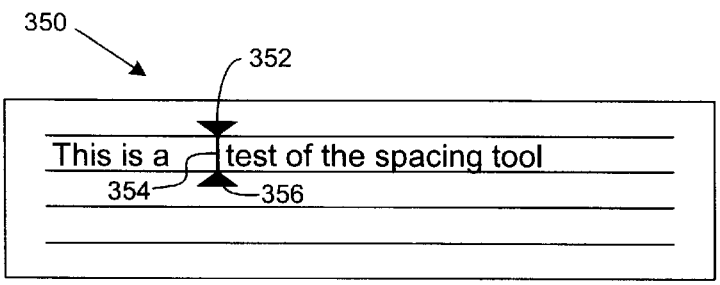
FIGS. 13A–13M are graphical representations of the screen of the display device showing the spacing tool and resulting modifications to the spacing of text.
Figure 13B:
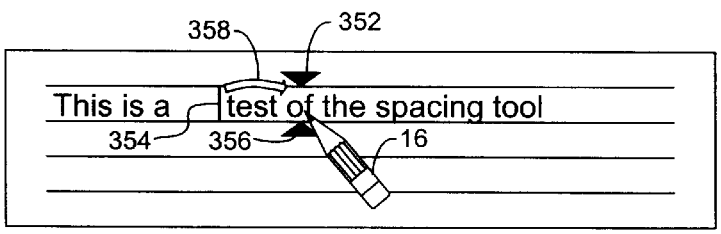
Figure 13C:
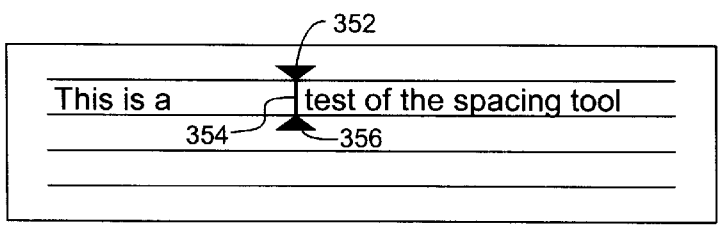
Figure 13D:
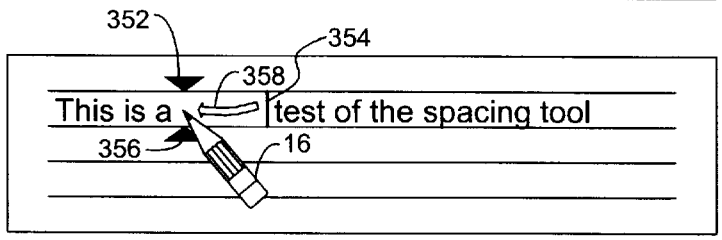

Referring now to FIGS. 13A–13M, the operation of the above methods and space management according to the present invention is shown. Referring now to FIG. 13A, a graphical representation of a portion of the display device 14 is shown with the insertion caret 350 having spacing triangles 352, 356 and a vertical line 354. While the insertion caret 350 is shown as being displayed over text, those skilled in the art will realize that the space tool also operates over ink stroke representations. FIG. 13A shows the display of the insertion caret 350 at a selected position after the user has input a tap or selected the space tool button (not shown) and entered a pen down event. As the user manipulates the pen/input device 16, the display is updated to reflect the movement of the pen 16. As shown in FIG. 13B, the user has positioned the pen over the lower spacing triangle 356 and moved the pen 16 to the right of insertion caret's original position. The display is advantageously updated as shown by moving the spacing triangle 352, 356 to the right of the insertion caret's original position by the same amount as the pen 16 was moved. The vertical line 354 is retained in the original position of the insertion caret 350. The movement of the pen 16 is further delineated by the display of a cursor 358. The cursor 358 preferably takes the form of an arrow that points either upward, downward, leftward or rightward. The point of the arrow cursor 358 is displayed in close proximity to the position of the pen 16 with the tail of cursor 358 extending generally toward the vertical line 354 of the insertion caret 350. As shown in FIG. 13B, the arrow of the cursor 358 points to the right since the triangles have been dragged to the right. The arrow direction of the cursor 358 also alerts the user that horizontal space will be added if the pen 16 is removed from contact with the display. Once the pen 16 is lifted from the display (pen up event) when in the position shown in FIG. 13B, the method of the present invention performs the desired space action and updates the position of the insertion caret 350. The result is shown in FIG. 13C. Since the pen up was to the right of the pen down, additional space is added. As shown, the text string "test of the spacing tool" is moved to the right and new white space equal to the horizontal distance between the pen down and pen up is added.

Figure 13E:
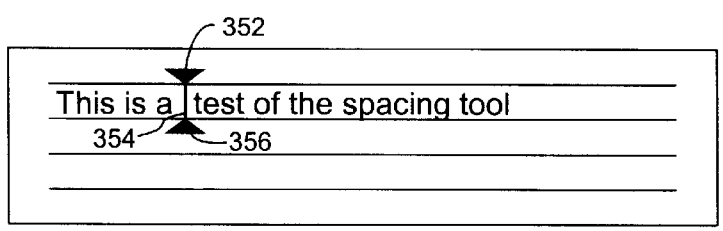

Referring now to FIGS. 13A, 13D and 13E, the operation of the space tool to move space is shown. FIG. 13A shows the initial position of the insertion caret 350 over existing text. To remove text the user positions the pen over a spacing triangle 352, 356 and moves the pen 16 to the right of the original position of the insertion caret 350 as indicated by the vertical line 354. The display is repeatedly updated as shown in FIG. 13D by moving both spacing triangles 352, 356 to provide the user with an indication of how far the pen 16 has been moved to the left of the insertion caret 350, and thus, how much white space will be removed. Again, the cursor 358 provides additional feedback as to the direction the pen has been moved and the type of spacing action that will occur if the pen 16 is lifted from the display. Since the pen 16 has been moved to the left of the vertical line 354, an arrow pointing to the left is shown and indicates to the user that horizontal space will be removed. Once the pen 16 is lifted from the display device 14, the space is removed and the resulting display is as shown in FIG. 13E. The insertion caret 350 returns to its original form, and is positioned at the point where the pen up occurred.

Figure 13F:
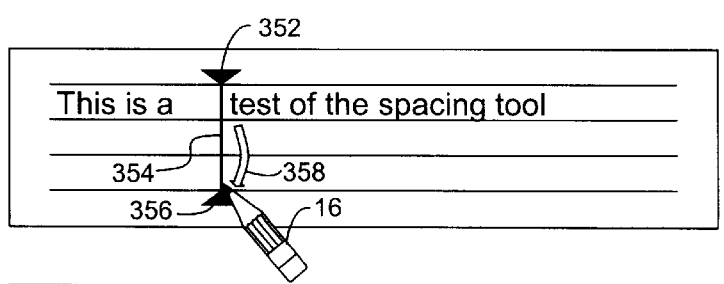
Figure 13G:
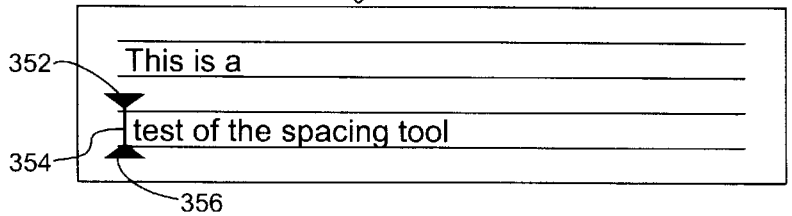

Referring now to FIGS. 13A, 13F and 13G, the operation of the space tool to add several lines of vertical space is shown. Again, FIG. 13A shows the initial position of the insertion caret 350 over existing text. To add vertical lines of white space, the user positions the pen over the lower spacing triangle 356 and moves the pen 16 down from the original position of the insertion caret 350 as indicated by position of the lower triangle 356 and the extended length of the vertical line 354 shown in FIG. 13F. The display is repeatedly updated as the user moves the position of the pen 16. The cursor 358 is shown with a down arrow with the point indicating the position of the cursor 358. Since the cursor 358 has the form of a down arrow vertical space will be added. Once the pen 16 is lifted from the display device 14, end of paragraph markers are added at the original position of the insertion caret 350. The resulting display is shown in FIG. 13G. In this example, since the lower spacing triangle 356 is two lines lower than its original position, two end of paragraph markers are inserted. The insertion caret 350 returns to its original form, and it is positioned after the point where the paragraph markers were inserted.

Figure 13H:
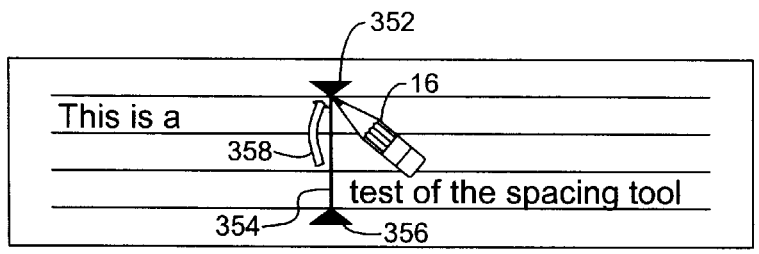
Figure 13I:
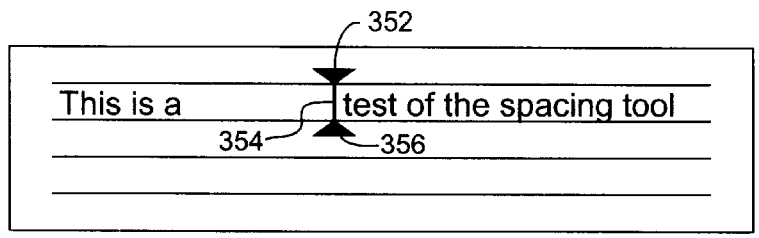

Referring now to FIGS. 13H and 13I, the operation of the space tool to remove several lines of vertical space is shown. The initial position of the insertion caret 350 is just before the text "test" of FIG. 13H. To remove vertical lines of white space, the user positions the pen over the upper spacing triangle 352 and moves the pen 16 up from the original position of the insertion caret 350 as indicated by the position of the upper triangle and the extended length of the vertical line 354 shown in FIG. 13H. The cursor 358 further delineates the position of the pen 16 and also provides the user with feedback that vertical space will be removed since an upward arrow is shown as the cursor 358. As with all four versions of the cursor 358, the point of the arrow is very close to the pen position and the tail extends in the direction of the vertical line 354. Once the pen 16 is lifted from the display device 14, a number of end of paragraph markers are removed. The end of paragraph markers that are removed are those that are between the spacing triangles 352, 356. In other words, any end of paragraph markers that are above the lower triangle 356 and either to the right or below the upper triangle 352 when the pen up event occurs are removed. The resulting display is shown in FIG. 13I. In this example, since the upper spacing triangle 352 is two lines above its original position, the end of paragraph markers between the upper and lower spacing triangles 352, 356 are removed to position the two text strings on the same line. The insertion caret 350 returns to its original form, and is positioned after the point where the paragraph markers were removed.

Figure 13J:
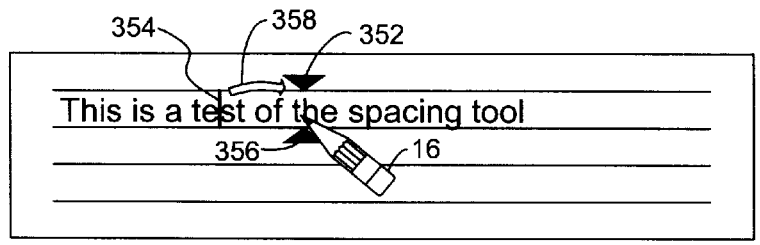
Figure 13K:
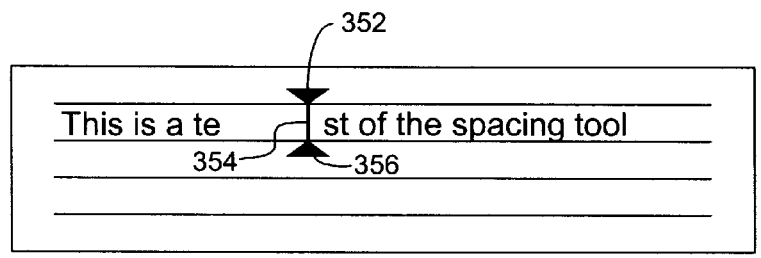

Referring now to FIGS. 13J and 13K, the operation of the space tool when the insertion caret 350 is positioned over an existing word is shown. The initial position of the insertion caret 350 is between the "e" and "s" of the text "test" of FIG. 13J. To add white space, the user positions the pen over a spacing triangle 352, 354 and moves the pen 16 right from the original position of the insertion caret 350 as indicated by the position of the spacing triangles 352, 356 with respect to the vertical line 354 as shown in FIG. 13J. Once the pen 16 is lifted from the display device 14, the word over which the insertion caret 350 was originally positioned will be split and space will be added. The resulting display is shown in FIG. 13K. As can be seen the word "test" is split into two words "te" and "st" with white space equal to the distance between the pen down and pen up added between the two words. The insertion caret 350 returns to its original form, and is positioned after the point where the white space was added.

Figure 13L:
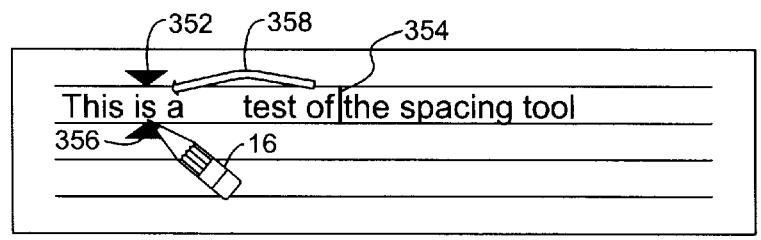
Figure 13M:
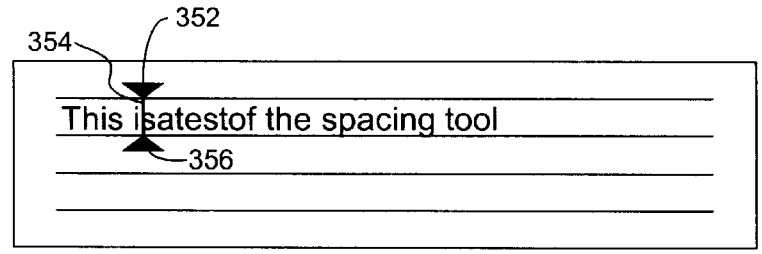

Finally, referring to FIGS. 13L and 13M, the operation of the space tool to join words is shown. The initial position of the insertion caret 350 is between the words "of" and "the" of the text string of FIG. 13L. To remove white space and join several words, the user positions the pen over a spacing triangle 352, 354 and moves the pen 16 left from the original position of the insertion caret 350 as indicated by the position of the spacing triangles 352, 356 with respect to the vertical line 354 as shown in FIG. 13L. As can be seen, the user has moved the spacing triangles 352, 356 to the left of several words and several segments of white space. Once the pen 16 is lifted from the display device 14, the words between the pen down position and the pen up position will be joined to form a single word and all the white space between the pen down position and the pen up position is removed. The resulting display is shown in FIG. 13K. The words "is," "a," "test," and "of" are joined to form a single word "isatestof" as shown in FIG. 13M. The insertion caret 350 returns to its original form, and is positioned at the point where the pen up occurred.

Turning now to FIGS. 14–21C, the processing by the drawing layer will be described in more detail. One of the primary advantages of the present invention is the ability of the system to simultaneously accept and manipulate text and drawing figures in the same interface as has been described above. While such an interface can be easy to use, it is important to identify for the user the layer with which a particular ink stroke representation will be processed. The present invention provides a unique interface that allows the user to quickly and easily identify any ink stroke representations that are processed by the drawing layer.

Figure 14:
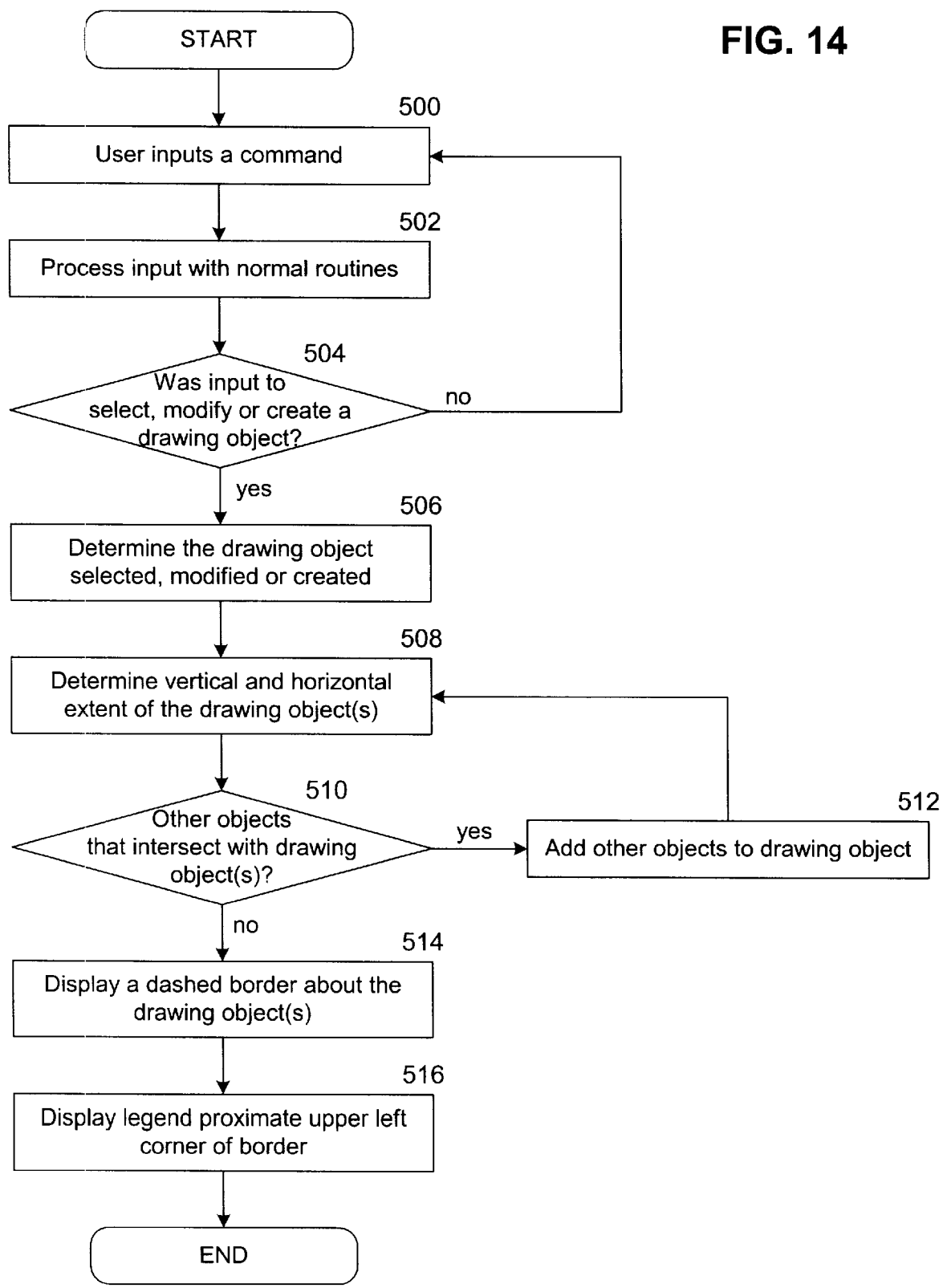
FIG. 14 is a flowchart of a preferred method for displaying elements of the drawing layer in a visually distinct manner in accordance with the present invention.

Referring now to FIG. 14, a preferred method of the present invention for highlighting the drawing area and strokes processed by the drawing layer will be described. The process begins in step 500 with the system 10 accepting inputs from the user. Then in step 502, the system 10 processes the input with normal routines that provide the drawing and word processing functionality. Next, in step 504, the method tests whether the input was to create, modify or select a drawing object or element. If the input does not affect or create any drawing elements then the method returns to step 500 to accept additional inputs. If the input does create, modify or select a drawing element, then the method continues in step 506. In step 506, the method determines the drawing object that has been selected, modified or created. A list of affected objects is then formed and the object determined in step 506 is, added to the list. Then in step 508, the vertical and horizontal extent of the drawing object(s) in the affected list is determined. The vertical and horizontal extents are each a union of the extents of the objects in the affected list. Then in step 510, the method tests whether there are other drawing elements or objects that intersect, even partially, with the extent determined in step 508. Drawing elements are deemed to be intersecting if any portion of the bounding box of one element overlaps with any portion of the bounding box of another element. If there are other objects that intersect with the extent determined in step 508, then the method proceeds to step 512. In step 512, the other object(s) that intersect with the extents of the objects in the affected list are determined and added to the list of affected objects. Then the method returns to step 508 to determine the extents of the objects in the affected list since other objects have been added. If there are no other objects that intersect with the extent determined in step 548, the method proceeds from step 510 to step 514. In step 514, the method displays a, dashed border about the drawing objects in the affected list. This dashed border is preferably about a half of a line height from the extents of the objects in the affected list as determined in step 508. Preferably there is a separate border for each list of affected objects. While the drawing elements are preferably highlighted using a dashed border, those skilled in the art will realize that other highlighting techniques or symbols could be used. Next in step 516, the preferred method displays a legend with the caption drawing proximate the upper left corner of the dashed border. The present invention also allows the user to selectively activate this method. Thus, in situations where highlighting is not desirable, such as for presentations, the border and legend will not be shown on the display device about any of the drawing elements. of the objects in the affected list. Then in step 510, the method tests whether there are other drawing elements or object that intersect, even partially, with the extent determined in step 508. Drawing elements are deemed to be intersecting if any portion of the bounding box of one element overlaps with any portion of the bounding box of another element. If there are other objects that intersect with the extent determined in step 508, then the method proceeds to step 512. In step 512, the other object(s) that intersect with the extents of the objects in the affected list are determined and added to the list of affected objects. Then the method returns to step 508 to determine the extents of the objects in the affected list since other objects have been added. If there are no other objects that intersect with the extent determined in step 508, the method proceeds from step 510 to step 514. In step 514, the method displays a dashed border about the drawing objects in the affected list. This dashed border is preferably about a half of a line height from the extents of the objects in the affected list as determined in step 508. Preferably there is a separate border for each list of affected objects. While the drawing elements are preferably highlighted using a dashed border, those skilled in the art will realize that other highlighting techniques or symbols could be used. Next in step 516, the preferred method displays a legend with the caption drawing proximate the upper left corner of the dashed border. The present invention also allows the user to selectively activate this method. Thus, in situations where highlighting is not desirable, such as for presentations, the border and legend will not be shown on the display device about any of the drawing elements.

Figure 15A:
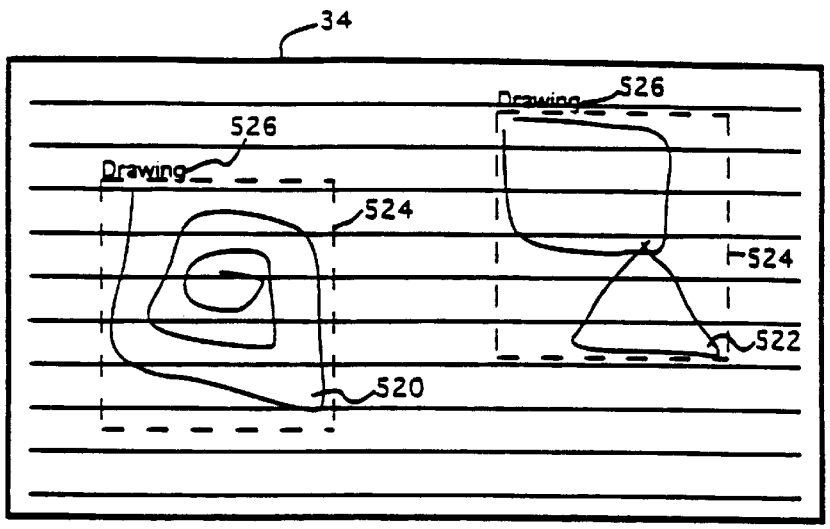
FIGS. 15A and 15B are graphical representations of the screen of the display device showing the elements of the drawing layer in a visually distinct manner in accordance with the present invention.
Figure 15B:
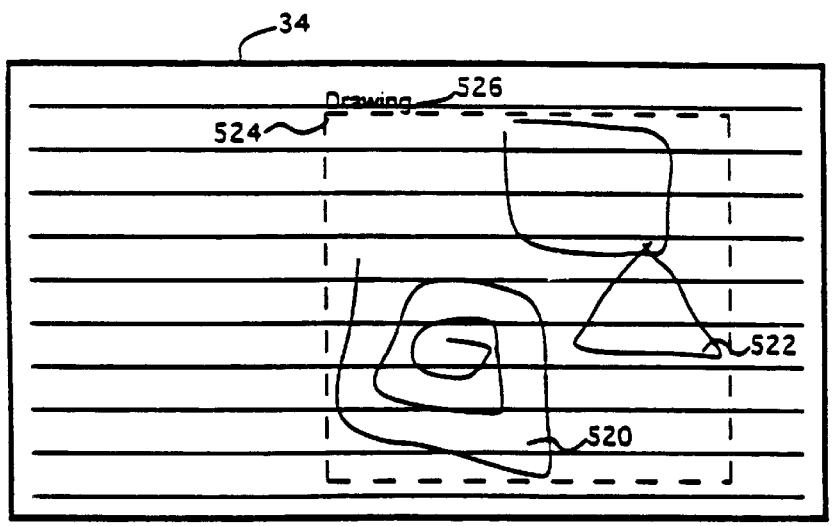

Referring now to FIGS. 15A and 15B, a graphical representation of the screen 34 of the display device 14 showing drawings in a highlighted manner according to the present invention is shown. FIG. 15A shows two drawing elements 520, 522 each being displayed in the highlighted manner according to the present invention. Each of the drawing elements 520, 522 has a respective border 526 and legend 526. FIG. 15B illustrates how the display is adjusted as the first element 520 is moved such that its bounding box intersects with the second element 522. The extents of both objects are determined and the union is taken, and then only a single border 526 about the extent of the union and legend 526 are used to display the elements 520, 522 in a highlighted manner.

The present invention provides further advantageous features in processing the drawing layer. The present invention advantageously broadens the definition of line type elements, thereby, expanding the number of operations that can be performed on many figures. As shown in FIG. 16A and 16B, most computer drawing programs provide two types of elements that can be manipulated. FIG. 16A shows a shape type element 180 that provides a bounding box defined by handles 182, 184 about the periphery of the bounding box for modifying and manipulating the shape type element 180. Shape type elements 180 typically have at least four handles to define the bounding box. FIG. 16B shows a line type element 186 that provides two handles 184 at opposite ends of the stroke. The present invention is advantageous because it does not limit line type elements 184 to pure geometric lines and segments as does the prior art. As illustrated in FIG. 16B, the figure has line type characteristics despite the fact that it is not a line in the true geometric sense.

Figure 17A:
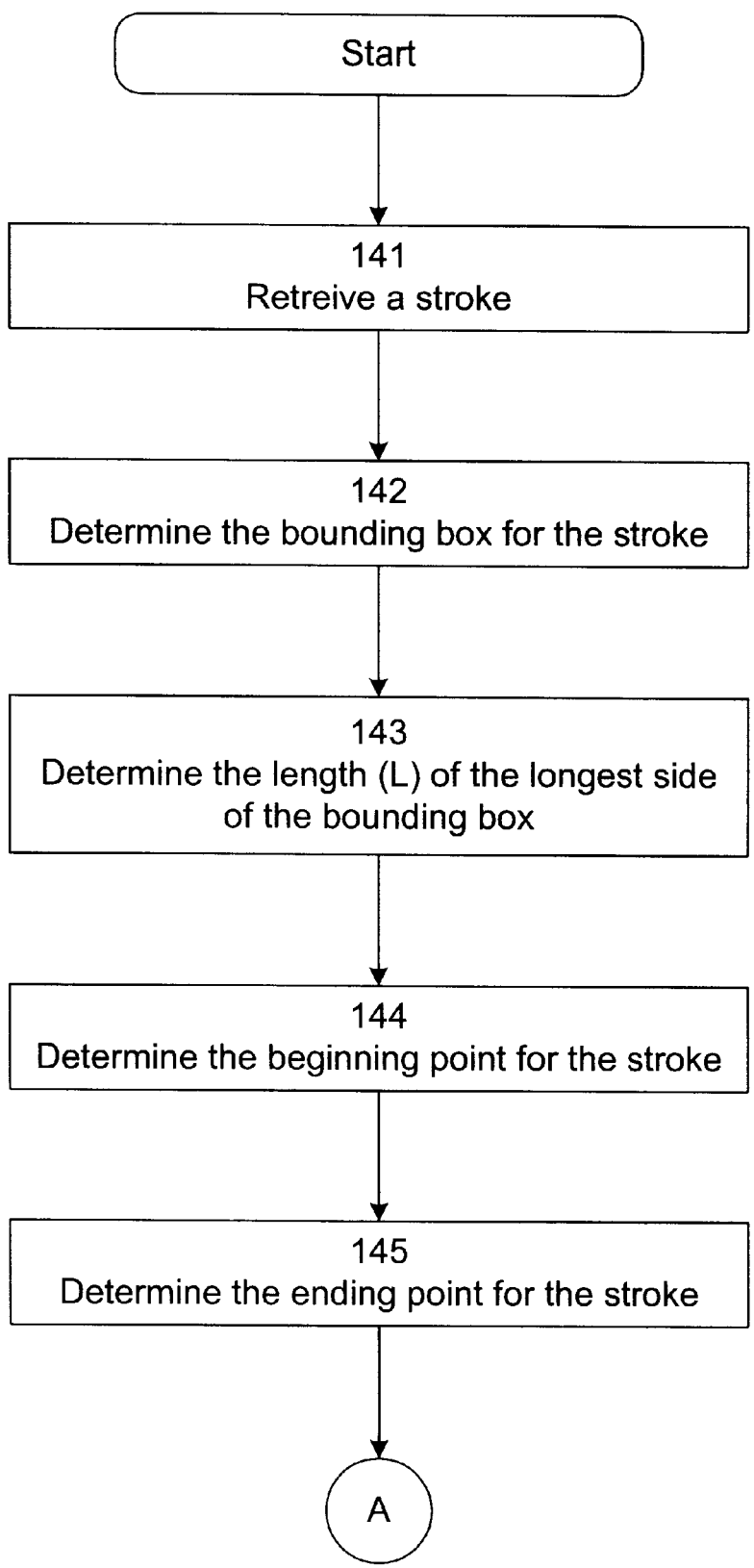
FIGS. 17A and 17B are a flowchart of a preferred method for determining whether a stroke is a line type or shape type drawing according to the present invention.
Figure 17B:
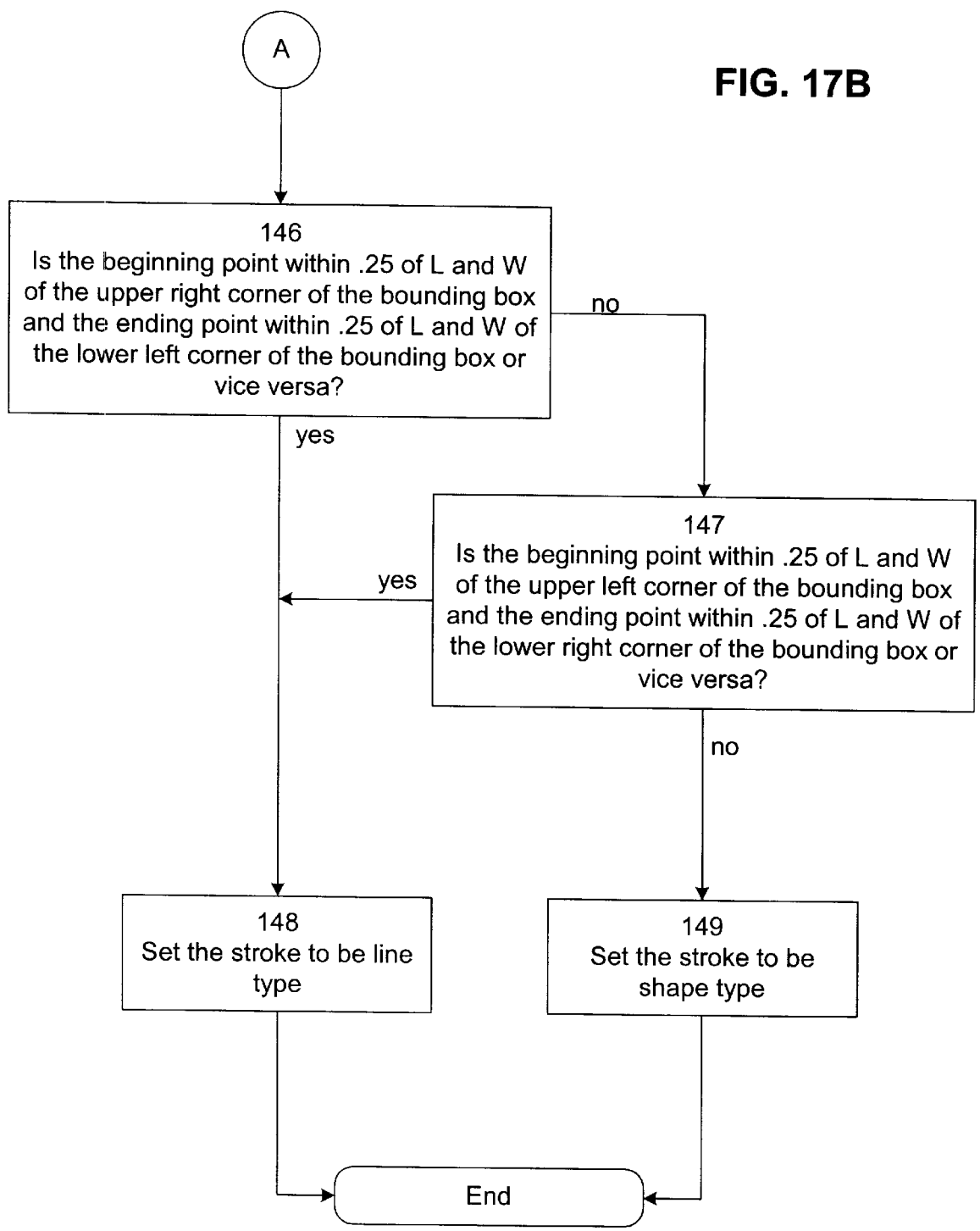

In addition to the broadened definition for line type elements 186, the present. invention includes a method for automatically categorizing ink stroke inputs as line type or shape type elements. Referring now to FIGS. 17A and 17B, the preferred method for identifying the element type in the drawing layer is illustrated. The process begins by retrieving the stroke to be typed or categorized in step 141. The bounding box for the stroke is determined in step 142. Next in step 143, the lengths, L and W, of two adjacent sides of the bounding box are determined. The length L represents the length of the longer side, and the length W represents the length of the shorter side. Then in steps 144 and 145, respectively, the beginning point and the ending point for the stroke are determined. In order to determine. whether a stroke is a line type or a shape type the present method compares the beginning and ending points of the stroke with the bounding box for the stroke. If the beginning point and ending points are within a predetermined distance of the opposite comers of the bounding box the stroke is a line type element. The present invention preferably selects the predetermined distance to be a percentage of L and W for each corresponding side of the bounding box. In addition, a minimum value is used instead of the percentage if L and W are unusually small. In an exemplary embodiment, the percentage is set to be 25% and the minimum is set to be ¼ of a line height. Thus, the end points of the stroke must be within 0.25 times L and 0.25 times W of opposite comers of the bounding box for the stroke to be a line type element, and at a minimum if L and W are very small, within ¼ of a line height of L and ¼ of a line height of W. In step 146 of FIG. 78, the method first tests whether either of the following is true: 1) the beginning point is within the predetermined distance from the upper right-hand comer of the bounding box for the stroke and the ending point is within the predetermined distance of the lower left-hand comer of the bounding box; or 2) the beginning point is within a predetermined distance from the lower left-hand comer of the bounding box for the stroke and the ending point is within the predetermined distance of the upper right-hand comer of the bounding box. If either test is true, then the stroke is set to be a line type in step 148, and the process ends in step 150. Otherwise, the method continues in step 147 to test whether the stroke extends between the other pair of opposite comers. Step 147 tests whether: 1) the beginning point is within the predetermined distance from the upper left-hand comer of the bounding box for the stroke and the ending point is within the predetermined distance of the lower right-hand comer of the bounding box; or 2) the beginning point is within the predetermined distance from the lower right hand comer of the bounding box for the stroke and the ending point is within the predetermined distance of the upper left-hand comer of the bounding box. If either test in step 147 is true, the stroke is processed as a line type in step 148, otherwise the stroke is set to be a shape type in step 149. Those skilled in the art will realize that this method may also be modified to process groups of strokes as line or shape types. For example, when processing a group of strokes the bounding box is defined as a box including all the strokes contained within the group. The method then proceeds as described above to determine if any one stroke in the group meets the criteria to qualify as a line type. If there is even a single stroke that qualifies as a line type, then the entire group of strokes is given the characteristics of a line type, with a box including all the strokes contained within the group.

The system 10 of the present invention is also advantageous because of the additional functionality in the user interface for manipulating drawing elements. Conventional computer drawing programs only provide a single handle type for re-sizing the object or stroke in the bounding box. In order to perform other features such as rotation of the object, the user must select the object and then activate a menu containing special tools for rotation. However, the present invention provides two types of handles 182, 184 as shown in FIGS. 16A and 16B.

Figure 18A:
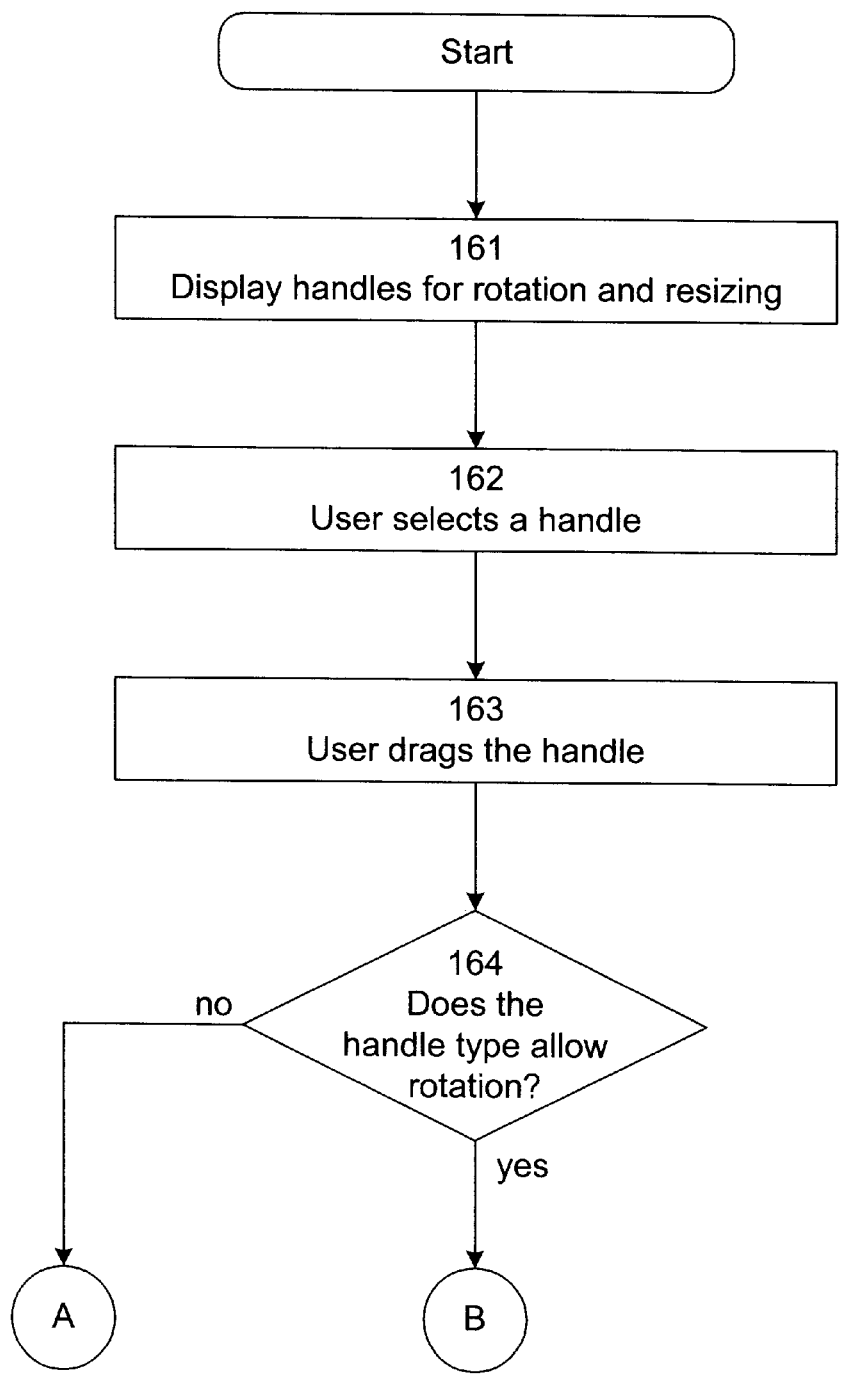
FIGS. 18A and 18B are a flowchart of the preferred method for performing rotation and re-sizing operations in accordance with the present invention.
Figure 18B:
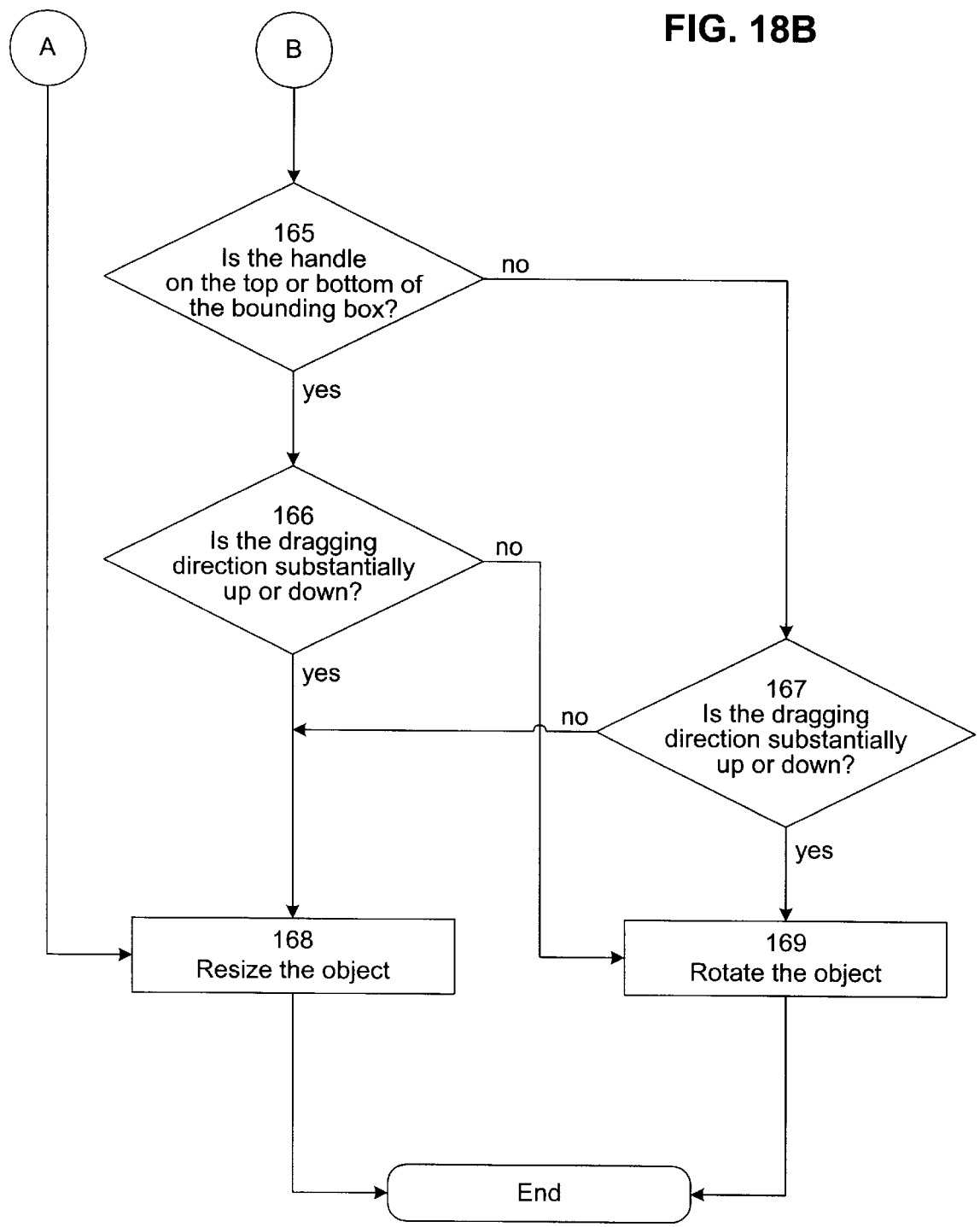

Referring now to FIGS. 18A and 18B, the method of the present invention for providing both rotation and re-sizing handles and their operation will now be described. The method begins in step 161 by displaying the two types of handles 182, 184. The two types of handles are displayed in a visually distinct manner so that they can be readily identified by the user. The first handle type 182 is represented on the display as a small square about the periphery of the bounding box and can be used only for re-sizing. The first handle type 182 is primarily positioned on the corners of the bounding box for shape type objects. The second handle type 184 is represented on the display as a small circle. The second handle type 184 allows the object to be rotated or re-sized. For shape type objects, the second handle type 184 either re-sizes or rotates the object depending on the location of the handle and the direction it is moved or dragged using the input device 16. The second handle types 184 are preferably positioned on the sides of the bounding box between first handle types 182. For line type objects, second handle type 184 simultaneously re-sizes and rotates the object. The second handle types 184 are preferably positioned at the endpoints of line type objects.

Next, the user first selects a handle in step 162 and then manipulates it (i.e., drags the handle) instep 163. The process then determines the type of the handle and whether it allows rotation in step 164. If the handle does not allow rotation (first type handle 182), the process moves to step 168 and the object is resized in a conventional manner simultaneously both horizontally and vertically (two dimensions). However, if the handle does allow rotation (second type handle 184), the process moves to step 165. Generally, the method of the present invention will rotate the object if the direction the handle is dragged is substantially parallel to the closest side of the bounding box, and will re-size the object in one dimension if the direction of the handle is dragged is substantially perpendicular to the closest side of the bounding box. For example, in one embodiment a square area with each side about ⅛th of an inch from the handle 184 is defined and divided into equal triangular quadrants. If the handle is dragged into either quadrant that contains a side of the bounding box, the object is rotated. If the handle is dragged into either quadrant that does not contain a side of the bounding box, the object is re-sized. In step 165, the method determines the position of the second type handle 184. If the handle is on the top or bottom of the bounding box process continues in step 166, otherwise the process continues in step 167. In step 166, the second type handle 184 is known to be on the top or bottom of the bounding box. Therefore, movement in a substantially vertical direction is interpreted as a re-sizing instruction, while movement in a substantially horizontal direction is interpreted as a rotation instruction. Depending on the orientation movement, substantially vertical or horizontal, the method proceeds to either step 168 to re-size the object, or to step 169 to rotate the object. In either step 168 or 169, the action is performed in the same direction the object was dragged. Similarly, in step 167, second type handle 184 is known to be on the side of the bounding box. Therefore, opposite with step 166, movement in a substantially vertical direction is interpreted as a rotating instruction, while movement in a substantially horizontal direction is interpreted as a re-sizing instruction. It should be understood that the determinations of the direction the handle is dragged in steps 165, 166 and 167 are made based on movement relative to the object. Thus, once an object has been rotated, dragging in the same direction that originally caused the object to be rotated may not produce the same result because the determinations of top, bottom, horizontal direction and vertical direction are made relative to the current position of the object. Once the object has been rotated or re-sized, the method is complete.

Figure 19A:
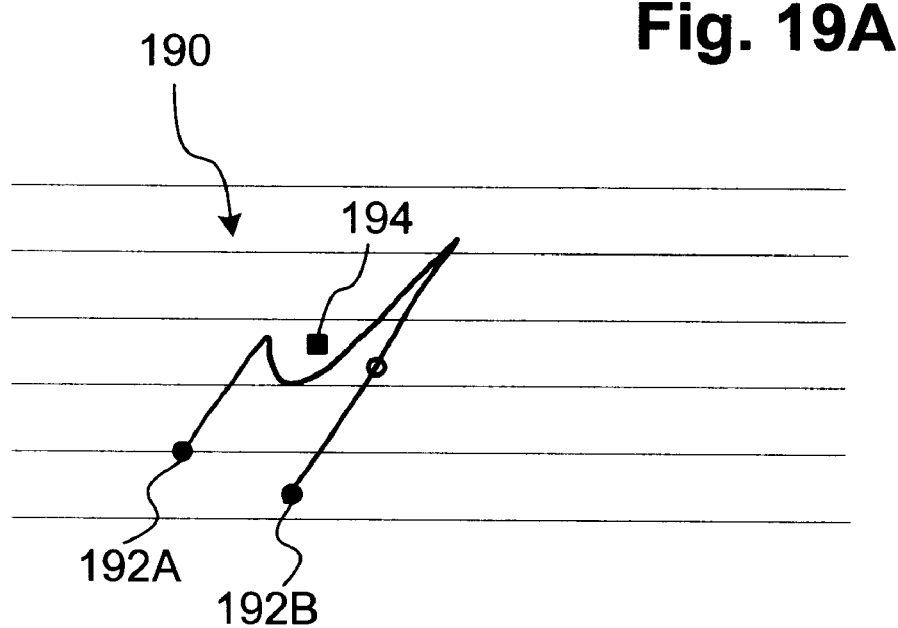
FIGS. 19A and 19B are graphical representations of a screen display showing the user interface for rotating a line type figure.
Figure 19B:
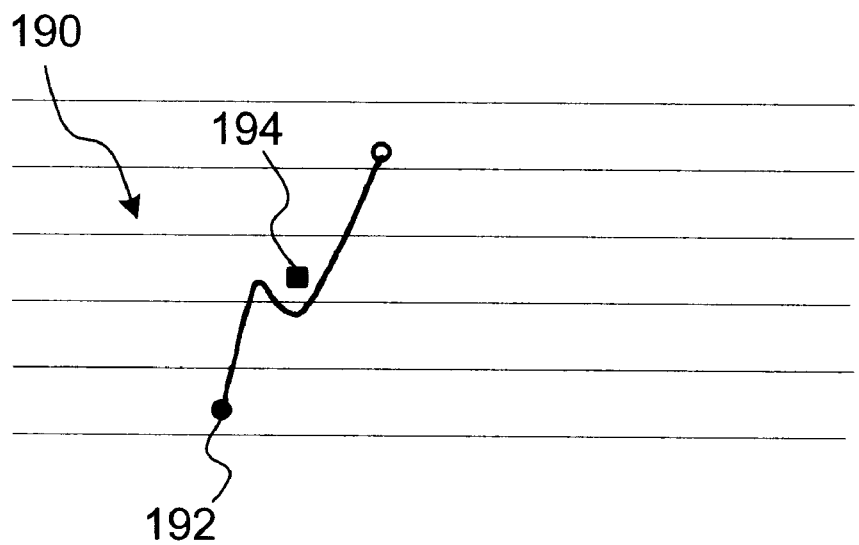

The process for re-sizing and rotating are best shown in FIGS. 19A–21C. FIG. 19A shows a selected line object 190 and the user is dragging a handle 192 from a first position 192A to a second position 192B. As described above, the present invention simultaneously re-sizes and rotates so that the result of dragging handle 192 is shown in FIG. 19B where the line has been both re-sized and rotated. As can be seen, the rotation preferably occurs about the center point for the line object 190 delineated by a solid small square 194.

Figure 20A:
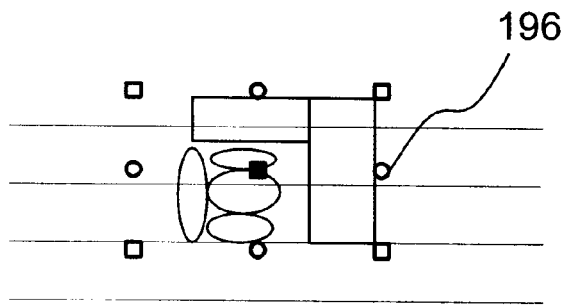
FIGS. 20A, 20B, and 20C are graphical representations of a screen display showing the user interface for rotating a shape type figure.
Figure 20B:
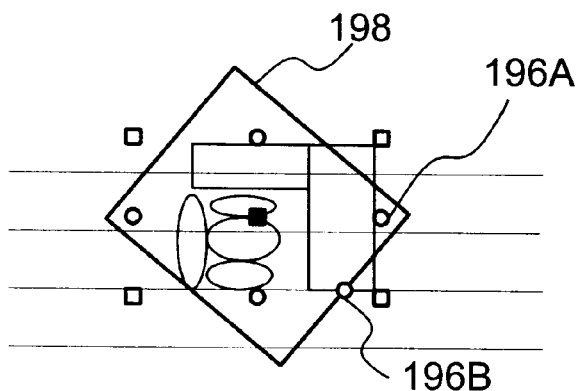
Figure 20C:
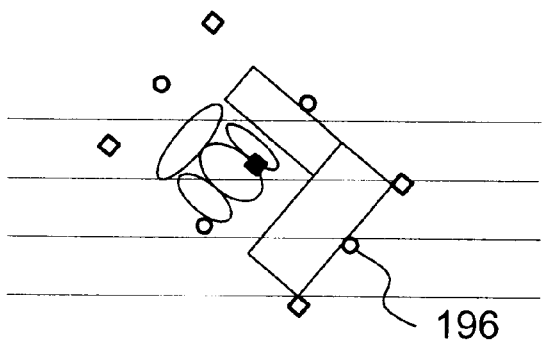

FIGS. 20A–20C demonstrate user manipulation of the second type handle 184 to rotate a shape type object. The user first selects the shape object to reveal the handles as shown in FIG. 20A. The user then selects a handle 196, and drags the handle 196 in this case in a substantially vertical direction from point 196A to point 196B. The present invention advantageously shows an outline 198 of the position to which the shape object will be rotated in FIG. 20B. The user can then tap on the handle 196 to rotate the object to the position shown in FIG. 20C. In an alternate embodiment, the shape type object will automatically be positioned as shown in FIG. 20C once the user stops dragging the handle 196 and removes the input device 16 from within contact with the display.

Figure 21A:
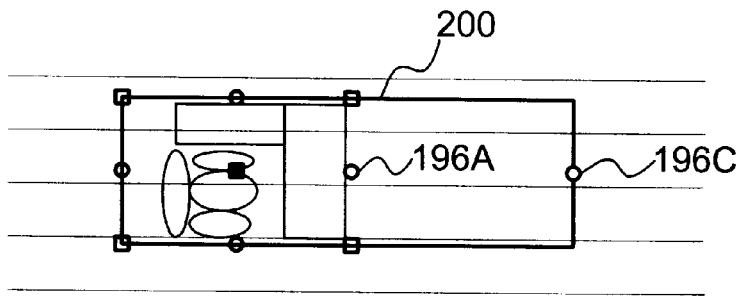
FIGS. 21A, 21B, and 21C are graphical representations of a screen display showing the user interface for re-sizing a shape type figure.
Figure 21B:
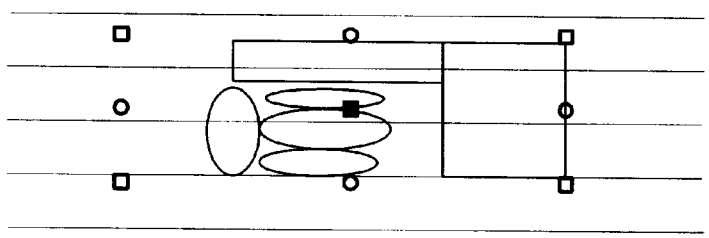
Figure 21C:
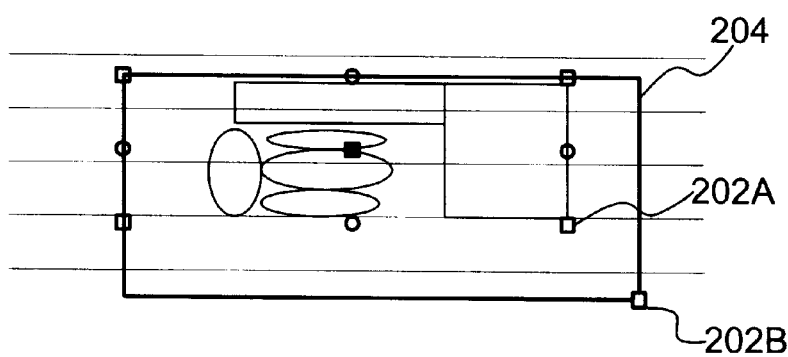

FIGS. 21A–21B demonstrate user manipulation of second type handle 184 to resize a shape type object. The user first selects the shape object to reveal the handles as shown in FIG. 20A. The user then selects the handle 196, and drags the handle 196 in this case in a substantially horizontal direction from point 196A to point 196C, as shown in FIG. 21A. The present invention advantageously displays an outline 200 of the position to which the shape object will be re-sized. The user can then tap the handle 196 to re-size the object to the size shown in FIG. 21B. FIG. 21C illustrates the manipulation of first type handle 182 to resize a shape type object. This operates in a conventional manner to resize the object to the size of outline 204 when the handle 202 is dragged from point 202A to 202B.

Figure 22A:
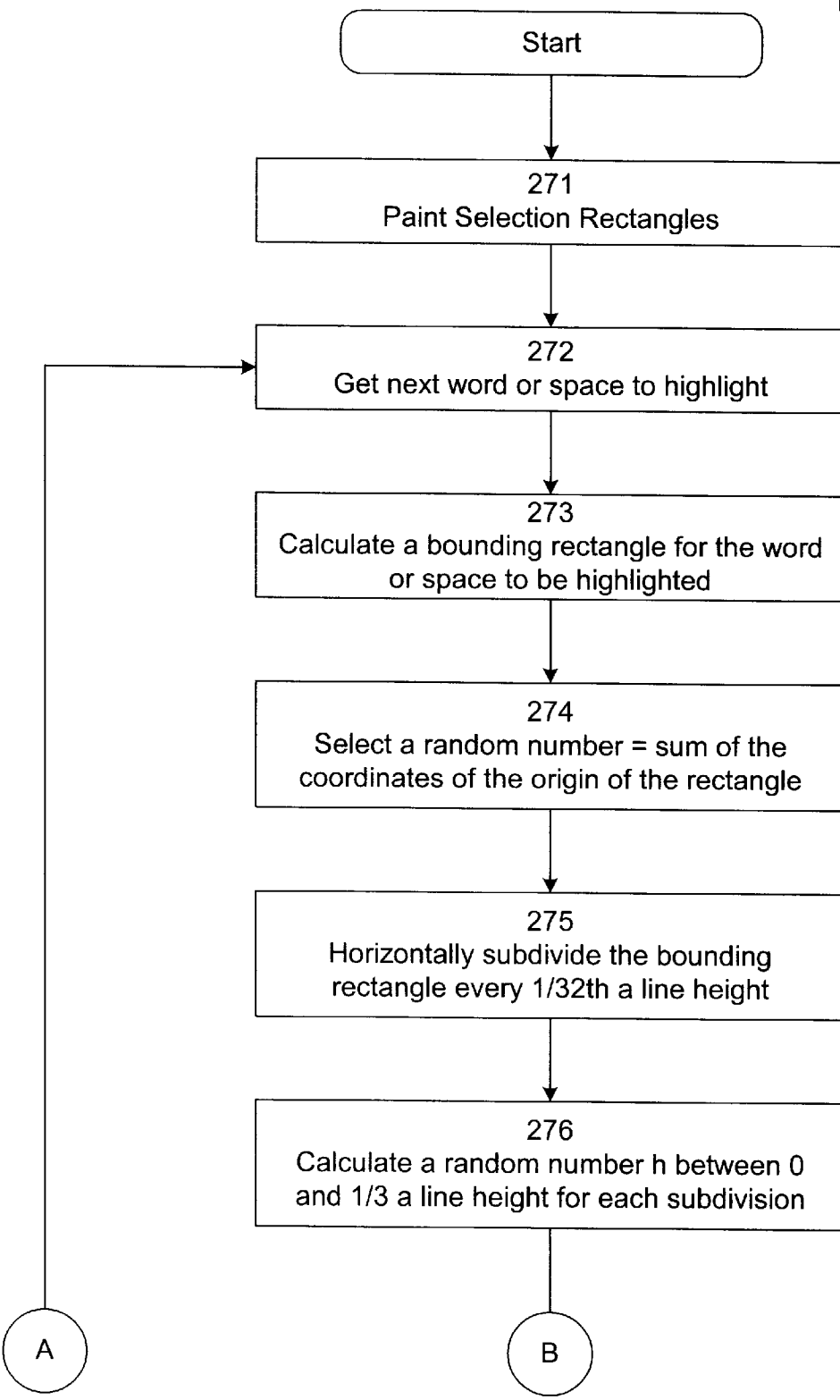
FIGS. 22A and 22B are a flowchart of a preferred method for highlighting graphical representations of strokes on the display.
Figure 22B:
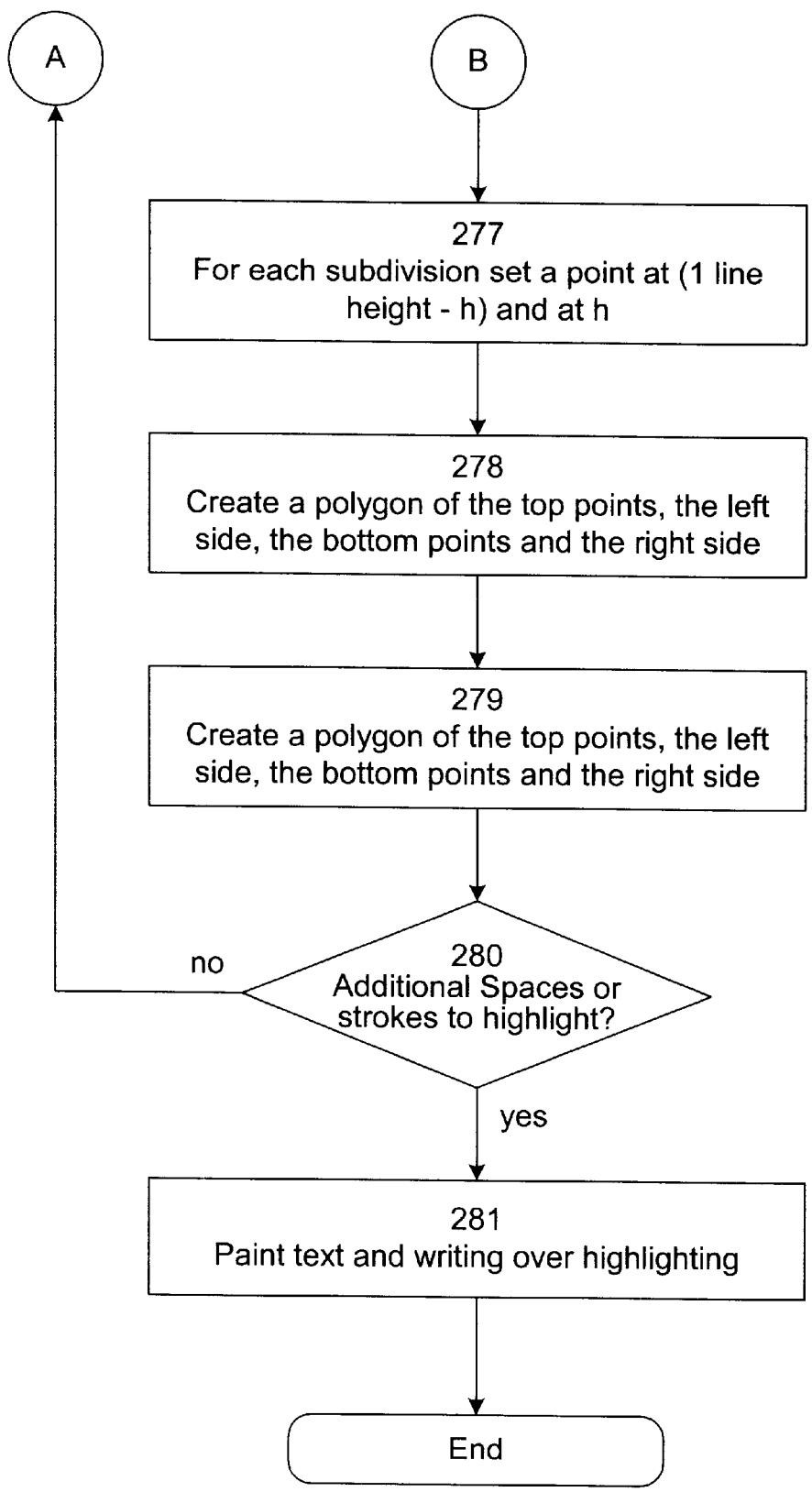

The present invention also includes a method for generating and maintaining highlights on strokes input and displayed by the system 10. The preferred method for highlighting is particularly advantageous because the visual representation is such that a selection rectangle can be shown and distinguished from the highlighting; the highlighting has jaggedness that looks hand drawn; and the highlighting is an attribute applied to text allowing the highlighting to move with the text as it is copied or word wrapped. Referring now to FIGS. 22A and 22B the preferred method for highlighting text will be described. The method begins in step 271 by painting selection rectangles on the display. In step 272, the method retrieves the first word or space to be highlighted. Then in step 273 for the retrieved word or space, a bounding rectangle, which spans the width of the word and is one line in height, is calculated. Next in step 274, the method seeds a random number that is equal to the sum of the X and Y coordinates of the origin of the rectangle. This provides different jaggedness for each line. In step 275, the bounding rectangle is horizontally subdivided at ¹⁄₃₂nd of line height intervals. Then in step 276, a random number, h, between zero and ⅓ a line height is calculated for each horizontal subdivision. In step 277, two points are set for each subdivision. One point is set at one line height minus h and the other point is set at h. Then in step 278, a polygon is created by connecting the points along the top, the two points on the left side, points along the bottom and the two points on the right side of the bounding rectangle. The polygon is the area on the display that is highlighted. Then in step 280, the method tests whether there are additional words or spaces to highlight. If there are, the method returns to step 272 to process the next word. Otherwise, the method moves to step 281 where the text and writing are displayed over the highlighting and the process is complete.

Figure 23:
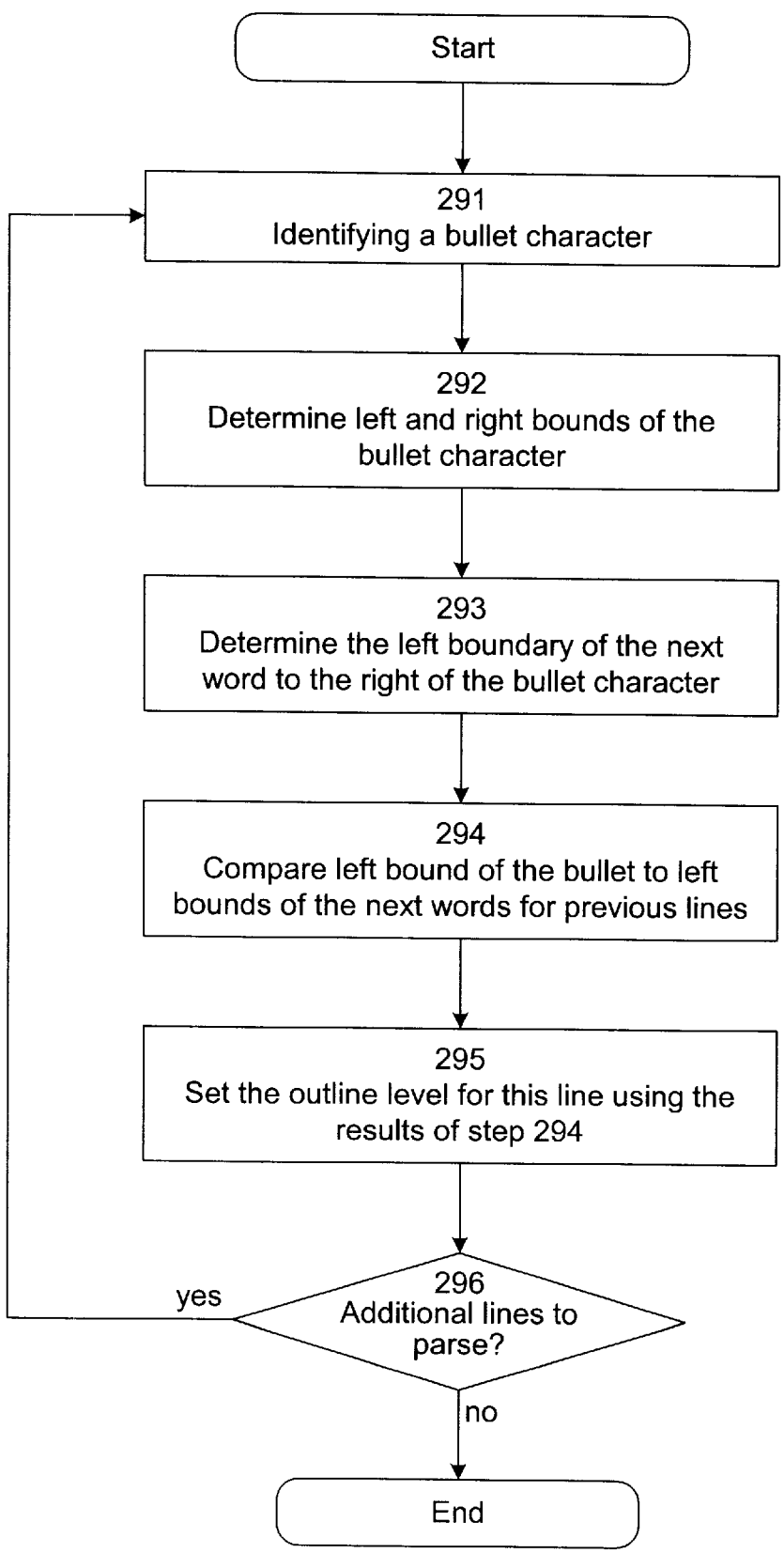
FIG. 23 is a flowchart of a preferred method for automatically determining outline levels for text inputs.

Referring now to FIG. 23, a preferred method for automatically identifying bullet characters and creating hanging indents for outlining functions will be described. The preferred method begins in step 291 by identifying a bullet character. This can be done using conventional character recognition methods. Next, in step 292 the left and right bounds of the bullet character are determined. Then in step 293, the next word to the right of the bullet character and its left boundary are determined. This position is preferably used as the distance of the hanging indent for subsequent lines of the same paragraph. The data of steps 292 and 293 are also stored for use in processing other lines. Next, in step 294, the left boundary of the bullet is compared to the left boundary of the next words for all of the preceding lines. Then in step 295 the outline level and the position for the hanging indent are set using the comparison results of step 295. If the left boundary of the bullet is to the right of the left boundary of the next word of the previous paragraph, then the bullet has a lower level in the outline. If the left boundary of the next word is to the left of the left boundary of the bullet for the previous paragraph, then the bullet has a higher level. If neither of these two conditions is true, then the bullet has the same level in the outline. Finally, the method tests whether there are additional lines to parse. If there are, the method returns to step 291, otherwise the method is completed.

While it is possible to perform step 291 of FIG. 23 using conventional character recognition methods, the present invention also provides a special character recognition method tailored to identifying bullets and dashes. The special character recognition method tailored to identifying bullets and dashes can also be used for bullet paragraph parsing as described above with reference to FIG. 10B. This method is particularly advantageous because it improves the paragraph parsing methods described above with bullet and dash recognition that is faster, more efficient as well as more accurate and more tolerant for pen-based inputs. This method will now be described with reference to FIGS. 24A and 24B. The preferred method begins in step 600 by selecting a line of strokes to process. Then in step 602, the method tests whether there is at least one word on the selected line. If there are no words on the line the method proceeds to step 604. In step 604, the method tests whether there are more lines in the document or area upon which bullet character recognition is being performed. If there are no more lines to process the method is complete and ends. However if there are more lines to process, the method returns to step 600 to select another line.

If there is at least one word on the selected line, the preferred method continues in step 606 by selecting the first word on the selected line. In selecting the first word, the method selects the word on the line with a left border that has the leftmost position of the words on the line. Next in step 608, the method tests for quote marks because they are often incorrectly recognized as dashes and bullets. The present invention performs two tests designed to eliminate quote marks from being recognized as dashes or bullets. First, the method tests each stroke in the first word to determine whether the stroke height of the selected stroke is greater than one-sixth of line height. Second, the method tests each stroke in the first word to determine whether the aspect ratio (ratio of the stroke's width to its height) is less than 2.5. If all strokes in the first word have a height greater than one-sixth of line height and have aspect ratios less than 2.5, the method returns to step 604 to process any remaining lines because the first word is probably a quote mark. If at least one stroke in the first word has a height not greater than one-sixth of line height or has an aspect ratio not less than 2.5, then the method continues in step 610. In step 610, the method selects the first stroke of the selected first word. Again, the stroke selected is the stroke with the left boundary that has the leftmost position on the line.

Next, beginning with step 611 and continuing through step 612, 614, 616, and 618, the method tests whether each stroke forming the selected words meets the criteria for being a dash. In order for a word to be recognized as a dash, all of the strokes forming the word must pass all the tests in steps 611 612, 614, 616, and 618. Thus, the preferred method tests each stroke against the criteria. If any of the strokes does not meet the criteria, the selected word is not a dash and is passed on to step 630 to determine whether the word is a bullet. In step 611, the method first tests whether the stroke height is less than or equal to one-fifth of a line height. If not the method moves to step 630. Otherwise, the method proceeds to the second test in step 612. In step 612, the method tests whether the stroke width is greater than or equal to one-fifth of a line height. If not the method proceeds to step 630. Otherwise, the method proceeds to the third test. In step 614, the method tests whether the stroke width less than or equal to 1.5 line heights. If not the method proceeds to step 630. Otherwise, the method proceeds to the fourth test. In step 616, the method tests whether the stroke is between one-fifth and four-fifths of a line height above the baseline for the line with which the stroke is associated. If the stroke is not within these bounds, the method continues to test whether the word is a bullet in step 630. If the stroke is not within these bounds, the method finally tests whether the aspect ratio for the stroke is less than half. If the aspect ratio is not less than half the method jumps to step 360, otherwise it continues in step 618. In step 618, the stroke is set as evaluated and meeting the criteria for being a dash. Then in step 620, the method tests whether all the strokes forming the selected word have been evaluated as a dash. If there are more strokes to be tested, the method moves to step 624 and retrieves the next stroke forming the word. The strokes are preferably processed and ordered from left to right. Thus, the method selects the next stroke to the right of stroke currently being evaluated. Then the method returns to step 611 to perform the tests on the next stroke. On the other hand, if all the strokes forming the word have been evaluated and are set to be a dash, the method moves to step 626, where the method recognizes the first word as a dash and moves to step 604 to process any remaining lines.

Figure 24B:
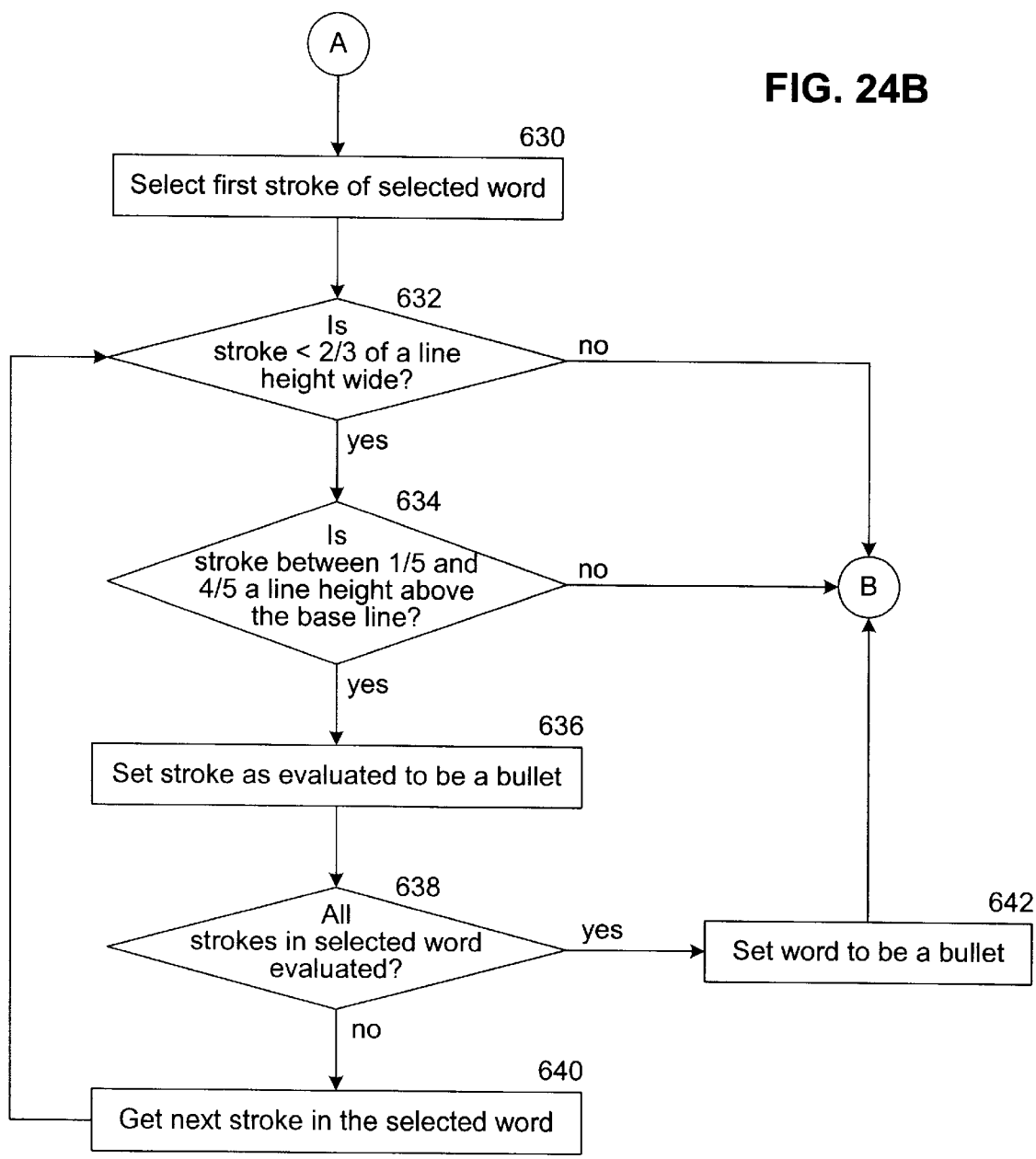

If any stroke of the selected word does not meet the criteria for being recognized as a dash, then the method tests whether the selected word meets the criteria for being recognized as a bullet character, as shown in FIG. 24B. In step 630, the first stroke of the selected word is retrieved. The first stroke is preferably the leftmost stroke of the word as has been noted above. Then in step 632, the method tests whether the stroke is less than two-thirds of a line height wide. If not the method returns to step 604 of FIG. 24A to test any remaining lines. If the stroke is less than two-thirds of line height wide, the method proceeds to step 634. In step 634, the method tests whether the stroke is between one-fifth and four-fifths of a line height above the baseline for the line with which the stroke is associated. If the stroke is not within these bounds, the method returns to step 604 of FIG. 24A. However, if the stroke is within these bounds, then the method sets the stroke to be evaluated as a bullet in step 636. Then in step 638, the method tests whether all the strokes forming the selected word have been evaluated as a bullet. If there are more strokes to be tested, the method moves to step 640 and retrieves the next stroke in the selected word. Then the method returns to step 632 to perform the same tests on the next stroke of the selected word. If all the strokes forming the word have been evaluated and are set to be a bullet, the method sets the word to be recognized as a bullet, after which the method moves to step 604 to process any remaining lines.

Figure 25:
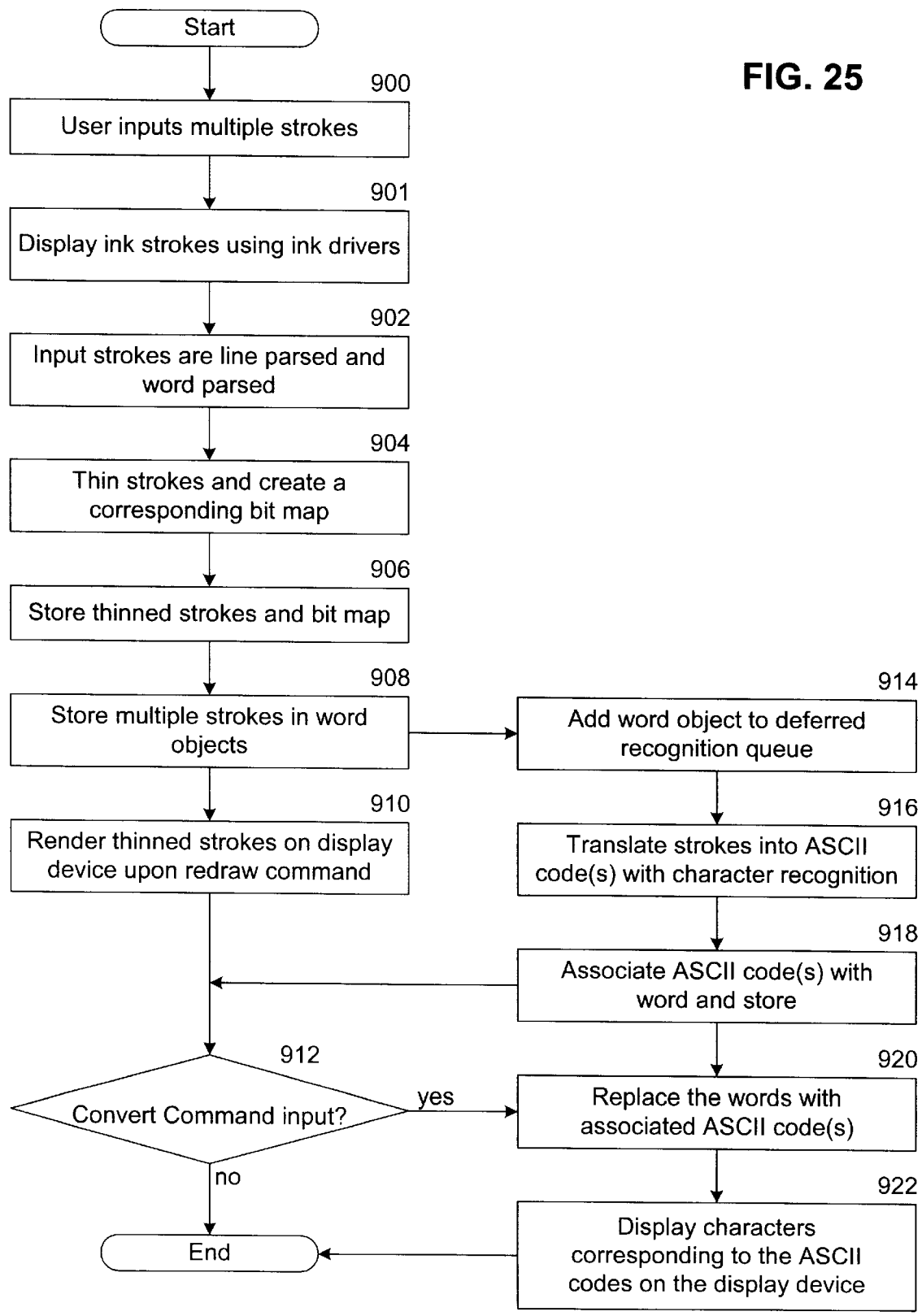
FIG. 25 is a flowchart of a preferred method for performing deferred character recognition on ink stroke representations in accordance with the present invention.

Another performance enhancement provided by the present invention is the ability of the system to perform character recognition in the background. The system 10 of the present invention includes character recognition routines 37 as has been discussed above. Included within these routines is a method for performing deferred recognition of ink stroke representations. Referring now to FIG. 25, the preferred method for performing deferred recognition of ink stroke representations will be described. The method for performing deferred recognition of ink stroke representations begins in step 900 when the user inputs one or more strokes into the system 10 using the input device 16 and the display device 14. Then in step 901, the input strokes are immediately rendered on the display device 14 using ink drivers. While the strokes are displayed, the strokes are not in a form that provides for any significant manipulation. Next in step 902, the input strokes are line parsed and word parsed as has been described above with reference to FIGS. 4, 6, 7 and 8. Then in step 904, the strokes are thinned and a bit map is created. The method for thinning strokes is described below with reference to FIG. 26 and is part of a preferred method of performing deferred recognition, however, those skilled in the art will realize that deferred recognition could be performed without step 906. Next in step 908, the strokes are stored in memory 18 as word objects according to the results of word parsing. Once the strokes are stored as words, the system 10 advantageously proceeds in parallel. In step 910, the method renders the words on the display device 14 using the stored words as a reference. This display step is preferably performed in response to a command to re-draw or render the strokes. Such a command could be initiated by a scroll command or other similar command. Moreover, after step 910 the system 10 allows further processing of strokes for word wrapping or responding to other user manipulation inputs. After step 910, the display process continues, and the method proceeds to step 912. Steps 914, 926 and 918 are performed in the background relative to the display step 910 and the processing of other user manipulation inputs. In step 914, the new word object(s) stored in step 908 are added to a deferred recognition queue that is part of the character recognition routines 37 stored in memory 18. Each word added to the deferred recognition queue is processed in turn by applying the conventional character recognition routines to the strokes stored together as a word. In step 916, each of the words are taken in their order of storage and character recognition is performed on the words. Then in step 918, the ASCII codes for characters recognized in the word are associated with the word and stored as part of the word. In the preferred embodiment, the system 10 performs steps 914, 916, 918 in the background. Thus, processing cycles are first used to update the display and process the commands input. However, anytime the processor 12 is available, the available cycles are used to perform character recognition on the words in the deferred recognition queue. Therefore, when the user inputs a convert command indicating that character recognition is should be performed, the system 10 simply retrieves the ASCII codes stored with the word and updates the display. Since these steps can be performed very quickly relative to performing the actual character recognition, the user does not have to wait while the system 10 performs the character recognition because it has already been performed in the background. After step 910 and step 918 have been completed, the method proceeds to step 912 to determine whether the user has input the convert command indicating that the strokes should be replaced with the characters output by character recognition. If the convert command has not been input the method is complete. The method can then be performed again anytime more strokes are input. If the convert command has been input, the method continues in step 920. In step 920, strokes are replaced with their associated ASCII codes. Then in step 922, the display is updated by displaying characters corresponding to the ASCII codes instead of the ink stroke representations. The method is then complete and ends.

Figure 26:
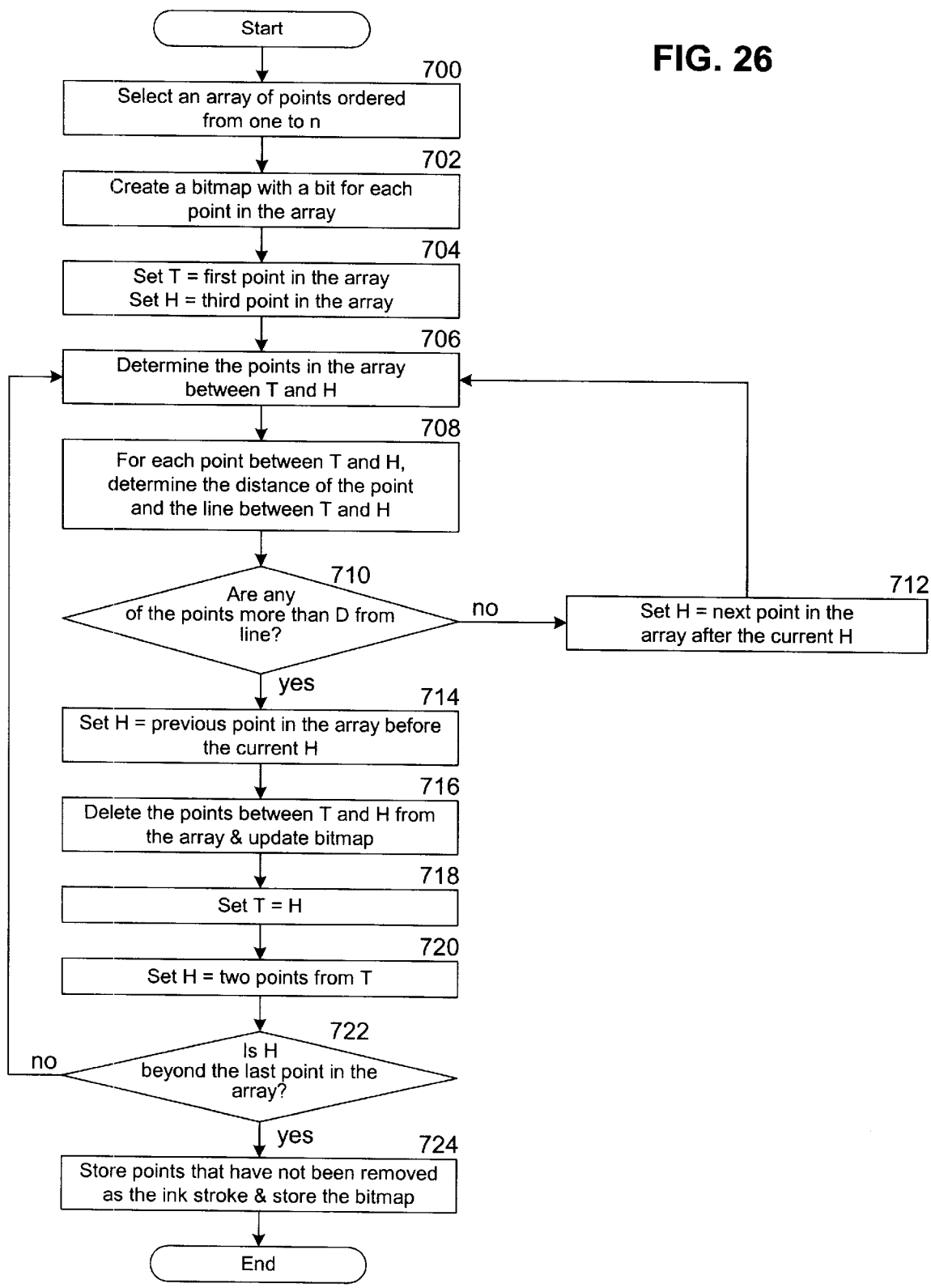
FIG. 26 is a flowchart of a preferred method for storing the data forming an ink stroke representation in accordance with the present invention.

Yet another method provided by the present invention to improve performance is stroke thinning. As the pen 16 is moved over the digitizer, it produces many points that are used to represent an input stroke. Typically, the input device 16 will generate about 200 points per second as a stroke is being input. Thus, storing several pages of handwriting as ink stroke representations can be expensive. The present invention advantageously reduces the amount of data that needs to be processed by "stroke thinning" or reducing the number of points that are used define a stroke. Referring now to FIG. 26, a preferred method for performing stroke thinning according to the present invention is shown. The method begins in step 700 by selecting an array of points ordered from one to n. As the points are received from the input device 16, the CPU 12 preferably stores the points in memory 18 in an array in the order they are received. The points are preferably ordered from one to n. Next, in step 702, a bit map having a bit for each point in the array is created. The bit map is used to identify the number of points that were in the original stroke before thinning and points that were removed by thinning. When the bit map is created, all the bits will be set to be a predetermined state such as "1" to indicate that the points are still used to define the stroke and a "0" to indicate that the points have been removed. Then in step 704 the process is initialized by setting T to be a first point in the array and setting H to be the third point in the array. Then in step 706, the method determines points in the array between T and H. Since the T is initially the first point and H is initially the third point, step 706 will produce a single point, the second point in the array. Next in step 708, the method determines for each point the shortest distance between each point and a line segment between the points set to be T and H. Then in step 710, the method tests whether any of the distances determined in step 708 are greater than a predetermined threshold distance, D. In an exemplary embodiment, the threshold distance is $\frac{1}{72}$ of a line height. Those skilled the art will realize that the threshold distance can be set to other distances depending upon the number of points needed to perform character recognition or for display fidelity. If all the points between T and H are within the threshold distance of the line segment connecting T and H, then the method continues in step 712 where H is set to be the next point in the array following the current H. Then the method returns to step 706 to determine whether the points between T and the new value of H can be removed. If even one of the points between T and H is not within the threshold distance of the line segment connecting T and H, then the method continues in step 714. In step 714, H is set to be the point in the array before the current value of H. All the points between T and H can now be removed since they have been tested and were found to be within the threshold distance of the segment connecting T and H. Thus, a line between T and H is an acceptable approximation for the points. Then in step 716, the points between T and H in the array are removed and the bit map is updated to indicate that these points have been removed. For example, the bit map may be updated by changing the bit for the points removed from "1" to "0". Next, in step 718, T is set to be H. The value of H is now used as the point for the T. Then in step 720, H is set to be two points from the value of T. In step 722, the method tests whether the H is set to a point beyond the last point in the array. If not, the method uses the new values of T and H and returns to step 706 to determine whether any other points can be removed from the ink stroke representation. If H has been set to a point beyond the last point in the array, then there are no more points that form the stroke that can be removed. The method continues in step 724 where the points that have not been removed and the bit map are stored in memory 18, and the method ends.

This method for reducing the number of points to define a stroke is particularly advantageous in a number of respects.

While the stroke thinning method has been described above for storage of the strokes in memory, it may also be applied to rendering the strokes on the display device 14 and printing the strokes on a hard copy device. For example, the threshold distance for storage will be determined by the number of points needed to perform character recognition on-the stroke. However, when the strokes are displayed or printed greater values for threshold distance may be used due to the resolution of the display or printing device. In particular, the threshold distance may be set at a first value and the strokes further thinned for printing on a 300 dpi laser printer or set to an even greater value to remove more points if being displayed on a 75 dpi monitor. For example, for display the threshold value may be set to a value in the range of 3 to 5 pixels. Such stroke dunning is very advantageous because it greatly reduces the amount of bate required to print or display strokes without any reduction in the quality of the image of the strokes. In yet another aspect, the method is advantageous because of the bit map produced. The bit map allows points that were removed to be added back in if needed for character recognition. Such points may be needed for timing information used by character recognition engines. Using the bit map, the points that were removed can be identified and new points may be added through linear interpolation between two known points. Therefore, the stroke thinning also does not significantly affect the quality or level of character recognition rates.

Figure 27A:
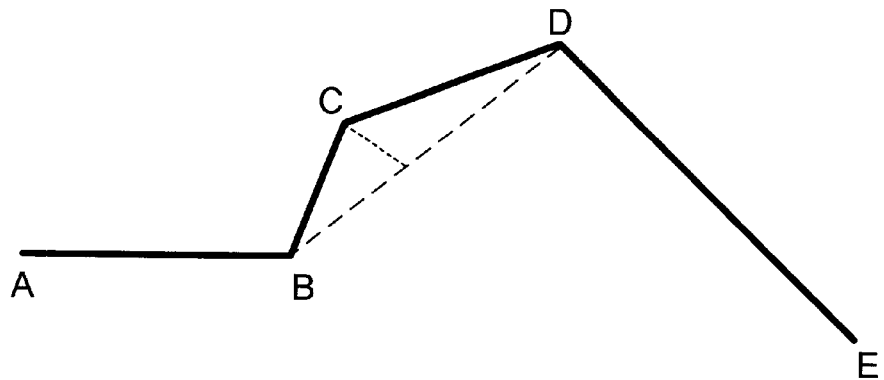
FIGS. 27A and 27B are graphical representations of a stroke before and after the stroke has been thinned, respectively.
Figure 27B:
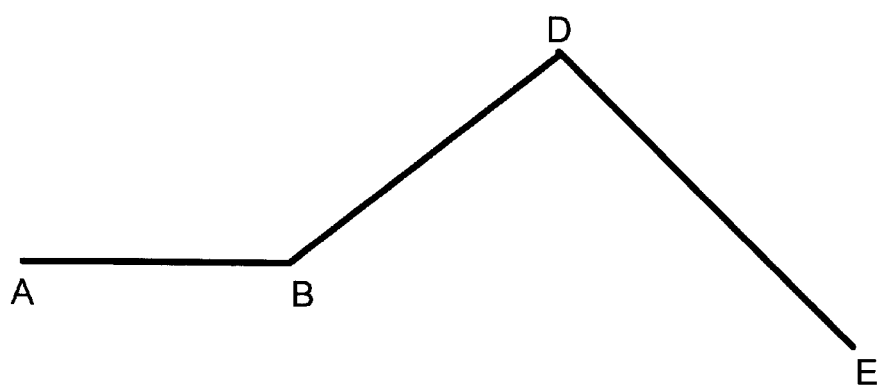

Referring now to FIGS. 27A and 27B, the operation of the present invention will be further illustrated. FIG. 27A is a graphical representation of an original ink stroke defined by points (A, B, C, D, E). It will be assumed that the distance between point C and the segment between points B and D is less than the threshold distance. The above stroke dunning method is applied and will yield the stroke shown in FIG. 27B. In addition, the method will also produce a bit map (0, 0, 1, 0, 0). As the points of FIG. 27A are input, point C will be thinned out to yield the stroke defined by the points (A, B, D, E). As can be seen the amount of processing and storage will be less because a point has been removed. In more conventional strokes where the number of points defining the stroke is on the order of a thousand the savings will be even greater. Moreover, using the bit map, a close approximation of point C can be reproducing by adding a point on the line segment between B and D at the midpoint.

Figure 28:
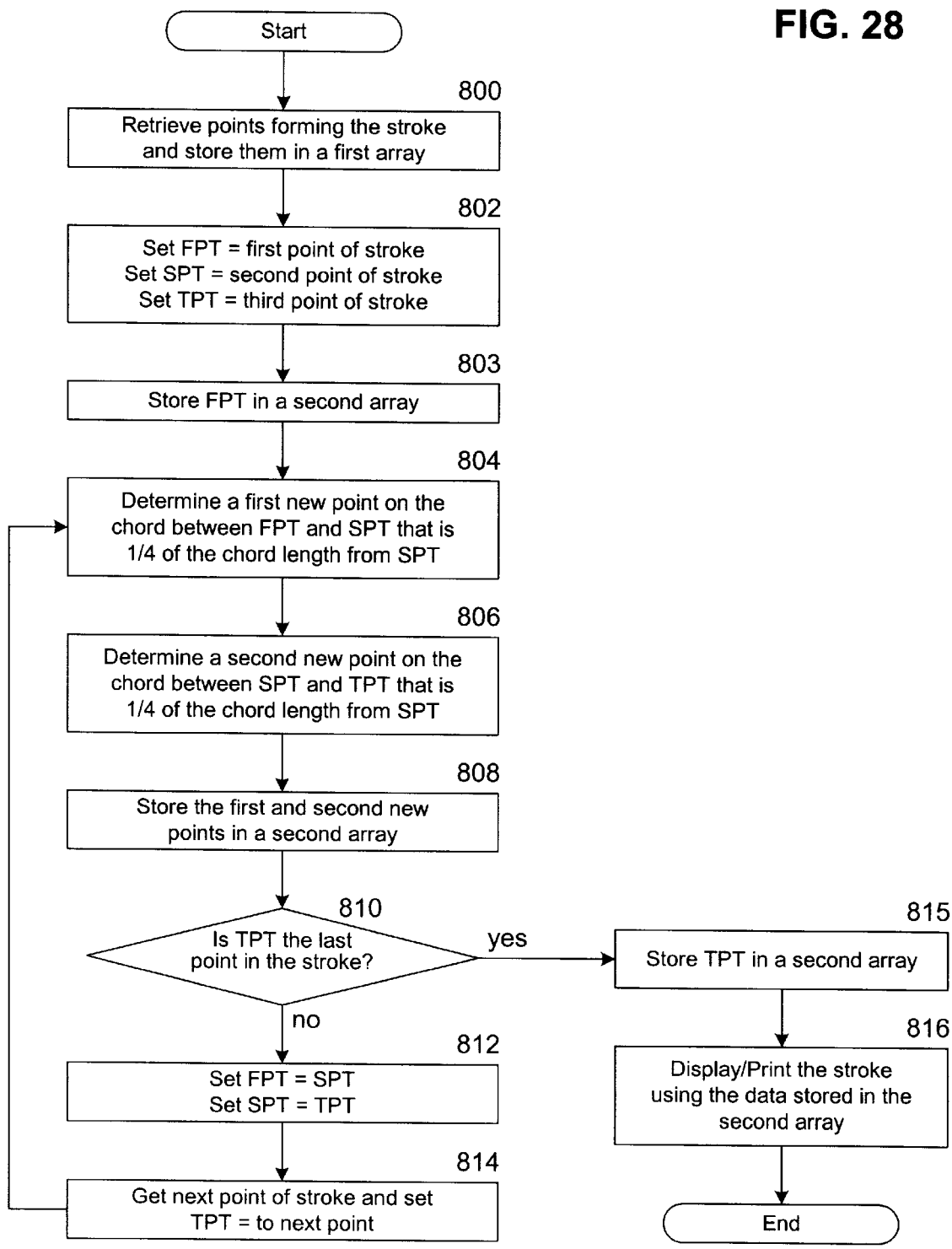
FIG. 28 is a flowchart of a preferred method of smoothing an ink stroke representation for display or printing in accordance with the present invention.

Referring now to FIG. 28, a method for enhancing or smoothing ink stroke representations for displaying or printing will be described. The method begins in step 800 by retrieving the points forming a stroke and storing them in a first array. Then in step 802, the method sets a variable FPT to be the first point in the array, a variable SPT to be the second point in the array, and a variable TPT to be the third point in the array. In step 803, the point set currently as the FPT is stored in a second array. The second array is used to store the points forming the smoothed stroke. Then in step 804, the method determines a first new point on the chord between the FPT and the SPT. The first new point is preferably ¼ of the length of the chord from the SPT. Then, the method determines a second new point on the chord between the SPT and the TPT. The second new point is also preferably ¼ of the length of the chord from the SPT. Then in step 808, the first and second new points are stored in a second array. In step 810, the method next tests whether the TPT is the last point forming the stroke. If not, the method continues through steps 812 and 814 and returns to step 804 to perform more smoothing of the stroke. In step 812, the method sets FPT to be the point currently set as the SPT, and then sets the SPT to be the point currently set as the TPT. Then in step 814, the method retrieves the next point stored in the array after the current TPT and sets the TPT to be the retrieved next point. Then the method returns to step 804. If the TPT is found to be the last point forming the stroke in step 810, then the method proceeds to step 815. In step 815, the TPT is added to the second array. Finally, the method either displays or prints the smoothed stroke using the data stored in the second array. Those skilled in the art will realize that the method of the present invention may be modified. For example, the new points may be a different distance from the SPT other than ¼ of the chord length. Similarly, the new points might be a fixed distance from the SPT rather than a percentage of the chord length. Finally, it should be noted that this method may be repeatedly applied to a stroke before printing or displaying if more smoothing is need.

While the present invention has been described with reference to certain preferred embodiments, those skilled in the art will recognize that various modifications may be provided. For example, different algorithms may be used to implement the line, word and paragraph parsing of the present invention. These and other variations upon and modifications to the preferred embodiment are provided for by the present invention which is limited only by the following claims.

APPENDIX A

| Membership Functions | |
|---|---|
| NARROW_WIDTH | |
| Point 1 | −32768 |
| Point 2 | −32768 |
| Point 3 | 3 |
| Point 4 | 8 |
| CHARACTER_WIDTH | |
| Point 1 | −32768 |
| Point 2 | −32768 |
| Point 3 | CHAR_WIDTH*1.5 |
| Point 4 | CHAR_WIDTH*4 |
| NOT_CHARACTER_WIDTH | |
| Point 1 | CHAR_WIDTH*2 |
| Point 2 | CHAR_WIDTH*4 |
| Point 3 | 32767 |
| Point 4 | 32767 |
| CHARACTER_DISTANCE | |
| Point 1 | −32767 |
| Point 2 | −32767 |
| Point 3 | CHAR_DIST |
| Point 4 | CHAR_DIST*1.5 |
| NOT_CHARACTER_WIDTH | |
| Point 1 | CHAR_WIDTH*1.25 |
| Point 2 | CHAR_WIDTH*2 |
| Point 3 | 32767 |
| Point 4 | 32767 |
| CHARACTER_DELTA | |
| Point 1 | −32767 |
| Point 2 | −32767 |
| Point 3 | CHAR_DELTA |
| Point 4 | WORD_DELTA |
| WORD_DELTA | |
| Point 1 | CHAR_DELTA |
| Point 2 | WORD_DELTA |
| Point 3 | 32767 |
| Point 4 | 32767 |

APPENDIX A-continued

Membership Functions

OVERLAPPING

| | |
|---|---|
| Point 1 | −32767 |
| Point 2 | −32767 |
| Point 3 | 2 |
| Point 4 | 8 |

NOT_OVERLAPPING

| | |
|---|---|
| Point 1 | 0 |
| Point 2 | 10 |
| Point 3 | 32767 |
| Point 4 | 32767 |

ENTRY_MERGE

| | |
|---|---|
| DEFINITELY_SPLIT | −32768 |
| SPLIT | −32768/2 |
| JOIN | +32767/2 |
| DEFINITELY_SPLIT | +32767 |

APPENDIX B

Rules for Fuzzy Join

```
//Rule 0
If Rule      (ENTRY_DELTA, WORD_DELTA),
Then Rule    (ENTRY_MERGE, DEFINITELY_SPLIT),
//Rule 1
If Rule      (ENTRY_OVERLAP, OVERLAPPING),
ThenRule     (ENTRY_MERGE, DEFINITELY JOIN),
//Rule 2
If Rule      (ENTRY_WIDTH, CHARACTER_WIDTH),
AndIfRule    (PREV_ENTRY_WIDTH, CHARACTER_WIDTH),
AndIfRule    (ENTRY_DELTA, CHARACTER_DELTA),
ThenRule     (ENTRY_MERGE, DEFINITELY_JOIN),
//Rule 3
If Rule      (ENTRY_WIDTH, CHARACTER_WIDTH),
AndIfRule    (PREV_ENTRY_WIDTH, CHARACTER_WIDTH),
AndIfRule    (ENTRY_DISTANCE, CHARACTER_DISTANCE),
ThenRule     (ENTRY_MERGE, JOIN),
//Rule 4
If Rule      (ENTRY_WIDTH, CHARACTER_WIDTH),
AndIfRule    (PREV_ENTRY_WIDTH, CHARACTER_WIDTH),
AndIfRule    (ENTRY_DISTANCE, NOT_CHARACTER_DISTANCE),
ThenRule     (ENTRY_MERGE, SPLIT),
//Rule 5
If Rule      (ENTRY_WIDTH, CHARACTER_WIDTH),
AndIfRule    (PREV_ENTRY_WIDTH, NOT_CHARACTER_WIDTH),
AndIfRule    (ENTRY_DELTA, CHARACTER_DELTA),
ThenRule     (ENTRY_MERGE, JOIN),
//Rule 6
If Rule      (ENTRY_WIDTH, NOT_CHARACTER_WIDTH),
AndIfRule    (PREV_ENTRY WIDTH, CHARACTER_WIDTH),
AndIfRule    (ENTRY_DELTA, CHARACTER_DELTA),
ThenRule     (ENTRY_MERGE, JOIN),
//Rule 9
If Rule      (ENTRY_WIDTH, NOT_CHARACTER_WIDTH),
If Rule      (PREV_ENTRY_WIDTH, NOT_CHARACTER_WIDTH),
AndIfRule    (ENTRY_OVERLAP, NOT_OVERLAPPING),
ThenRule     (ENTRY_MERGE, SPLIT),
//Rule 10
If Rule      (ENTRY_WIDTH, NARROW_WIDTH),
AndIfRule    (PREV_ENTRY WIDTH, CHARACTER_WIDTH),
AndIfRule    (ENTRY_DISTANCE, CHARACTER_DISTANCE),
ThenRule     (ENTRY_MERGE, DEFINITELY_JOIN),
//Rule 11
If Rule      (ENTRY_WIDTH, NARROW_WIDTH),
AndIfRule    (ENTRY_DELTA, CHARACTER_DELTA),
ThenRule     (ENTRY_MERGE, DEFINITELY_JOIN),
```

What is claimed is:

1. A computerized method for automatically determining whether a word in the line is a valid bullet character, the method comprising the steps of:

selecting a first word on a line;

selecting a stroke of the first word;

determining whether the stroke has the height and width to be a valid bullet character including determining whether the stroke has the height and width to be a dash character and determining whether the stroke has the height and width to be a bullet character; and identifying the word to be a valid bullet character if the stroke has the height and width to be a valid bullet character, wherein the word is identified as a valid bullet character if the stroke is determined to be either a dash character or a bullet character.

2. The method of claim 1, wherein the step of determining whether the stroke has the height and width to be a dash character, further comprises steps of:

determining whether the stroke has a height less than or equal to about one-fifth a line height;

determining whether the stroke has a width greater than or equal to about one-fifth a line height and less than about 1.5 line heights;

determining whether the stroke has a height between about one-fifth and four-fifths of a line height above a base line of the line associated with the stroke;

identifying the stroke as a dash character if the stroke has a height less than or equal to about one-fifth a line height, the stroke has a width has a width greater than or equal to about one-fifth a line height and less than about 1.5 line heights, and the stroke has a height between about one-fifth and four-fifths of a line height above a base line of the line associated with the stroke.

3. The method of claim 2, wherein the step of determining whether the stroke has the height and width to be a dash character, further comprises step of determining whether the stroke has an aspect ratio of less than half.

4. The method of claim 1, wherein the step of determining whether the stroke has the height and width to be a bullet character, further comprises steps of:

determining whether the stroke has a width less than two-thirds of line height; and determining whether the stroke has a height between about one-fifth and four-fifths of a line height above a base line of the line associated with the stroke; and identifying the stroke as a bullet character if the stroke has a width less than two-thirds of line height and the stroke has a height between about one-fifth and four-fifths of a line height above a base line of the line associated with the stroke.

5. The method of claim 1, further comprising the steps of:

determining whether the stroke height is less than one-sixth a line height;

determining whether the stroke has an aspect ratio less than about 2.5;

wherein the word is identified as a valid bullet character only if the stroke height is not less than one-sixth a line height and the aspect ratio of the stroke is not less than about 2.5.

* * * * *

UNITED STATES PATENT AND TRADEMARK OFFICE
CERTIFICATE OF CORRECTION

PATENT NO.    : 6,535,897 B1  
DATED         : March 18, 2003  
INVENTOR(S)   : Dan Altman et al.

Page 1 of 3

It is certified that error appears in the above-identified patent and that said Letters Patent is hereby corrected as shown below:

Title page, Item [54], and Column 1, line 4,
In the title, insert -- , -- after "HANDWRITING";

Title page,
Item [56], References Cited, U.S. PATENT DOCUMENTS, insert the following U.S. Patents:

| | | | | |
|---|---|---|---|---|
| -- 4,953,255 | 08/1990 | Togawa et al. | 382 | 13 |
| 4,965,678 | 10/1990 | Yamada | 358 | 452 |
| 5,001,765 | 03/1991 | Jeanty | 382 | 9 |
| 5,063,600 | 11/1991 | Norwood | 382 | 13 |
| 5,138,668 | 08/1992 | Abe | 382 | 9 |
| 5,155,813 | 10/1992 | Donoghue et al. | 395 | 275 |
| 5,157,737 | 10/1992 | Sklarew | 382 | 13 |
| 5,204,959 | 04/1993 | Sakuragi | 395 | 600 -- |

Column 1,
Lines 65-66, delete "fimctions" and insert -- functions -- therefor;

Column 2,
Line 31, delete "in" and insert -- is -- therefor;

Column 6,
Line 32, delete the second occurrence of "to" and insert -- the -- therefor;

Column 8,
Line 65, delete "the" and insert -- a -- therefor;

Column 9,
Line 6, insert -- input until a time -- before "out";
Line 41, delete "it" after "if";

Column 11,
Line 8, delete "WV." and insert -- WV, -- therefor;
Line 57, delete "comer" and insert -- corner -- therefor;

Column 13,
Line 56, delete "word" and insert -- words -- therefor;

Column 14,
Line 51, delete "PREV ENTRY_WIDTH" and insert -- PREV_ENTRY_WIDTH -- therefor;

UNITED STATES PATENT AND TRADEMARK OFFICE
CERTIFICATE OF CORRECTION

PATENT NO. : 6,535,897 B1
DATED : March 18, 2003
INVENTOR(S) : Dan Altman et al.

It is certified that error appears in the above-identified patent and that said Letters Patent is hereby corrected as shown below:

Column 15,
Line 1, delete "addedto" and insert -- added to -- therefor;
Line 49, delete "night" and insert -- right -- therefor;

Column 17,
Line 7, delete "in" and insert -- is -- therefor;

Column 18,
Line 23, delete "method" and insert -- methods -- therefor;
Line 62, delete "were" and insert -- where -- therefor;

Column 19,
Line 13, delete "view The" and insert -- view. The -- therefor;

Column 20,
Line 39, delete "word" and insert -- words -- therefor;
Line 65, insert -- a -- before "lower";
Line 67, delete "a" and insert -- an --therefor;

Column 22,
Line 34, delete "lines" and insert -- line -- therefor;
Lines 43 and 45, delete "desire" and insert -- desires -- therefor;

Column 23,
Line 59, delete the second occurrence of "a";

Column 28,
Line 5, delete "is," and insert -- is -- therefor;
Lines 9 thru 39, delete duplicate section of paragraph from "Then in step 510" to
-- affected list. --;

Column 29,
Line 35, delete "present." and insert -- present -- therefor;
Line 47, delete "determine." and insert -- determine -- therefor;
Lines 52, 60 and 66, delete "comers" and insert -- corners -- therefor;
Line 64, delete "78" and insert -- 7B -- therefor;

Column 30,
Lines 1, 3, 5, 9-10, 11, 14, 16 and 18, delete "comers" and insert -- corners -- therefor;
Line 65, delete "instep" and insert -- in step -- therefor;

Column 31,
Line 7, delete the second occurrence of "is";
Line 10, delete the first occurrence of "is";

UNITED STATES PATENT AND TRADEMARK OFFICE
CERTIFICATE OF CORRECTION

PATENT NO. : 6,535,897 B1
DATED : March 18, 2003
INVENTOR(S) : Dan Altman et al.

It is certified that error appears in the above-identified patent and that said Letters Patent is hereby corrected as shown below:

Column 31 cont'd,
Line 20, insert -- the -- after "box";

Column 34,
Line 4, insert -- is -- after "width";
Line 14, delete "360" and insert -- 630 -- therefor;
Line 22, insert -- the -- after "of";

Column 35,
Line 45, delete "is" after "recognition";

Column 36,
Line 6, insert -- to -- after "used";
Line 55, delete the second occurrence of "the";

Column 37,
Line 6, delete "on-the" and insert -- on the -- therefor;
Line 43, delete "reproducing" and insert -- reproduced -- therefor;

Column 38,
Line 16, delete "need" and insert -- needed -- therefor;

Column 40,
Line 30, delete one occurrence of "has a width".

Signed and Sealed this

Twenty-sixth Day of August, 2003

JAMES E. ROGAN
*Director of the United States Patent and Trademark Office*